US012473570B2

(12) United States Patent
Arumugaswami et al.

(10) Patent No.: US 12,473,570 B2
(45) Date of Patent: Nov. 18, 2025

(54) ZIKA VIRUS CONSTRUCTS AND THERAPEUTIC COMPOSITIONS THEREOF

(71) Applicant: The Regents of the University of California, Oakland, CA (US)

(72) Inventors: Vaithilingaraja Arumugaswami, Los Angeles, CA (US); Gustavo Garcia, Jr., Gardena, CA (US); David A. Nathanson, Los Angeles, CA (US); Ren Sun, Pokfulam (HK)

(73) Assignee: The Regents of the University of California, Oakland, CA (US)

(*) Notice: Subject to any disclaimer, the term of this patent is extended or adjusted under 35 U.S.C. 154(b) by 1046 days.

(21) Appl. No.: 17/609,496

(22) PCT Filed: May 20, 2020

(86) PCT No.: PCT/US2020/033705

§ 371 (c)(1),
(2) Date: Nov. 8, 2021

(87) PCT Pub. No.: WO2020/236874

PCT Pub. Date: Nov. 26, 2020

(65) Prior Publication Data

US 2022/0213504 A1 Jul. 7, 2022

Related U.S. Application Data

(60) Provisional application No. 62/850,759, filed on May 21, 2019.

(51) Int. Cl.

| | |
|---|---|
| ***C12N 15/86*** | (2006.01) |
| ***A61K 39/00*** | (2006.01) |
| ***A61P 35/00*** | (2006.01) |
| ***C07K 14/005*** | (2006.01) |

(52) U.S. Cl.

CPC .......... *C12N 15/86* (2013.01); *A61K 39/0011* (2013.01); *A61P 35/00* (2018.01); *C07K 14/005* (2013.01); *A61K 2039/585* (2013.01); *C12N 2770/24122* (2013.01); *C12N 2770/24132* (2013.01); *C12N 2770/24134* (2013.01); *C12N 2770/24143* (2013.01); *C12N 2770/24171* (2013.01)

(58) Field of Classification Search

CPC .......... C12N 15/86; C12N 2770/24122; C12N 2770/24132; C12N 2770/24134; C12N 2770/24143; C12N 2770/24171; A61P 35/00; A61K 39/0011; A61K 2039/585; C07K 14/005

See application file for complete search history.

(56) References Cited

U.S. PATENT DOCUMENTS

| | | | | |
|---|---|---|---|---|
| 10,786,537 | B2 * | 9/2020 | Arumugaswami | A61K 35/768 |
| 2010/0111873 | A1 * | 5/2010 | Russell | A61P 35/00 424/9.2 |
| 2019/0038685 | A1 * | 2/2019 | Alexander | A61P 35/00 |
| 2019/0083601 | A1 | 3/2019 | Tauber et al. | |
| 2020/0121780 | A1 * | 4/2020 | Arumugaswami | A61K 39/12 |
| 2020/0330581 | A1 * | 10/2020 | Black | A61K 35/768 |
| 2024/0252619 | A1 * | 8/2024 | Arumugaswami | C12N 15/86 |

FOREIGN PATENT DOCUMENTS

| | | |
|---|---|---|
| WO | 2017015463 | 1/2017 |
| WO | 2018035294 | 2/2018 |
| WO | WO-2018060771 A1 * | 4/2018 |
| WO | 2018231690 | 12/2018 |

OTHER PUBLICATIONS

International Search Report received in PCT/US2020/033705, mailed Sep. 11, 2020.

Written Opinion received in PCT/US2020/033705, mailed Sep. 11, 2020.

Annamalai et al., "An Attenuated Zika Virus Encoding Non-Glycosylated Envelope (E) and Non-Structural Protein 1 (NS1) Confers Complete Protection against Lethal Challeng", Sep. 12, 2019, pp. 112, vol. 7, No. 3, Publisher: Vaccines (Basel).

Fontes-Garfias et al., "Functional Analysis of Glycosylation of Zika Virus Envelope Protein", Oct. 31, 2017, pp. 1180-1190, vol. 21, No. 5, Publisher: Cell Rep.

Gong et al., "High-Throughput Fitness Profiling of Zika Virus E Protein Reveals Different Roles for Glycosylation during Infection of Mammalian and Mosquito Cells", Mar. 23, 2018, pp. 97-111, vol. 1, Publisher: iScience.

* cited by examiner

*Primary Examiner* — Janet L Andres
*Assistant Examiner* — Carey Alexander Stuart
(74) *Attorney, Agent, or Firm* — Suzannah K. Sundby, Esq.; Canady + Lortz LLP

(57) ABSTRACT

Provided are Zika virus constructs and methods of using Zika virus constructs and Zika viruses to treat subjects in need thereof.

12 Claims, 22 Drawing Sheets

Specification includes a Sequence Listing.

Figure 12
Xenograft (SQ, left flank)
1. PBS Group (n=8)
U87 + matrigel
PBS
PBS
Day 0
Day 17
Day 24
Day 40
2. ZIKV-E Group (n=8)
U87 + matrigel
ZIKV
ZIKV
Day 0
Day 17
Day 24
Day 40
3. ZIKV-E Pre-Treatment Group (n=8)
U87 + ZIKV-E + matrigel
PBS
PBS
Day 0
Day 17
Day 24
Day 40

SEQUENCE LISTING

```
<160> NUMBER OF SEQ ID NOS: 18

<210> SEQ ID NO 1
<211> LENGTH: 504
<212> TYPE: PRT
<213> ORGANISM: Artificial Sequence
<220> FEATURE:
<223> OTHER INFORMATION: E protein of ZIKV having N154X substitution
<220> FEATURE:
<221> NAME/KEY: MISC_FEATURE
<222> LOCATION: (154)..(154)
<223> OTHER INFORMATION: Wherein Xaa is any amino acid residue other
      than Asn

<400> SEQUENCE: 1

Ile Arg Cys Ile Gly Val Ser Asn Arg Asp Phe Val Glu Gly Met Ser
1               5                   10                  15

Gly Gly Thr Trp Val Asp Val Val Leu Glu His Gly Gly Cys Val Thr
            20                  25                  30

Val Met Ala Gln Asp Lys Pro Thr Val Asp Ile Glu Leu Val Thr Thr
        35                  40                  45

Thr Val Ser Asn Met Ala Glu Val Arg Ser Tyr Cys Tyr Glu Ala Ser
    50                  55                  60

Ile Ser Asp Met Ala Ser Asp Ser Arg Cys Pro Thr Gln Gly Glu Ala
65                  70                  75                  80

Tyr Leu Asp Lys Gln Ser Asp Thr Gln Tyr Val Cys Lys Arg Thr Leu
                85                  90                  95

Val Asp Arg Gly Trp Gly Asn Gly Cys Gly Leu Phe Gly Lys Gly Ser
            100                 105                 110

Leu Val Thr Cys Ala Lys Phe Ala Cys Ser Lys Lys Met Thr Gly Lys
        115                 120                 125

Ser Ile Gln Pro Glu Asn Leu Glu Tyr Arg Ile Met Leu Ser Val His
    130                 135                 140

Gly Ser Gln His Ser Gly Met Ile Val Xaa Asp Thr Gly His Glu Thr
145                 150                 155                 160

Asp Glu Asn Arg Ala Lys Val Glu Ile Thr Pro Asn Ser Pro Arg Ala
                165                 170                 175

Glu Ala Thr Leu Gly Gly Phe Gly Ser Leu Gly Leu Asp Cys Glu Pro
            180                 185                 190
```

```
Arg Thr Gly Leu Asp Phe Ser Asp Leu Tyr Tyr Leu Thr Met Asn Asn
        195                 200                 205

Lys His Trp Leu Val His Lys Glu Trp Phe His Asp Ile Pro Leu Pro
    210                 215                 220

Trp His Ala Gly Ala Asp Thr Gly Thr Pro His Trp Asn Asn Lys Glu
225                 230                 235                 240

Ala Leu Val Glu Phe Lys Asp Ala His Ala Lys Arg Gln Thr Val Val
                245                 250                 255

Val Leu Gly Ser Gln Glu Gly Ala Val His Thr Ala Leu Ala Gly Ala
            260                 265                 270

Leu Glu Ala Glu Met Asp Gly Ala Lys Gly Arg Leu Ser Ser Gly His
        275                 280                 285

Leu Lys Cys Arg Leu Lys Met Asp Lys Leu Arg Leu Lys Gly Val Ser
    290                 295                 300

Tyr Ser Leu Cys Thr Ala Ala Phe Thr Phe Thr Lys Ile Pro Ala Glu
305                 310                 315                 320

Thr Leu His Gly Thr Val Thr Val Glu Leu Gln Tyr Ala Gly Thr Asp
                325                 330                 335

Gly Pro Cys Lys Val Pro Ala Gln Met Ala Val Asp Met Gln Thr Leu
            340                 345                 350

Thr Pro Val Gly Arg Leu Ile Thr Ala Asn Pro Val Ile Thr Glu Ser
        355                 360                 365

Thr Glu Asn Ser Lys Met Met Leu Glu Leu Asp Pro Pro Phe Gly Asp
    370                 375                 380

Ser Tyr Ile Val Ile Gly Val Gly Glu Lys Lys Ile Thr His His Trp
385                 390                 395                 400

His Arg Ser Gly Ser Thr Ile Gly Lys Ala Phe Glu Ala Thr Val Arg
                405                 410                 415

Gly Ala Lys Arg Met Ala Val Leu Gly Asp Thr Ala Trp Asp Phe Gly
            420                 425                 430

Ser Val Gly Gly Ala Leu Asn Ser Leu Gly Lys Gly Ile His Gln Ile
        435                 440                 445

Phe Gly Ala Ala Phe Lys Ser Leu Phe Gly Gly Met Ser Trp Phe Ser
    450                 455                 460

Gln Ile Leu Ile Gly Thr Leu Leu Met Trp Leu Gly Leu Asn Thr Lys
465                 470                 475                 480

Asn Gly Ser Ile Ser Leu Met Cys Leu Ala Leu Gly Gly Val Leu Ile
                485                 490                 495

Phe Leu Ser Thr Ala Val Ser Ala
            500


<210> SEQ ID NO 2
<211> LENGTH: 504
<212> TYPE: PRT
<213> ORGANISM: Artificial Sequence
<220> FEATURE:
<223> OTHER INFORMATION: E protein of wild-type ZIKV

<400> SEQUENCE: 2

Ile Arg Cys Ile Gly Val Ser Asn Arg Asp Phe Val Glu Gly Met Ser
1               5                   10                  15

Gly Gly Thr Trp Val Asp Val Val Leu Glu His Gly Gly Cys Val Thr
            20                  25                  30

Val Met Ala Gln Asp Lys Pro Thr Val Asp Ile Glu Leu Val Thr Thr
        35                  40                  45
```

```
Thr Val Ser Asn Met Ala Glu Val Arg Ser Tyr Cys Tyr Glu Ala Ser
    50                  55                  60

Ile Ser Asp Met Ala Ser Asp Ser Arg Cys Pro Thr Gln Gly Glu Ala
65                  70                  75                  80

Tyr Leu Asp Lys Gln Ser Asp Thr Gln Tyr Val Cys Lys Arg Thr Leu
                85                  90                  95

Val Asp Arg Gly Trp Gly Asn Gly Cys Gly Leu Phe Gly Lys Gly Ser
            100                 105                 110

Leu Val Thr Cys Ala Lys Phe Ala Cys Ser Lys Lys Met Thr Gly Lys
        115                 120                 125

Ser Ile Gln Pro Glu Asn Leu Glu Tyr Arg Ile Met Leu Ser Val His
    130                 135                 140

Gly Ser Gln His Ser Gly Met Ile Val Asn Asp Thr Gly His Glu Thr
145                 150                 155                 160

Asp Glu Asn Arg Ala Lys Val Glu Ile Thr Pro Asn Ser Pro Arg Ala
                165                 170                 175

Glu Ala Thr Leu Gly Gly Phe Gly Ser Leu Gly Leu Asp Cys Glu Pro
            180                 185                 190

Arg Thr Gly Leu Asp Phe Ser Asp Leu Tyr Tyr Leu Thr Met Asn Asn
        195                 200                 205

Lys His Trp Leu Val His Lys Glu Trp Phe His Asp Ile Pro Leu Pro
    210                 215                 220

Trp His Ala Gly Ala Asp Thr Gly Thr Pro His Trp Asn Asn Lys Glu
225                 230                 235                 240

Ala Leu Val Glu Phe Lys Asp Ala His Ala Lys Arg Gln Thr Val Val
                245                 250                 255

Val Leu Gly Ser Gln Glu Gly Ala Val His Thr Ala Leu Ala Gly Ala
            260                 265                 270

Leu Glu Ala Glu Met Asp Gly Ala Lys Gly Arg Leu Ser Ser Gly His
        275                 280                 285

Leu Lys Cys Arg Leu Lys Met Asp Lys Leu Arg Leu Lys Gly Val Ser
    290                 295                 300

Tyr Ser Leu Cys Thr Ala Ala Phe Thr Phe Thr Lys Ile Pro Ala Glu
305                 310                 315                 320

Thr Leu His Gly Thr Val Thr Val Glu Leu Gln Tyr Ala Gly Thr Asp
                325                 330                 335

Gly Pro Cys Lys Val Pro Ala Gln Met Ala Val Asp Met Gln Thr Leu
            340                 345                 350

Thr Pro Val Gly Arg Leu Ile Thr Ala Asn Pro Val Ile Thr Glu Ser
        355                 360                 365

Thr Glu Asn Ser Lys Met Met Leu Glu Leu Asp Pro Pro Phe Gly Asp
    370                 375                 380

Ser Tyr Ile Val Ile Gly Val Gly Glu Lys Lys Ile Thr His His Trp
385                 390                 395                 400

His Arg Ser Gly Ser Thr Ile Gly Lys Ala Phe Glu Ala Thr Val Arg
                405                 410                 415

Gly Ala Lys Arg Met Ala Val Leu Gly Asp Thr Ala Trp Asp Phe Gly
            420                 425                 430

Ser Val Gly Gly Ala Leu Asn Ser Leu Gly Lys Gly Ile His Gln Ile
        435                 440                 445

Phe Gly Ala Ala Phe Lys Ser Leu Phe Gly Gly Met Ser Trp Phe Ser
    450                 455                 460

Gln Ile Leu Ile Gly Thr Leu Leu Met Trp Leu Gly Leu Asn Thr Lys
```

```
465                 470                 475                 480

Asn Gly Ser Ile Ser Leu Met Cys Leu Ala Leu Gly Gly Val Leu Ile
                485                 490                 495

Phe Leu Ser Thr Ala Val Ser Ala
            500


<210> SEQ ID NO 3
<211> LENGTH: 273
<212> TYPE: DNA
<213> ORGANISM: Artificial Sequence
<220> FEATURE:
<223> OTHER INFORMATION: Sequence encoding human CCL5

<400> SEQUENCE: 3

atgaaggtct ccgcggcagc cctcgctgtc atcctcattg ctactgccct ctgcgctcct      60

gcatctgcct ccccatattc ctcggacacc acaccctgct gctttgccta cattgcccgc     120

ccactgcccc gtgcccacat caaggagtat ttctacacca gtggcaagtg ctccaaccca     180

gcagtcgtct ttgtcacccg aaagaaccgc caagtgtgtg ccaacccaga gaagaaatgg     240

gttcgggagt acatcaactc tttggagatg agc                                  273


<210> SEQ ID NO 4
<211> LENGTH: 579
<212> TYPE: DNA
<213> ORGANISM: Artificial Sequence
<220> FEATURE:
<223> OTHER INFORMATION: Sequence encoding human IL18

<400> SEQUENCE: 4

atggctgctg aaccagtaga agacaattgc atcaactttg tggcaatgaa atttattgac      60

aatacgcttt actttatagc tgaagatgat gaaaacctgg aatcagatta ctttggcaag     120

cttgaatcta aattatcagt cataagaaat ttgaatgacc aagttctctt cattgaccaa     180

ggaaatcggc ctctatttga agatatgact gattctgact gtagagataa tgcaccccgg     240

accatattta ttataagtat gtataaagat agccagccta gaggtatggc tgtaactatc     300

tctgtgaagt gtgagaaaat ttcaactctc tcctgtgaga acaaaattat ttcctttaag     360

gaaatgaatc ctcctgataa catcaaggat acaaaaagtg acatcatatt ctttcagaga     420

agtgtcccag gacatgataa taagatgcaa tttgaatctt catcatacga aggatacttt     480

ctagcttgtg aaaaagagag agaccttttt aaactcattt tgaaaaaaga ggatgaattg     540

ggggatagat ctataatgtt cactgttcaa aacgaagac                            579


<210> SEQ ID NO 5
<211> LENGTH: 459
<212> TYPE: DNA
<213> ORGANISM: Artificial Sequence
<220> FEATURE:
<223> OTHER INFORMATION: Sequence encoding human IL2

<400> SEQUENCE: 5

atgtacagga tgcaactcct gtcttgcatt gcactaagtc ttgcacttgt cacaaacagt      60

gcacctactt caagttctac aaagaaaaca cagctacaac tggagcattt actgctggat     120

ttacagatga ttttgaatgg aattaataat tacaagaatc ccaaactcac caggatgctc     180

acatttaagt tttacatgcc caagaaggcc acagaactga aacatcttca gtgtctagaa     240

gaagaactca aacctctgga ggaagtgcta aatttagctc aaagcaaaaa ctttcactta     300

agacccaggg acttaatcag caatatcaac gtaatagttc tggaactaaa gggatctgaa     360
```

acaacattca tgtgtgaata tgctgatgag acagcaacca ttgtagaatt tctgaacaga 420
tggattacct tttgtcaaag catcatctca acactgact 459

<210> SEQ ID NO 6
<211> LENGTH: 720
<212> TYPE: DNA
<213> ORGANISM: Artificial Sequence
<220> FEATURE:
<223> OTHER INFORMATION: Sequence encoding human TNFS14

<400> SEQUENCE: 6
atggaggaga gtgtcgtacg gccctcagtg tttgtggtgg atggacagac cgacatccca 60
ttcacgaggc tgggacgaag ccaccggaga cagtcgtgca gtgtggcccg ggtgggtctg 120
ggtctcttgc tgttgctgat gggggccggg ctggccgtcc aaggctggtt cctcctgcag 180
ctgcactggc gtctaggaga gatggtcacc cgcctgcctg acggacctgc aggctcctgg 240
gagcagctga tacaagagcg aaggtctcac gaggtcaacc cagcagcgca tctcacaggg 300
gccaactcca gcttgaccgg cagcgggggg ccgctgttat gggagactca gctgggcctg 360
gccttcctga ggggcctcag ctaccacgat ggggcccttg tggtcaccaa agctggctac 420
tactacatct actccaaggt gcagctgggc ggtgtgggct gcccgctggg cctggccagc 480
accatcaccc acggcctcta caagcgcaca ccccgctacc ccgaggagct ggagctgttg 540
gtcagccagc agtcaccctg cggacgggcc accagcagct cccgggtctg gtgggacagc 600
agcttcctgg gtggtgtggt acacctggag gctggggaga aggtggtcgt ccgtgtgctg 660
gatgaacgcc tggttcgact gcgtgatggt acccggtctt acttcggggc tttcatggtg 720

<210> SEQ ID NO 7
<211> LENGTH: 14020
<212> TYPE: DNA
<213> ORGANISM: Artificial Sequence
<220> FEATURE:
<223> OTHER INFORMATION: Zika Vector sequence

<400> SEQUENCE: 7
gaattctcaa tattggccat tagccatatt attcattggt tatatagcat aaatcaatat 60
tggctattgg ccattgcata cgttgtatct atatcataat atgtacattt atattggctc 120
atgtccaata tgaccgccat gttggcattg attattgact agttattaat agtaatcaat 180
tacggggtca ttagttcata gcccatatat ggagttccgc gttacataac ttacggtaaa 240
tggcccgcct ggctgaccgc ccaacgaccc ccgcccattg acgtcaataa tgacgtatgt 300
tcccatagta acgccaatag ggactttcca ttgacgtcaa tgggtggagt atttacggta 360
aactgcccac ttggcagtac atcaagtgta tcatatgcca agtccgcccc ctattgacgt 420
caatgacggt aaatggcccg cctggcatta tgcccagtac atgaccttac gggactttcc 480
tacttggcag tacatctacg tattagtcat cgctattacc atggtgatgc ggttttggca 540
gtacaccaat gggcgtggat agcggtttga ctcacgggga tttccaagtc tccaccccat 600
tgacgtcaat gggagtttgt tttggcacca aaatcaacgg gactttccaa aatgtcgtaa 660
taaccccgcc ccgttgacgc aaatgggcgg taggcgtgta cggtgggagg tctatataag 720
cagagctcgt ttagtgaacc gagttgttga tctgtgtgaa tcagactgcg acagttcgag 780
tttgaagcga aagctagcaa cagtatcaac aggttttatt ttggatttgg aaacgagagt 840
ttctggtcat gaaaaaccca aaaaagaaat ccggaggatt ccggattgtc aatatgctaa 900

-continued

```
aacgcggagt agcccgtgtg agccgtacga gtgggctgaa cacaaagaat ggatctattt    960
cccttatgtg cttggcctta gggggagtgt tgatcttctt atccacagcc gtctctgctg   1020
atgtggggtg ctcggtggac ttctcaaaga aggagacgag atgcggtacc ggggtgttcg   1080
tctataacga cgttgaagcc tggagggaca ggtacaagta ccatcctgac tccccccgta   1140
gattggcagc agcagtcaag caagcctggg aagatggtat ctgcgggatc tcctctgttt   1200
caagaatgga aaacatcatg tggagatcag tagaagggga gctcaacgca atcctggaag   1260
agaatggagt tcaactgacg gtcgttgtgg gatctgtaaa aaaccccatg gggagaggtc   1320
cacagagatt gcccgtgcct gtgaacgagc tgccccacgg ctggaaggct tgggggaaat   1380
cgtatttcgt cagagcagca aagacaaata acagctttgt cgtggatggt gacacactga   1440
aggaatgccc actcaaacat agagcatgga acagctttct tgtggaggat catgggttcg   1500
gggtatttca cactagtgtc tggctcaagg ttagagaaga ttattcatta gagtgtgatc   1560
cagccgttat tggaacagct gttaagggaa aggaggctgt acacagtgat ctaggctact   1620
ggattgagag tgagaagaat gacacatgga ggctgaagag ggcccatctg atcgagatga   1680
aaacatgtga atggccaaag tcccacacat tgtggacaga tggaatagaa gagagtgatc   1740
tgatcatacc caagtcttta gctgggccac tcagccatca caataccaga gagggctaca   1800
ggacccaaat gaaagggcca tggcacagtg aagagcttga aattcggttt gaggaatgcc   1860
caggcactaa ggtccacgtg gaggaaacat gtggaacaag aggaccatct ctgagatcaa   1920
ccactgcaag cggaagggtg atcgaggaat ggtgctgcag ggagtgcaca atgcccccac   1980
tgtcgttccg ggctaaagat ggctgttggt atggaatgga gataaggccc aggaaagaac   2040
cagaaagcaa cttagtaagg tcaatggtga ctgcaggatc aactgatcac atggaccact   2100
tctcccttgg agtgcttgtg atcctgctca tggtgcagga agggctgaag aagagaatga   2160
ccacaaagat catcataagc acatcaatgg cagtgctggt agctatgatc ctgggaggat   2220
tttcaatgag tgacctggct aagcttgcaa ttttgatggg tgccaccttc gcggaaatga   2280
acactggagg agatgtagct catctggcgc tgatagcggc attcaaagtc agaccagcgt   2340
tgctggtatc tttcatcttc agagctaatt ggacaccccg tgaaagcatg ctgctggcct   2400
tggcctcgtg tcttttgcaa actgcgatct ccgccttgga aggcgacctg atggttctca   2460
tcaatggttt tgctttggcc tggttggcaa tacgagcgat ggttgttcca cgcactgata   2520
acatcacctt ggcaatcctg gctgctctga caccactggc ccggggcaca ctgcttgtgg   2580
cgtggagagc aggccttgct acttgcgggg ggtttatgct cctctctctg aagggaaaag   2640
gcagtgtgaa gaagaactta ccatttgtca tggccctggg actaaccgct gtgaggctgg   2700
tcgaccccat caacgtggtg ggactgctgt tgctcacaag gagtgggaag cggagctggc   2760
cccctagcga agtactcaca gctgttggcc tgatatgcgc attggctgga gggttcgcca   2820
aggcagatat agagatggct gggcccatgg ccgcggtcgg tctgctaatt gtcagttacg   2880
tggtctcagg aaagagtgtg gacatgtaca ttgaaagagc aggtgacatc acatgggaaa   2940
aagatgcgga agtcactgga aacagtcccc ggctcgatgt ggcgctagat gagagtggtg   3000
atttctccct ggtggaggat gacggtcccc ccatgagaga gatcatactc aaggtggtcc   3060
tgatgaccat ctgtggcatg aacccaatag ccatacccctt tgcagctgga gcgtggtacg   3120
tatacgtgaa gactggaaaa aggagtggtg ctctatggga tgtgcctgct cccaaggaag   3180
taaaaaaggg ggagaccaca gatggagtgt acagagtaat gacgcgtaga ctgctaggtt   3240
caacacaagt tggagtggga gttatgcaag agggggtctt tcacactatg tggcacgtca   3300
```

```
caaaaggatc cgcgctgaga agcggtgaag ggagacttga tccatactgg ggagatgtca   3360
agcaggatct ggtgtcatac tgtggtccat ggaagctaga tgccgcctgg gatgggcaca   3420
gcgaggtgca gctcttggcc gtgccccccg gagagagagc gaggaacatc cagactctgc   3480
ccggaatatt taagacaaag gatggggaca ttggagcggt tgcgctggat tacccagcag   3540
gaacttcagg atctccaatc ctagacaagt gtgggagagt gataggactt tatggcaatg   3600
gggtcgtgat caaaaacggg agttatgtta gtgccatcac ccaagggagg agggaggaag   3660
agactcctgt tgagtgcttc gagccctcga tgctgaagaa gaagcagcta actgtcttag   3720
acttgcatcc tggagctggg aaaaccagga gagttcttcc tgaaatagtc cgtgaagcca   3780
taaaaacaag actccgtact gtgatcttag ctccaaccag ggttgtcgct gctgaaatgg   3840
aggaggccct tagagggctt ccagtgcgtt atatgacaac agcagtcaat gtcacccact   3900
ctggaacaga aatcgtcgac ttaatgtgcc atgccacctt cacttcacgt ctactacagc   3960
caatcagagt ccccaactat aatctgtata ttatggatga ggcccacttc acagatccct   4020
caagtatagc agcaagagga tacatttcaa caagggttga gatgggcgag gcggctgcca   4080
tcttcatgac cgccacgcca ccaggaaccc gtgacgcatt tccggactcc aactcaccaa   4140
ttatggacac cgaagtggaa gtcccagaga gagcctggag ctcaggcttt gattgggtga   4200
cggatcattc tggaaaaaca gtttggtttg ttccaagcgt gaggaacggc aatgagatcg   4260
cagcttgtct gacaaaggct ggaaaacggg tcatacagct cagcagaaag acttttgaga   4320
cagagttcca gaaaacaaaa catcaagagt gggactttgt cgtgacaact gacatttcag   4380
agatgggcgc caactttaaa gctgaccgtg tcatagattc caggagatgc ctaaagccgg   4440
tcatacttga tggcgagaga gtcattctgg ctggacccat gcctgtcaca catgccagcg   4500
ctgcccagag gagggggcgc ataggcagga atcccaacaa acctggagat gagtatctgt   4560
atggaggtgg gtgcgcagag actgacgaag accatgcaca ctggcttgaa gcaagaatgc   4620
tccttgacaa tatttacctc caagatggcc tcatagcctc gctctatcga cctgaggccg   4680
acaaagtagc agccattgag ggagagttca agcttaggac ggagcaaagg aagacctttg   4740
tggaactcat gaaaagagga gatcttcctg tttggctggc ctatcaggtt gcatctgccg   4800
gaataaccta cacagataga agatggtgct ttgatggcac gaccaacaac accataatgg   4860
aagacagtgt gccggcagag gtgtggacca gacacggaga gaaaagagtg ctcaaaccga   4920
ggtggatgga cgccagagtt tgttcagatc atgcggccct gaagtcattc aaggagtttg   4980
ccgctgggaa aagaggagcg gcttttggag tgatggaagc cctgggaaca ctgccaggac   5040
acatgacaga gagattccag gaagccattg acaacctcgc tgtgctcatg cgggcagaga   5100
ctggaagcag gccttacaaa gccgcggcgg cccaattgcc ggagacccta gagaccataa   5160
tgcttttggg gttgctggga acagtctcgc tgggaatctt cttcgtcttg atgaggaaca   5220
agggcatagg gaagatgggc tttggaatgg tgactcttgg ggccagcgca tggctcatgt   5280
ggctctcgga aattgagcca gccagaattg catgtgtcct cattgttgtg ttcctattgc   5340
tggtggtgct catacctgag ccagaaaagc aaagatctcc ccaggacaac caaatggcaa   5400
tcatcatcat ggtagcagta ggtcttctgg gcttgattac cgccaatgaa ctcggatggt   5460
tggagagaac aaagagtgac ctaagccatc taatgggaag gagagaggag gggggcaacca   5520
taggattctc aatggacatt gacctgcggc cagcctcagc ttgggccatc tatgctgcct   5580
tgacaacttt cattacccca gccgtccaac atgcagtgac cacctcatac aacaactact   5640
```

```
ccttaatggc gatggccacg caagctggag tgttgtttgg catgggcaaa gggatgccat   5700
tctacgcatg ggactttgga gtcccgctgc taatgatagg ttgctactca caattaacac   5760
ccctgaccct aatagtggcc atcattttgc tcgtggcgca ctacatgtac ttgatcccag   5820
gcctgcaggc agcagctgcg cgtgctgccc agaagagaac ggcagctggc atcatgaaga   5880
accctgttgt ggatggaata gtggtgactg acattgacac aatgacaatt gacccccaag   5940
tggagaaaaa gatgggacag gtgctactca tagcagtagc cgtctccagc gccatactgt   6000
cgcggaccgc ctgggggtgg ggggaggctg gggctctgat cacagccgca acttccactt   6060
tgtgggaagg ctctccgaac aagtactgga actcctctac agccacttca ctgtgtaaca   6120
tttttagggg aagttacttg gctggagctt ctctaatcta cacagtaaca agaaacgctg   6180
gcttggtcaa gagacgtggg ggtggaacag gagagaccct gggagagaaa tggaaggccc   6240
gcttgaacca gatgtcggcc ctggagttct actcctacaa aaagtcaggc atcaccgagg   6300
tgtgcagaga agaggcccgc cgcgccctca aggacggtgt ggcaacggga ggccatgctg   6360
tgtcccgagg aagtgcaaag ctgagatggt tggtggagcg gggatacctg cagccctatg   6420
gaaaggtcat tgatcttgga tgtggcagag gggctggagt ttactacgtc gccaccatcc   6480
gcaaagttca agaagtgaaa ggatacacaa aaggaggccc tggtcatgaa gaacccgtgt   6540
tggtgcaaag ctatgggtgg aacatagtcc gtcttaagag tggggtggac gtctttcata   6600
tggcggctga gccgtgtgac acgttgctgt gtgacatagg tgagtcatca tctagtcctg   6660
aagtggaaga agcacggacg ctcagagtcc tctccatggt gggggattgg cttgaaaaaa   6720
gaccaggagc cttttgtata aaagtgttgt gcccatacac cagcactatg atggaaaccc   6780
tggagcgact gcagcgtagg tatgggggag gactggtcag agtgccactc tcccgcaact   6840
ctacacatga gatgtactgg gtctctggag cgaaaagcaa caccataaaa agtgtgtcca   6900
ccacgagcca gctcctcttg ggcgcatgg acgggcctag gaggccagtg aaatatgagg   6960
aggatgtgaa tctcggctct ggcacgcggg ctgtggtaag ctgcgctgaa gctcccaaca   7020
tgaagatcat tggtaaccgc attgaaagga tccgcagtga gcacgcggaa acgtggttct   7080
ttgacgagaa ccacccatat aggacatggg cttaccatgg aagctatgag gcccccacac   7140
aagggtcagc gtcctctcta ataaacgggg ttgtcaggct cctgtcaaaa ccctgggatg   7200
tggtgactgg agtcacagga atagccatga ccgacaccac accgtatggt cagcaaagag   7260
ttttcaagga aaaagtggac actagggtgc cagaccccca agaaggcact cgtcaggtta   7320
tgagcatggt ctcttcctgg ttgtggaaag agctaggcaa acacaaacgg ccacgagtct   7380
gcaccaaaga agagttcatc aacaaggttc gtagcaatgc agcattaggg gcaatatttg   7440
aagaggaaaa agagtggaag actgcagtgg aagctgtgaa cgatccaagg ttctgggctc   7500
tagtggacaa ggaaagagag caccacctga gaggagagtg ccagagctgt gtgtacaaca   7560
tgatgggaaa aagagaaaag aaacaagggg aatttggaaa ggccaagggc agccgcgcca   7620
tctggtatat gtggctaggg gctagatttc tagagtttga agcccttgga ttcttgaacg   7680
aggatcactg gatggggaga gagaactcag gaggtggtgt tgaagggctg ggattacaaa   7740
gactcggata tgtcctagaa gagatgagtc gtataccagg aggaaggatg tatgcagatg   7800
acactgctgg ctgggacacc cgcattagca ggtttgatct ggagaatgaa gctctaatca   7860
ccaaccaaat ggagaaaggg cacagggcct tggcattggc cataatcaag tacacatacc   7920
aaaacaaagt ggtaaaggtc cttagaccag ctgaaaaagg gaaaacagtt atggacatta   7980
tttcgagaca agaccaaagg gggagcggac aagttgtcac ttacgctctt aacacattta   8040
```

```
ccaacctagt ggtgcaactc attcggaata tggaggctga ggaagttcta gagatgcaag   8100
acttgtggct gctgcggagg tcagagaaag tgaccaactg gttgcagagc aacggatggg   8160
ataggctcaa acgaatggca gtcagtggag atgattgcgt tgtgaagcca attgatgata   8220
ggtttgcaca tgccctcagg ttcttgaatg atatgggaaa agttaggaag gacacacaag   8280
agtggaaacc ctcaactgga tgggacaact gggaagaagt tccgttttgc tcccaccact   8340
tcaacaagct ccatctcaag gacgggaggt ccattgtggt tccctgccgc caccaagatg   8400
aactgattgg ccgggcccgc gtctctccag gggcgggatg gagcatccgg gagactgctt   8460
gcctagcaaa atcatatgcg caaatgtggc agctccttta tttccacaga agggacctcc   8520
gactgatggc caatgccatt tgttcatctg tgccagttga ctgggttcca actgggagaa   8580
ctacctggtc aatccatgga aagggagaat ggatgaccac tgaagacatg cttgtggtgt   8640
ggaacagagt gtggattgag gagaacgacc acatggaaga caagacccca gttacgaaat   8700
ggacagacat tccctatttg ggaaaaaggg aagacttgtg gtgtggatct ctcatagggc   8760
acagaccgcg caccacctgg gctgagaaca ttaaaaacac agtcaacatg gtgcgcagga   8820
tcataggtga tgaagaaaag tacatggact acctatccac ccaagttcgc tacttgggtg   8880
aagaagggtc tacacctgga gtgctgtaag caccaatctt aatgttgtca ggcctgctag   8940
tcagccacag cttggggaaa gctgtgcagc ctgtgacccc cccaggagaa gctgggaaac   9000
caagcctata gtcaggccga gaacgccatg gcacggaaga agccatgctg cctgtgagcc   9060
cctcagagga cactgagtca aaaaacccca cgcgcttgga ggcgcaggat gggaaaagaa   9120
ggtggcgacc ttccccaccc ttcaatctgg ggcctgaact ggagatcagc tgtggatctc   9180
cagaagaggg actagtggtt agaggagacc ccccggaaaa cgcaaaacag catattgacg   9240
ctgggaaaga ccagagactc catgagtttc caccacgctg gccgccaggc acagatcgcc   9300
gaatagcggc ggccggtgtg gggaaatcca tgggtctggg tcggcatggc atctccacct   9360
cctcgcggtc cgacctgggc atccgaagga ggacgcacgt ccactcggat ggctaaggga   9420
gttcgaatct catgtttgac agcttattaa ttaagactcg cgacagacat gataagatac   9480
attgatgagt ttggacaaac cacaactaga atgcagtgaa aaaaatgctt tatttgtgaa   9540
atttgtgatg ctattgcttt atttgtaacc attataagct gcaataaaca agttaacaac   9600
aacaattgca ttcattttat gtttcaggtt cagggggaga tgtgggaggt tttttaaagc   9660
aagtaaaacc tctacaaatg tgtcatcgat aagctttaat gcggtagttt atcacagtta   9720
aattgctaac gcagtcaggc accgtgtatg aaatctaaca atgcgctcat cgtcatcctc   9780
ggcaccgtca ccctggatgc tgtaggcata ggcttggtta tgccggtact gccgggcctc   9840
ttgcgggata tcgtccattc cgacagcatc gccagtcact atggcgtgct gctagcgcta   9900
tatgcgttga tgcaatttct atgcgcaccc gttctcggag cactgtccga ccgctttggc   9960
cgccgcccag tcctgctcgc ttcgctactt ggagccacta tcgactacgc gatcatggcg  10020
accacacccg tcctgtggat cctctacgcc ggacgcatcg tggccggcat caccggcgcc  10080
acaggtgcgg ttgctggcgc ctatatcgcc gacatcaccg atggggaaga tcgggctcgc  10140
cacttcgggc tcatgagcgc ttgtttcggc gtgggtatgg tggcaggccc cgtggccggg  10200
ggactgttgg gcgccatctc cttgcatgca ccattccttg cggcggcggt gctcaacggc  10260
ctcaacctac tactgggctg cttcctaatg caggagtcgc ataagggaga gcgtcgaccg  10320
atgcccttga gagccttcaa cccagtcagc tccttccggt gggcgcgggg catgactatc  10380
```

gtcgccgcac ttatgactgt cttctttatc atgcaactcg taggacaggt gccggcagcg 10440
ctctgggtca ttttcggcga ggaccgcttt cgctggagcg cgacgatgat cggcctgtcg 10500
cttgcggtat tcggaatctt gcacgccctc gctcaagcct tcgtcactgg tcccgccacc 10560
aaacgtttcg gcgagaagca ggccattatc gccggcatgg cggccgacgc gctgggctac 10620
gtcttgctgg cgttcgcgac gcgaggctgg atggccttcc ccattatgat tcttctcgct 10680
tccggcggca tcgggatgcc cgcgttgcag gccatgctgt ccaggcaggt agatgacgac 10740
catcagggac agcttcaagg atcgctcgcg gctcttacca gcctaacttc gatcactgga 10800
ccgctgatcg tcacggcgat ttatgccgcc tcggcgagca catggaacgg gttggcatgg 10860
attgtaggcg ccgccctata ccttgtctgc ctccccgcgt tgcgtcgcgg tgcatggagc 10920
cgggccacct cgacctgaat ggaagccggc ggcacctcgc taacggattc accactccaa 10980
gaattggagc caatcaattc ttgcggagaa ctgtgaatgc gcaaaccaac ccttggcaga 11040
acatatccat cgcgtccgcc atctccagca gccgcacgcg gcgcatctcg ggcagcgttg 11100
ggtcctggcc acgggtgcgc atgatcgtgc tcctgtcgtt gaggacccgg ctaggctggc 11160
ggggttgcct tactggttag cagaatgaat caccgatacg cgagcgaacg tgaagcgact 11220
gctgctgcaa aacgtctgcg acctgagcaa caacatgaat ggtcttcggt ttccgtgttt 11280
cgtaaagtct ggaaacgcgg aagtcagcgc cctgcaccat tatgttccgg atctgcatcg 11340
caggatgctg ctggctaccc tgtggaacac ctacatctgt attaacgaag cgctggcatt 11400
gaccctgagt gatttttctc tggtcccgcc gcatccatac cgccagttgt ttaccctcac 11460
aacgttccag taaccgggca tgttcatcat cagtaacccg tatcgtgagc atcctctctc 11520
gtttcatcgg tatcattacc cccatgaaca gaaatccccc ttacacggag gcatcagtga 11580
ccaaacagga aaaaaccgcc cttaacatgg cccgctttat cagaagccag acattaacgc 11640
ttctggagaa actcaacgag ctggacgcgg atgaacaggc agacatctgt gaatcgcttc 11700
acgaccacgc tgatgagctt taccgcagct gcctcgcgcg tttcggtgat gacggtgaaa 11760
acctctgaca catgcagctc ccggagacgg tcacagcttg tctgtaagcg gatgccggga 11820
gcagacaagc ccgtcagggc gcgtcagcgg gtgttggcgg gtgtcggggc gcagccatga 11880
cccagtcacg tagcgatagc ggagtgtata ctggcttaac tatgcggcat cagagcagat 11940
tgtactgaga gtgcaccata tgcggtgtga aataccgcac agatgcgtaa ggagaaaata 12000
ccgcatcagg cgctcttccg cttcctcgct cactgactcg ctgcgctcgg tcgttcggct 12060
gcggcgagcg gtatcagctc actcaaaggc ggtaatacgg ttatccacag aatcagggga 12120
taacgcagga aagaacatgt gagcaaaagg ccagcaaaag gccaggaacc gtaaaaaggc 12180
cgcgttgctg gcgtttttcc ataggctccg cccccctgac gagcatcaca aaaatcgacg 12240
ctcaagtcag aggtggcgaa acccgacagg actataaaga taccaggcgt ttccccctgg 12300
aagctccctc gtgcgctctc ctgttccgac cctgccgctt accggatacc tgtccgcctt 12360
tctcccttcg ggaagcgtgg cgctttctca tagctcacgc tgtaggtatc tcagttcggt 12420
gtaggtcgtt cgctccaagc tgggctgtgt gcacgaaccc cccgttcagc ccgaccgctg 12480
cgccttatcc ggtaactatc gtcttgagtc caacccggta agacacgact tatcgccact 12540
ggcagcagcc actggtaaca ggattagcag agcgaggtat gtaggcggtg ctacagagtt 12600
cttgaagtgg tggcctaact acggctacac tagaaggaca gtatttggta tctgcgctct 12660
gctgaagcca gttaccttcg gaaaaagagt tggtagctct tgatccggca aacaaaccac 12720
cgctggtagc ggtggttttt ttgtttgcaa gcagcagatt acgcgcagaa aaaaaggatc 12780
tcaagaagat cctttgatct tttctacggg gtctgacgct cagtggaacg aaaactcacg 12840
ttaagggatt ttggtcatga gattatcaaa aaggatcttc acctagatcc ttttaaatta 12900
aaaatgaagt tttaaatcaa tctaaagtat atatgagtaa acttggtctg acagttacca 12960
atgcttaatc agtgaggcac ctatctcagc gatctgtcta tttcgttcat ccatagttgc 13020
ctgactcccc gtcgtgtaga taactacgat acgggagggc ttaccatctg gccccagtgc 13080
tgcaatgata ccgcgagacc cacgctcacc ggctccagat ttatcagcaa taaaccagcc 13140
agccggaagg gccgagcgca gaagtggtcc tgcaacttta tccgcctcca tccagtctat 13200
taattgttgc cgggaagcta gagtaagtag ttcgccagtt aatagtttgc gcaacgttgt 13260
tgccattgct gcaggcatcg tggtgtcacg ctcgtcgttt ggtatggctt cattcagctc 13320
cggttcccaa cgatcaaggc gagttacatg atcccccatg ttgtgcaaaa aagcggttag 13380
ctccttcggt cctccgatcg ttgtcagaag taagttggcc gcagtgttat cactcatggt 13440
tatggcagca ctgcataatt ctcttactgt catgccatcc gtaagatgct tttctgtgac 13500
tggtgagtac tcaaccaagt cattctgaga atagtgtatg cggcgaccga gttgctcttg 13560
cccggcgtca acacgggata ataccgcgcc acatagcaga actttaaaag tgctcatcat 13620
tggaaaacgt tcttcggggc gaaaactctc aaggatctta ccgctgttga gatccagttc 13680
gatgtaaccc actcgtgcac ccaactgatc ttcagcatct tttactttca ccagcgtttc 13740
tgggtgagca aaaacaggaa ggcaaaatgc cgcaaaaaag ggaataaggg cgacacggaa 13800
atgttgaata ctcatactct tcctttttca atattattga agcatttatc agggttattg 13860
tctcatgagc ggatacatat ttgaatgtat ttagaaaaat aaacaaatag gggttccgcg 13920
cacatttccc cgaaaagtgc cacctgacgt ctaagaaacc attattatca tgacattaac 13980
ctataaaaat aggcgtatca cgaggccctt tcgtcttcaa 14020

<210> SEQ ID NO 8
<211> LENGTH: 8947
<212> TYPE: DNA
<213> ORGANISM: Artificial Sequence
<220> FEATURE:
<223> OTHER INFORMATION: ZV-CCL5 construct

<400> SEQUENCE: 8
agttgttgat ctgtgtgaat cagactgcga cagttcgagt ttgaagcgaa agctagcaac 60
agtatcaaca ggttttattt tggatttgga aacgagagtt tctggtcatg aaaaacccaa 120
aaaagaaatc cggaggattc cggattgtca atatgctaaa acgcggagta gcccgtgtga 180
gcatgaaggt ctccgcggca gccctcgctg tcatcctcat tgctactgcc ctctgcgctc 240
ctgcatctgc ctccccatat tcctcggaca ccacaccctg ctgctttgcc tacattgccc 300
gcccactgcc ccgtgcccac atcaaggagt atttctacac cagtggcaag tgctccaacc 360
cagcagtcgt ctttgtcacc cgaaagaacc gccaagtgtg tgccaaccca gagaagaaat 420
gggttcggga gtacatcaac tctttggaga tgagcagtgg gggctccggc gtgaaacaga 480
ctttgaattt tgaccttctc aagttggccg gagacgtcga gtccaaccct gggcccgcgg 540
ccgccctgaa cacaaagaat ggatctattt cccttatgtg cttggcctta gggggagtgt 600
tgatcttctt atccacagcc gtctctgctg atgtggggtg ctcggtggac ttctcaaaga 660
aggagacgag atgcggtacc ggggtgttcg tctataacga cgttgaagcc tggagggaca 720
ggtacaagta ccatcctgac tccccccgta gattggcagc agcagtcaag caagcctggg 780

-continued

```
aagatggtat ctgcgggatc tcctctgttt caagaatgga aaacatcatg tggagatcag    840
tagaagggga gctcaacgca atcctggaag agaatggagt tcaactgacg gtcgttgtgg    900
gatctgtaaa aaaccccatg ggagaggtc cacagagatt gcccgtgcct gtgaacgagc     960
tgccccacgg ctggaaggct tgggggaaat cgtatttcgt cagagcagca aagacaaata   1020
acagctttgt cgtggatggt gacacactga aggaatgccc actcaaacat agagcatgga   1080
acagctttct tgtggaggat catgggttcg ggtatttca cactagtgtc tggctcaagg    1140
ttagagaaga ttattcatta gagtgtgatc cagccgttat tggaacagct gttaagggaa   1200
aggaggctgt acacagtgat ctaggctact ggattgagag tgagaagaat gacacatgga   1260
ggctgaagag ggcccatctg atcgagatga aaacatgtga atggccaaag tcccacacat   1320
tgtggacaga tggaatagaa gagagtgatc tgatcatacc caagtcttta gctgggccac   1380
tcagccatca caataccaga gagggctaca ggacccaaat gaaagggcca tggcacagtg   1440
aagagcttga aattcggttt gaggaatgcc caggcactaa ggtccacgtg gaggaaacat   1500
gtggaacaag aggaccatct ctgagatcaa ccactgcaag cggaagggtg atcgaggaat   1560
ggtgctgcag ggagtgcaca atgcccccac tgtcgttccg ggctaaagat ggctgttggt   1620
atggaatgga gataaggccc aggaaagaac cagaaagcaa cttagtaagg tcaatggtga   1680
ctgcaggatc aactgatcac atggaccact tctcccttgg agtgcttgtg atcctgctca   1740
tggtgcagga agggctgaag aagagaatga ccacaaagat catcataagc acatcaatgg   1800
cagtgctggt agctatgatc ctgggaggat tttcaatgag tgacctggct aagcttgcaa   1860
ttttgatggg tgccaccttc gcggaaatga acactggagg agatgtagct catctggcgc   1920
tgatagcggc attcaaagtc agaccagcgt tgctggtatc tttcatcttc agagctaatt   1980
ggacaccccg tgaaagcatg ctgctggcct tggcctcgtg tcttttgcaa actgcgatct   2040
ccgccttgga aggcgacctg atggttctca tcaatggttt tgctttggcc tggttggcaa   2100
tacgagcgat ggttgttcca cgcactgata acatcacctt ggcaatcctg gctgctctga   2160
caccactggc ccggggcaca ctgcttgtgg cgtggagagc aggccttgct acttgcgggg   2220
ggtttatgct cctctctctg aagggaaaag gcagtgtgaa gaagaactta ccatttgtca   2280
tggccctggg actaaccgct gtgaggctgg tcgaccccat caacgtggtg ggactgctgt   2340
tgctcacaag gagtgggaag cggagctggc cccctagcga agtactcaca gctgttggcc   2400
tgatatgcgc attggctgga gggttcgcca aggcagatat agagatggct gggcccatgg   2460
ccgcggtcgg tctgctaatt gtcagttacg tggtctcagg aaagagtgtg gacatgtaca   2520
ttgaaagagc aggtgacatc acatgggaaa aagatgcgga agtcactgga aacagtcccc   2580
ggctcgatgt ggcgctagat gagagtggtg atttctccct ggtggaggat gacggtcccc   2640
ccatgagaga gatcatactc aaggtggtcc tgatgaccat ctgtggcatg aacccaatag   2700
ccataccctt tgcagctgga gcgtggtacg tatacgtgaa gactggaaaa aggagtggtg   2760
ctctatggga tgtgcctgct cccaaggaag taaaaaaggg ggagaccaca gatggagtgt   2820
acagagtaat gacgcgtaga ctgctaggtt caacacaagt tggagtggga gttatgcaag   2880
agggggtctt tcacactatg tggcacgtca caaaaggatc cgcgctgaga agcggtgaag   2940
ggagacttga tccatactgg ggagatgtca agcaggatct ggtgtcatac tgtggtccat   3000
ggaagctaga tgccgcctgg gatgggcaca gcgaggtgca gctcttggcc gtgccccccg   3060
gagagagagc gaggaacatc cagactctgc ccggaatatt taagacaaag gatggggaca   3120
ttggagcggt tgcgctggat tacccagcag gaacttcagg atctccaatc ctagacaagt   3180
```

gtgggagagt gataggactt tatggcaatg gggtcgtgat caaaaacggg agttatgtta 3240
gtgccatcac ccaagggagg agggaggaag agactcctgt tgagtgcttc gagccctcga 3300
tgctgaagaa gaagcagcta actgtcttag acttgcatcc tggagctggg aaaaccagga 3360
gagttcttcc tgaaatagtc cgtgaagcca taaaaacaag actccgtact gtgatcttag 3420
ctccaaccag ggttgtcgct gctgaaatgg aggaggccct tagagggctt ccagtgcgtt 3480
atatgacaac agcagtcaat gtcacccact ctggaacaga aatcgtcgac ttaatgtgcc 3540
atgccacctt cacttcacgt ctactacagc caatcagagt ccccaactat aatctgtata 3600
ttatggatga ggcccacttc acagatccct caagtatagc agcaagagga tacatttcaa 3660
caagggttga gatgggcgag gcggctgcca tcttcatgac cgccacgcca ccaggaaccc 3720
gtgacgcatt tccggactcc aactcaccaa ttatggacac cgaagtggaa gtcccagaga 3780
gagcctggag ctcaggcttt gattgggtga cggatcattc tggaaaaaca gtttggtttg 3840
ttccaagcgt gaggaacggc aatgagatcg cagcttgtct gacaaaggct ggaaaacggg 3900
tcatacagct cagcagaaag acttttgaga cagagttcca gaaaacaaaa catcaagagt 3960
gggactttgt cgtgacaact gacatttcag agatgggcgc caactttaaa gctgaccgtg 4020
tcatagattc caggagatgc ctaaagccgg tcatacttga tggcgagaga gtcattctgg 4080
ctggacccat gcctgtcaca catgccagcg ctgcccagag gagggggcgc ataggcagga 4140
atcccaacaa acctggagat gagtatctgt atggaggtgg gtgcgcagag actgacgaag 4200
accatgcaca ctggcttgaa gcaagaatgc tccttgacaa tatttacctc caagatggcc 4260
tcatagcctc gctctatcga cctgaggccg acaaagtagc agccattgag ggagagttca 4320
agcttaggac ggagcaaagg aagacctttg tggaactcat gaaaagagga gatcttcctg 4380
tttggctggc ctatcaggtt gcatctgccg gaataaccta cacagataga agatggtgct 4440
ttgatggcac gaccaacaac accataatgg aagacagtgt gccggcagag gtgtggacca 4500
gacacggaga gaaaagagtg ctcaaaccga ggtggatgga cgccagagtt tgttcagatc 4560
atgcggccct gaagtcattc aaggagtttg ccgctgggaa aagaggagcg gcttttggag 4620
tgatggaagc cctgggaaca ctgccaggac acatgacaga gagattccag gaagccattg 4680
acaacctcgc tgtgctcatg cgggcagaga ctggaagcag gccttacaaa gccgcggcgg 4740
cccaattgcc ggagacccta gagaccataa tgcttttggg gttgctggga acagtctcgc 4800
tgggaatctt cttcgtcttg atgaggaaca agggcatagg gaagatgggc tttggaatgg 4860
tgactcttgg ggccagcgca tggctcatgt ggctctcgga aattgagcca gccagaattg 4920
catgtgtcct cattgttgtg ttcctattgc tggtggtgct catacctgag ccagaaaagc 4980
aaagatctcc ccaggacaac caaatggcaa tcatcatcat ggtagcagta ggtcttctgg 5040
gcttgattac cgccaatgaa ctcggatggt tggagagaac aaagagtgac ctaagccatc 5100
taatgggaag gagagaggag gggggcaacca taggattctc aatggacatt gacctgcggc 5160
cagcctcagc ttgggccatc tatgctgcct tgacaacttt cattacccca gccgtccaac 5220
atgcagtgac cacctcatac aacaactact ccttaatggc gatggccacg caagctggag 5280
tgttgtttgg catgggcaaa gggatgccat tctacgcatg ggactttgga gtcccgctgc 5340
taatgataggg ttgctactca caattaacac ccctgaccct aatagtggcc atcattttgc 5400
tcgtggcgca ctacatgtac ttgatcccag gcctgcaggc agcagctgcg cgtgctgccc 5460
agaagagaac ggcagctggc atcatgaaga accctgttgt ggatggaata gtggtgactg 5520

```
acattgacac aatgacaatt gacccccaag tggagaaaaa gatgggacag gtgctactca   5580
tagcagtagc cgtctccagc gccatactgt cgcggaccgc ctgggggtgg ggggaggctg   5640
gggctctgat cacagccgca acttccactt tgtgggaagg ctctccgaac aagtactgga   5700
actcctctac agccacttca ctgtgtaaca tttttagggg aagttacttg gctggagctt   5760
ctctaatcta cacagtaaca agaaacgctg gcttggtcaa gagacgtggg ggtggaacag   5820
gagagaccct gggagagaaa tggaaggccc gcttgaacca gatgtcggcc ctggagttct   5880
actcctacaa aaagtcaggc atcaccgagg tgtgcagaga agaggcccgc cgcgccctca   5940
aggacggtgt ggcaacggga ggccatgctg tgtcccgagg aagtgcaaag ctgagatggt   6000
tggtggagcg gggatacctg cagccctatg gaaaggtcat tgatcttgga tgtggcagag   6060
ggggctggag ttactacgtc gccaccatcc gcaaagttca agaagtgaaa ggatacacaa   6120
aaggaggccc tggtcatgaa gaacccgtgt tggtgcaaag ctatgggtgg aacatagtcc   6180
gtcttaagag tggggtggac gtctttcata tggcggctga gccgtgtgac acgttgctgt   6240
gtgacatagg tgagtcatca tctagtcctg aagtggaaga agcacggacg ctcagagtcc   6300
tctccatggt gggggattgg cttgaaaaaa gaccaggagc cttttgtata aaagtgttgt   6360
gcccatacac cagcactatg atggaaaccc tggagcgact gcagcgtagg tatgggggag   6420
gactggtcag agtgccactc tcccgcaact ctacacatga gatgtactgg gtctctggag   6480
cgaaaagcaa caccataaaa agtgtgtcca ccacgagcca gctcctcttg ggcgcatgg    6540
acgggcctag gaggccagtg aaatatgagg aggatgtgaa tctcggctct ggcacgcggg   6600
ctgtggtaag ctgcgctgaa gctcccaaca tgaagatcat tggtaaccgc attgaaagga   6660
tccgcagtga gcacgcggaa acgtggttct ttgacgagaa ccacccatat aggacatggg   6720
cttaccatgg aagctatgag gcccccacac aagggtcagc gtcctctcta ataaacgggg   6780
ttgtcaggct cctgtcaaaa ccctgggatg tggtgactgg agtcacagga atagccatga   6840
ccgacaccac accgtatggt cagcaaagag ttttcaagga aaaagtggac actagggtgc   6900
cagaccccca agaaggcact cgtcaggtta tgagcatggt ctcttcctgg ttgtggaaag   6960
agctaggcaa acacaaacgg ccacgagtct gcaccaaaga agagttcatc aacaaggttc   7020
gtagcaatgc agcattaggg gcaatatttg aagaggaaaa agagtggaag actgcagtgg   7080
aagctgtgaa cgatccaagg ttctgggctc tagtggacaa ggaaagagag caccacctga   7140
gaggagagtg ccagagctgt gtgtacaaca tgatgggaaa aagagaaaag aaacaagggg   7200
aatttggaaa ggccaagggc agccgcgcca tctggtatat gtggctaggg gctagatttc   7260
tagagtttga agcccttgga ttcttgaacg aggatcactg gatggggaga gagaactcag   7320
gaggtggtgt tgaagggctg ggattacaaa gactcggata tgtcctagaa gagatgagtc   7380
gtataccagg aggaaggatg tatgcagatg acactgctgg ctgggacacc cgcattagca   7440
ggtttgatct ggagaatgaa gctctaatca ccaaccaaat ggagaaaggg cacagggcct   7500
tggcattggc cataatcaag tacacatacc aaaacaaagt ggtaaaggtc cttagaccag   7560
ctgaaaaagg gaaaacagtt atggacatta tttcgagaca agaccaaagg gggagcggac   7620
aagttgtcac ttacgctctt aacacattta ccaacctagt ggtgcaactc attcggaata   7680
tggaggctga ggaagttcta gagatgcaag acttgtggct gctgcggagg tcagagaaag   7740
tgaccaactg gttgcagagc aacggatggg ataggctcaa acgaatggca gtcagtggag   7800
atgattgcgt tgtgaagcca attgatgata ggtttgcaca tgccctcagg ttcttgaatg   7860
atatgggaaa agttaggaag gacacacaag agtggaaacc ctcaactgga tgggacaact   7920
```

gggaagaagt tccgttttgc tcccaccact tcaacaagct ccatctcaag gacgggaggt 7980
ccattgtggt tccctgccgc caccaagatg aactgattgg ccgggcccgc gtctctccag 8040
gggcgggatg gagcatccgg gagactgctt gcctagcaaa atcatatgcg caaatgtggc 8100
agctccttta tttccacaga agggacctcc gactgatggc caatgccatt tgttcatctg 8160
tgccagttga ctgggttcca actgggagaa ctacctggtc aatccatgga aagggagaat 8220
ggatgaccac tgaagacatg cttgtggtgt ggaacagagt gtggattgag gagaacgacc 8280
acatggaaga caagacccca gttacgaaat ggacagacat tccctatttg ggaaaaaggg 8340
aagacttgtg gtgtggatct ctcatagggc acagaccgcg caccacctgg gctgagaaca 8400
ttaaaaacac agtcaacatg gtgcgcagga tcataggtga tgaagaaaag tacatggact 8460
acctatccac ccaagttcgc tacttgggtg aagaagggtc tacacctgga gtgctgtaag 8520
caccaatctt aatgttgtca ggcctgctag tcagccacag cttggggaaa gctgtgcagc 8580
ctgtgacccc cccaggagaa gctgggaaac caagcctata gtcaggccga gaacgccatg 8640
gcacggaaga agccatgctg cctgtgagcc cctcagagga cactgagtca aaaaacccca 8700
cgcgcttgga ggcgcaggat gggaaaagaa ggtggcgacc ttccccaccc ttcaatctgg 8760
ggcctgaact ggagatcagc tgtggatctc cagaagaggg actagtggtt agaggagacc 8820
ccccggaaaa cgcaaaacag catattgacg ctgggaaaga ccagagactc catgagtttc 8880
caccacgctg gccgccaggc acagatcgcc gaatagcggc ggccggtgtg gggaaatcca 8940
tgggtct 8947

<210> SEQ ID NO 9
<211> LENGTH: 9253
<212> TYPE: DNA
<213> ORGANISM: Artificial Sequence
<220> FEATURE:
<223> OTHER INFORMATION: ZV-IL18 construct

<400> SEQUENCE: 9
agttgttgat ctgtgtgaat cagactgcga cagttcgagt ttgaagcgaa agctagcaac 60
agtatcaaca ggttttattt tggatttgga aacgagagtt tctggtcatg aaaaacccaa 120
aaaagaaatc cggaggattc cggattgtca atatgctaaa acgcggagta gcccgtgtga 180
gcatggctgc tgaaccagta gaagacaatt gcatcaactt tgtggcaatg aaatttattg 240
acaatacgct ttactttata gctgaagatg atgaaaacct ggaatcagat tactttggca 300
agcttgaatc taaattatca gtcataagaa atttgaatga ccaagttctc ttcattgacc 360
aaggaaatcg gcctctattt gaagatatga ctgattctga ctgtagagat aatgcacccc 420
ggaccatatt tattataagt atgtataaag atagccagcc tagaggtatg gctgtaacta 480
tctctgtgaa gtgtgagaaa atttcaactc tctcctgtga gaacaaaatt atttccttta 540
aggaaatgaa tcctcctgat aacatcaagg atacaaaaag tgacatcata ttctttcaga 600
gaagtgtccc aggacatgat aataagatgc aatttgaatc ttcatcatac gaaggatact 660
ttctagcttg tgaaaaagag agagaccttt ttaaactcat tttgaaaaaa gaggatgaat 720
tgggggatag atctataatg ttcactgttc aaaacgaaga cagtgggggc tccggcgtga 780
aacagacttt gaattttgac cttctcaagt tggccggaga cgtcgagtcc aaccctgggc 840
ccgcggccgc cctgaacaca aagaatggat ctatttccct tatgtgcttg gccttagggg 900
gagtgttgat cttcttatcc acagccgtct ctgctgatgt ggggtgctcg gtggacttct 960

-continued

```
caaagaagga gacgagatgc ggtaccgggg tgttcgtcta taacgacgtt gaagcctgga   1020
gggacaggta caagtaccat cctgactccc cccgtagatt ggcagcagca gtcaagcaag   1080
cctgggaaga tggtatctgc gggatctcct ctgtttcaag aatggaaaac atcatgtgga   1140
gatcagtaga aggggagctc aacgcaatcc tggaagagaa tggagttcaa ctgacggtcg   1200
ttgtgggatc tgtaaaaaac cccatgggga gaggtccaca gagattgccc gtgcctgtga   1260
acgagctgcc ccacggctgg aaggcttggg ggaaatcgta tttcgtcaga gcagcaaaga   1320
caaataacag ctttgtcgtg gatggtgaca cactgaagga atgcccactc aaacatagag   1380
catggaacag ctttcttgtg gaggatcatg ggttcggggt atttcacact agtgtctggc   1440
tcaaggttag agaagattat tcattagagt gtgatccagc cgttattgga acagctgtta   1500
agggaaagga ggctgtacac agtgatctag gctactggat tgagagtgag aagaatgaca   1560
catggaggct gaagagggcc catctgatcg agatgaaaac atgtgaatgg ccaaagtccc   1620
acacattgtg gacagatgga atagaagaga gtgatctgat catacccaag tctttagctg   1680
ggccactcag ccatcacaat accagagagg gctacaggac ccaaatgaaa gggccatggc   1740
acagtgaaga gcttgaaatt cggtttgagg aatgcccagg cactaaggtc cacgtggagg   1800
aaacatgtgg aacaagagga ccatctctga gatcaaccac tgcaagcgga agggtgatcg   1860
aggaatggtg ctgcagggag tgcacaatgc cccactgtc gttccgggct aaagatggct   1920
gttggtatgg aatggagata aggcccagga aagaaccaga aagcaactta gtaaggtcaa   1980
tggtgactgc aggatcaact gatcacatgg accacttctc ccttggagtg cttgtgatcc   2040
tgctcatggt gcaggaaggg ctgaagaaga gaatgaccac aaagatcatc ataagcacat   2100
caatggcagt gctggtagct atgatcctgg gaggattttc aatgagtgac ctggctaagc   2160
ttgcaatttt gatgggtgcc accttcgcgg aaatgaacac tggaggagat gtagctcatc   2220
tggcgctgat agcggcattc aaagtcagac cagcgttgct ggtatctttc atcttcagag   2280
ctaattggac accccgtgaa agcatgctgc tggccttggc ctcgtgtctt ttgcaaactg   2340
cgatctccgc cttggaaggc gacctgatgg ttctcatcaa tggttttgct ttggcctggt   2400
tggcaatacg agcgatggtt gttccacgca ctgataacat caccttggca atcctggctg   2460
ctctgacacc actggcccgg ggcacactgc ttgtggcgtg gagagcaggc cttgctactt   2520
gcggggggtt tatgctcctc tctctgaagg gaaaaggcag tgtgaagaag aacttaccat   2580
ttgtcatggc cctgggacta accgctgtga ggctggtcga ccccatcaac gtggtgggac   2640
tgctgttgct cacaaggagt gggaagcgga gctggccccc tagcgaagta ctcacagctg   2700
ttggcctgat atgcgcattg gctggagggt tcgccaaggc agatatagag atggctgggc   2760
ccatggccgc ggtcggtctg ctaattgtca gttacgtggt ctcaggaaag agtgtggaca   2820
tgtacattga aagagcaggt gacatcacat gggaaaaaga tgcggaagtc actggaaaca   2880
gtccccggct cgatgtggcg ctagatgaga gtggtgattt ctccctggtg gaggatgacg   2940
gtccccccat gagagagatc atactcaagg tggtcctgat gaccatctgt ggcatgaacc   3000
caatagccat accctttgca gctggagcgt ggtacgtata cgtgaagact ggaaaaagga   3060
gtggtgctct atgggatgtg cctgctccca aggaagtaaa aaagggggag accacagatg   3120
gagtgtacag agtaatgacg cgtagactgc taggttcaac acaagttgga gtgggagtta   3180
tgcaagaggg ggtctttcac actatgtggc acgtcacaaa aggatccgcg ctgagaagcg   3240
gtgaagggag acttgatcca tactggggag atgtcaagca ggatctggtg tcatactgtg   3300
gtccatggaa gctagatgcc gcctgggatg ggcacagcga ggtgcagctc ttggccgtgc   3360
```

```
cccccggaga gagagcgagg aacatccaga ctctgcccgg aatatttaag acaaaggatg   3420
gggacattgg agcggttgcg ctggattacc cagcaggaac ttcaggatct ccaatcctag   3480
acaagtgtgg gagagtgata ggactttatg gcaatggggt cgtgatcaaa aacgggagtt   3540
atgttagtgc catcacccaa gggaggaggg aggaagagac tcctgttgag tgcttcgagc   3600
cctcgatgct gaagaagaag cagctaactg tcttagactt gcatcctgga gctgggaaaa   3660
ccaggagagt tcttcctgaa atagtccgtg aagccataaa aacaagactc cgtactgtga   3720
tcttagctcc aaccagggtt gtcgctgctg aaatggagga ggcccttaga gggcttccag   3780
tgcgttatat gacaacagca gtcaatgtca cccactctgg aacagaaatc gtcgacttaa   3840
tgtgccatgc caccttcact tcacgtctac tacagccaat cagagtcccc aactataatc   3900
tgtatattat ggatgaggcc cacttcacag atccctcaag tatagcagca agaggataca   3960
tttcaacaag ggttgagatg ggcgaggcgg ctgccatctt catgaccgcc acgccaccag   4020
gaacccgtga cgcatttccg gactccaact caccaattat ggacaccgaa gtggaagtcc   4080
cagagagagc ctggagctca ggctttgatt gggtgacgga tcattctgga aaaacagttt   4140
ggtttgttcc aagcgtgagg aacggcaatg agatcgcagc ttgtctgaca aaggctggaa   4200
aacgggtcat acagctcagc agaaagactt ttgagacaga gttccagaaa acaaaacatc   4260
aagagtggga ctttgtcgtg acaactgaca tttcagagat gggcgccaac tttaaagctg   4320
accgtgtcat agattccagg agatgcctaa agccggtcat acttgatggc gagagagtca   4380
ttctggctgg acccatgcct gtcacacatg ccagcgctgc ccagaggagg gggcgcatag   4440
gcaggaatcc caacaaacct ggagatgagt atctgtatgg aggtgggtgc gcagagactg   4500
acgaagacca tgcacactgg cttgaagcaa gaatgctcct tgacaatatt tacctccaag   4560
atggcctcat agcctcgctc tatcgacctg aggccgacaa agtagcagcc attgagggag   4620
agttcaagct taggacggag caaaggaaga cctttgtgga actcatgaaa agaggagatc   4680
ttcctgtttg gctggcctat caggttgcat ctgccggaat aacctacaca gatagaagat   4740
ggtgctttga tggcacgacc aacaacacca taatggaaga cagtgtgccg gcagaggtgt   4800
ggaccagaca cggagagaaa agagtgctca aaccgaggtg gatggacgcc agagtttgtt   4860
cagatcatgc ggccctgaag tcattcaagg agtttgccgc tgggaaaaga ggagcggctt   4920
ttggagtgat ggaagccctg ggaacactgc caggacacat gacagagaga ttccaggaag   4980
ccattgacaa cctcgctgtg ctcatgcggg cagagactgg aagcaggcct tacaaagccg   5040
cggcggccca attgccggag accctagaga ccataatgct tttggggttg ctgggaacag   5100
tctcgctggg aatcttcttc gtcttgatga ggaacaaggg catagggaag atgggctttg   5160
gaatggtgac tcttggggcc agcgcatggc tcatgtggct ctcggaaatt gagccagcca   5220
gaattgcatg tgtcctcatt gttgtgttcc tattgctggt ggtgctcata cctgagccag   5280
aaaagcaaag atctccccag gacaaccaaa tggcaatcat catcatggta gcagtaggtc   5340
ttctgggctt gattaccgcc aatgaactcg gatggttgga gagaacaaag agtgacctaa   5400
gccatctaat gggaaggaga gaggaggggg caaccatagg attctcaatg gacattgacc   5460
tgcggccagc ctcagcttgg gccatctatg ctgccttgac aactttcatt accccagccg   5520
tccaacatgc agtgaccacc tcatacaaca actactcctt aatggcgatg gccacgcaag   5580
ctggagtgtt gtttggcatg ggcaaaggga tgccattcta cgcatgggac tttggagtcc   5640
cgctgctaat gataggttgc tactcacaat taacacccct gaccctaata gtggccatca   5700
```

```
ttttgctcgt ggcgcactac atgtacttga tcccaggcct gcaggcagca gctgcgcgtg   5760
ctgcccagaa gagaacggca gctggcatca tgaagaaccc tgttgtggat ggaatagtgg   5820
tgactgacat tgacacaatg acaattgacc cccaagtgga gaaaaagatg ggacaggtgc   5880
tactcatagc agtagccgtc tccagcgcca tactgtcgcg gaccgcctgg gggtgggggg   5940
aggctggggc tctgatcaca gccgcaactt ccactttgtg ggaaggctct ccgaacaagt   6000
actggaactc ctctacagcc acttcactgt gtaacatttt taggggaagt tacttggctg   6060
gagcttctct aatctacaca gtaacaagaa acgctggctt ggtcaagaga cgtgggggtg   6120
gaacaggaga gaccctggga gagaaatgga aggcccgctt gaaccagatg tcggccctgg   6180
agttctactc ctacaaaaag tcaggcatca ccgaggtgtg cagagaagag gcccgccgcg   6240
ccctcaagga cggtgtggca acgggaggcc atgctgtgtc ccgaggaagt gcaaagctga   6300
gatggttggt ggagcgggga tacctgcagc cctatggaaa ggtcattgat cttggatgtg   6360
gcagaggggg ctggagttac tacgtcgcca ccatccgcaa agttcaagaa gtgaaaggat   6420
acacaaaagg aggccctggt catgaagaac ccgtgttggt gcaaagctat gggtggaaca   6480
tagtccgtct taagagtggg gtggacgtct ttcatatggc ggctgagccg tgtgacacgt   6540
tgctgtgtga cataggtgag tcatcatcta gtcctgaagt ggaagaagca cggacgctca   6600
gagtcctctc catggtgggg gattggcttg aaaaaagacc aggagccttt tgtataaaag   6660
tgttgtgccc atacaccagc actatgatgg aaaccctgga gcgactgcag cgtaggtatg   6720
ggggaggact ggtcagagtg ccactctccc gcaactctac acatgagatg tactgggtct   6780
ctggagcgaa aagcaacacc ataaaaagtg tgtccaccac gagccagctc ctcttggggc   6840
gcatggacgg gcctaggagg ccagtgaaat atgaggagga tgtgaatctc ggctctggca   6900
cgcgggctgt ggtaagctgc gctgaagctc ccaacatgaa gatcattggt aaccgcattg   6960
aaaggatccg cagtgagcac gcggaaacgt ggttctttga cgagaaccac ccatatagga   7020
catgggctta ccatggaagc tatgaggccc ccacacaagg gtcagcgtcc tctctaataa   7080
acggggttgt caggctcctg tcaaaaccct gggatgtggt gactggagtc acaggaatag   7140
ccatgaccga caccacaccg tatggtcagc aaagagtttt caaggaaaaa gtggacacta   7200
gggtgccaga cccccaagaa ggcactcgtc aggttatgag catggtctct tcctggttgt   7260
ggaaagagct aggcaaacac aaacggccac gagtctgcac caaagaagag ttcatcaaca   7320
aggttcgtag caatgcagca ttaggggcaa tatttgaaga ggaaaaagag tggaagactg   7380
cagtggaagc tgtgaacgat ccaaggttct gggctctagt ggacaaggaa agagagcacc   7440
acctgagagg agagtgccag agctgtgtgt acaacatgat gggaaaaaga gaaaagaaac   7500
aaggggaatt tggaaaggcc aagggcagcc gcgccatctg gtatatgtgg ctaggggcta   7560
gatttctaga gtttgaagcc cttggattct tgaacgagga tcactggatg gggagagaga   7620
actcaggagg tggtgttgaa gggctgggat tacaaagact cggatatgtc ctagaagaga   7680
tgagtcgtat accaggagga aggatgtatg cagatgacac tgctggctgg gacacccgca   7740
ttagcaggtt tgatctggag aatgaagctc taatcaccaa ccaaatggag aaagggcaca   7800
gggccttggc attggccata atcaagtaca cataccaaaa caaagtggta aaggtcctta   7860
gaccagctga aaaagggaaa acagttatgg acattatttc gagacaagac caaaggggga   7920
gcggacaagt tgtcacttac gctcttaaca catttaccaa cctagtggtg caactcattc   7980
ggaatatgga ggctgaggaa gttctagaga tgcaagactt gtggctgctg cggaggtcag   8040
agaaagtgac caactggttg cagagcaacg gatgggatag gctcaaacga atggcagtca   8100
```

gtggagatga ttgcgttgtg aagccaattg atgataggtt tgcacatgcc ctcaggttct 8160
tgaatgatat gggaaaagtt aggaaggaca cacaagagtg gaaaccctca actggatggg 8220
acaactggga agaagttccg ttttgctccc accacttcaa caagctccat ctcaaggacg 8280
ggaggtccat tgtggttccc tgccgccacc aagatgaact gattggccgg gcccgcgtct 8340
ctccaggggc gggatggagc atccgggaga ctgcttgcct agcaaaatca tatgcgcaaa 8400
tgtggcagct cctttatttc cacagaaggg acctccgact gatggccaat gccatttgtt 8460
catctgtgcc agttgactgg gttccaactg ggagaactac ctggtcaatc catggaaagg 8520
gagaatggat gaccactgaa gacatgcttg tggtgtggaa cagagtgtgg attgaggaga 8580
acgaccacat ggaagacaag accccagtta cgaaatggac agacattccc tatttgggaa 8640
aaagggaaga cttgtggtgt ggatctctca tagggcacag accgcgcacc acctgggctg 8700
agaacattaa aaacacagtc aacatggtgc gcaggatcat aggtgatgaa gaaaagtaca 8760
tggactacct atccacccaa gttcgctact tgggtgaaga agggtctaca cctggagtgc 8820
tgtaagcacc aatcttaatg ttgtcaggcc tgctagtcag ccacagcttg gggaaagctg 8880
tgcagcctgt gacccccca ggagaagctg ggaaaccaag cctatagtca ggccgagaac 8940
gccatggcac ggaagaagcc atgctgcctg tgagcccctc agaggacact gagtcaaaaa 9000
accccacgcg cttggaggcg caggatggga aaagaaggtg gcgaccttcc ccacccttca 9060
atctggggcc tgaactggag atcagctgtg gatctccaga agagggacta gtggttagag 9120
gagacccccc ggaaaacgca aaacagcata ttgacgctgg gaaagaccag agactccatg 9180
agtttccacc acgctggccg ccaggcacag atcgccgaat agcggcggcc ggtgtgggga 9240
aatccatggg tct 9253

<210> SEQ ID NO 10
<211> LENGTH: 9133
<212> TYPE: DNA
<213> ORGANISM: Artificial Sequence
<220> FEATURE:
<223> OTHER INFORMATION: ZV-IL2 construct

<400> SEQUENCE: 10
agttgttgat ctgtgtgaat cagactgcga cagttcgagt ttgaagcgaa agctagcaac 60
agtatcaaca ggttttattt tggatttgga aacgagagtt tctggtcatg aaaaacccaa 120
aaaagaaatc cggaggattc cggattgtca atatgctaaa acgcggagta gcccgtgtga 180
gcatgtacag gatgcaactc ctgtcttgca ttgcactaag tcttgcactt gtcacaaaca 240
gtgcacctac ttcaagttct acaaagaaaa cacagctaca actggagcat ttactgctgg 300
atttacagat gattttgaat ggaattaata attacaagaa tcccaaactc accaggatgc 360
tcacatttaa gttttacatg cccaagaagg ccacagaact gaaacatctt cagtgtctag 420
aagaagaact caaacctctg gaggaagtgc taaatttagc tcaaagcaaa aactttcact 480
taagacccag ggacttaatc agcaatatca acgtaatagt tctggaacta aagggatctg 540
aaacaacatt catgtgtgaa tatgctgatg agacagcaac cattgtagaa tttctgaaca 600
gatggattac cttttgtcaa agcatcatct caacactgac tagtgggggc tccggcgtga 660
aacagacttt gaattttgac cttctcaagt tggccggaga cgtcgagtcc aaccctgggc 720
ccgcggccgc cctgaacaca aagaatggat ctatttccct tatgtgcttg gccttagggg 780
gagtgttgat cttcttatcc acagccgtct ctgctgatgt ggggtgctcg gtggacttct 840

```
caaagaagga gacgagatgc ggtaccgggg tgttcgtcta taacgacgtt gaagcctgga    900
gggacaggta caagtaccat cctgactccc cccgtagatt ggcagcagca gtcaagcaag    960
cctgggaaga tggtatctgc gggatctcct ctgtttcaag aatggaaaac atcatgtgga   1020
gatcagtaga aggggagctc aacgcaatcc tggaagagaa tggagttcaa ctgacggtcg   1080
ttgtgggatc tgtaaaaaac cccatgggga gaggtccaca gagattgccc gtgcctgtga   1140
acgagctgcc ccacggctgg aaggcttggg ggaaatcgta tttcgtcaga gcagcaaaga   1200
caaataacag ctttgtcgtg gatggtgaca cactgaagga atgcccactc aaacatagag   1260
catggaacag ctttcttgtg gaggatcatg ggttcggggt atttcacact agtgtctggc   1320
tcaaggttag agaagattat tcattagagt gtgatccagc cgttattgga acagctgtta   1380
agggaaagga ggctgtacac agtgatctag gctactggat tgagagtgag aagaatgaca   1440
catggaggct gaagagggcc catctgatcg agatgaaaac atgtgaatgg ccaaagtccc   1500
acacattgtg gacagatgga atagaagaga gtgatctgat catacccaag tctttagctg   1560
ggccactcag ccatcacaat accagagagg gctacaggac ccaaatgaaa gggccatggc   1620
acagtgaaga gcttgaaatt cggtttgagg aatgcccagg cactaaggtc cacgtggagg   1680
aaacatgtgg aacaagagga ccatctctga gatcaaccac tgcaagcgga agggtgatcg   1740
aggaatggtg ctgcagggag tgcacaatgc cccactgtc gttccgggct aaagatggct    1800
gttggtatgg aatggagata aggcccagga aagaaccaga aagcaactta gtaaggtcaa   1860
tggtgactgc aggatcaact gatcacatgg accacttctc ccttggagtg cttgtgatcc   1920
tgctcatggt gcaggaaggg ctgaagaaga gaatgaccac aaagatcatc ataagcacat   1980
caatggcagt gctggtagct atgatcctgg gaggattttc aatgagtgac ctggctaagc   2040
ttgcaatttt gatgggtgcc accttcgcgg aaatgaacac tggaggagat gtagctcatc   2100
tggcgctgat agcggcattc aaagtcagac cagcgttgct ggtatctttc atcttcagag   2160
ctaattggac accccgtgaa agcatgctgc tggccttggc ctcgtgtctt ttgcaaactg   2220
cgatctccgc cttggaaggc gacctgatgg ttctcatcaa tggttttgct ttggcctggt   2280
tggcaatacg agcgatggtt gttccacgca ctgataacat caccttggca atcctggctg   2340
ctctgacacc actggcccgg ggcacactgc ttgtggcgtg gagagcaggc cttgctactt   2400
gcggggggtt tatgctcctc tctctgaagg gaaaaggcag tgtgaagaag aacttaccat   2460
ttgtcatggc cctgggacta accgctgtga ggctggtcga ccccatcaac gtggtgggac   2520
tgctgttgct cacaaggagt gggaagcgga gctggccccc tagcgaagta ctcacagctg   2580
ttggcctgat atgcgcattg gctggagggt tcgccaaggc agatatagag atggctgggc   2640
ccatggccgc ggtcggtctg ctaattgtca gttacgtggt ctcaggaaag agtgtggaca   2700
tgtacattga aagagcaggt gacatcacat gggaaaaaga tgcggaagtc actggaaaca   2760
gtccccggct cgatgtggcg ctagatgaga gtggtgattt ctccctggtg gaggatgacg   2820
gtccccccat gagagagatc atactcaagg tggtcctgat gaccatctgt ggcatgaacc   2880
caatagccat accctttgca gctggagcgt ggtacgtata cgtgaagact ggaaaaagga   2940
gtggtgctct atgggatgtg cctgctccca aggaagtaaa aaagggggag accacagatg   3000
gagtgtacag agtaatgacg cgtagactgc taggttcaac acaagttgga gtgggagtta   3060
tgcaagaggg ggtctttcac actatgtggc acgtcacaaa aggatccgcg ctgagaagcg   3120
gtgaagggag acttgatcca tactggggag atgtcaagca ggatctggtg tcatactgtg   3180
gtccatggaa gctagatgcc gcctgggatg ggcacagcga ggtgcagctc ttggccgtgc   3240
```

```
cccccggaga gagagcgagg aacatccaga ctctgcccgg aatatttaag acaaaggatg   3300
gggacattgg agcggttgcg ctggattacc cagcaggaac ttcaggatct ccaatcctag   3360
acaagtgtgg gagagtgata ggactttatg gcaatggggt cgtgatcaaa aacgggagtt   3420
atgttagtgc catcacccaa gggaggaggg aggaagagac tcctgttgag tgcttcgagc   3480
cctcgatgct gaagaagaag cagctaactg tcttagactt gcatcctgga gctgggaaaa   3540
ccaggagagt tcttcctgaa atagtccgtg aagccataaa aacaagactc cgtactgtga   3600
tcttagctcc aaccagggtt gtcgctgctg aaatggagga ggcccttaga gggcttccag   3660
tgcgttatat gacaacagca gtcaatgtca cccactctgg aacagaaatc gtcgacttaa   3720
tgtgccatgc caccttcact tcacgtctac tacagccaat cagagtcccc aactataatc   3780
tgtatattat ggatgaggcc cacttcacag atccctcaag tatagcagca agaggataca   3840
tttcaacaag ggttgagatg ggcgaggcgg ctgccatctt catgaccgcc acgccaccag   3900
gaacccgtga cgcatttccg gactccaact caccaattat ggacaccgaa gtggaagtcc   3960
cagagagagc ctggagctca ggctttgatt gggtgacgga tcattctgga aaaacagttt   4020
ggtttgttcc aagcgtgagg aacggcaatg agatcgcagc ttgtctgaca aaggctggaa   4080
aacgggtcat acagctcagc agaaagactt ttgagacaga gttccagaaa acaaaacatc   4140
aagagtggga ctttgtcgtg acaactgaca tttcagagat gggcgccaac tttaaagctg   4200
accgtgtcat agattccagg agatgcctaa agccggtcat acttgatggc gagagagtca   4260
ttctggctgg acccatgcct gtcacacatg ccagcgctgc ccagaggagg gggcgcatag   4320
gcaggaatcc caacaaacct ggagatgagt atctgtatgg aggtgggtgc gcagagactg   4380
acgaagacca tgcacactgg cttgaagcaa gaatgctcct tgacaatatt tacctccaag   4440
atggcctcat agcctcgctc tatcgacctg aggccgacaa agtagcagcc attgagggag   4500
agttcaagct taggacggag caaaggaaga cctttgtgga actcatgaaa agaggagatc   4560
ttcctgtttg gctggcctat caggttgcat ctgccggaat aacctacaca gatagaagat   4620
ggtgctttga tggcacgacc aacaacacca taatggaaga cagtgtgccg gcagaggtgt   4680
ggaccagaca cggagagaaa agagtgctca aaccgaggtg gatggacgcc agagtttgtt   4740
cagatcatgc ggccctgaag tcattcaagg agtttgccgc tgggaaaaga ggagcggctt   4800
ttggagtgat ggaagccctg ggaacactgc caggacacat gacagagaga ttccaggaag   4860
ccattgacaa cctcgctgtg ctcatgcggg cagagactgg aagcaggcct tacaaagccg   4920
cggcggccca attgccggag accctagaga ccataatgct tttggggttg ctgggaacag   4980
tctcgctggg aatcttcttc gtcttgatga ggaacaaggg catagggaag atgggctttg   5040
gaatggtgac tcttggggcc agcgcatggc tcatgtggct ctcggaaatt gagccagcca   5100
gaattgcatg tgtcctcatt gttgtgttcc tattgctggt ggtgctcata cctgagccag   5160
aaaagcaaag atctccccag gacaaccaaa tggcaatcat catcatggta gcagtaggtc   5220
ttctgggctt gattaccgcc aatgaactcg gatggttgga gagaacaaag agtgacctaa   5280
gccatctaat gggaaggaga gaggaggggg caaccatagg attctcaatg gacattgacc   5340
tgcggccagc ctcagcttgg gccatctatg ctgccttgac aactttcatt accccagccg   5400
tccaacatgc agtgaccacc tcatacaaca actactcctt aatggcgatg gccacgcaag   5460
ctggagtgtt gtttggcatg ggcaaaggga tgccattcta cgcatgggac tttggagtcc   5520
cgctgctaat gataggttgc tactcacaat taacacccct gaccctaata gtggccatca   5580
```

-continued

```
ttttgctcgt ggcgcactac atgtacttga tcccaggcct gcaggcagca gctgcgcgtg   5640
ctgcccagaa gagaacggca gctggcatca tgaagaaccc tgttgtggat ggaatagtgg   5700
tgactgacat tgacacaatg acaattgacc cccaagtgga gaaaaagatg ggacaggtgc   5760
tactcatagc agtagccgtc tccagcgcca tactgtcgcg gaccgcctgg gggtgggggg   5820
aggctggggc tctgatcaca gccgcaactt ccactttgtg ggaaggctct ccgaacaagt   5880
actggaactc ctctacagcc acttcactgt gtaacatttt tagggggaagt tacttggctg   5940
gagcttctct aatctacaca gtaacaagaa acgctggctt ggtcaagaga cgtgggggtg   6000
gaacaggaga gaccctggga gagaaatgga aggcccgctt gaaccagatg tcggccctgg   6060
agttctactc ctacaaaaag tcaggcatca ccgaggtgtg cagagaagag gcccgccgcg   6120
ccctcaagga cggtgtggca acgggaggcc atgctgtgtc ccgaggaagt gcaaagctga   6180
gatggttggt ggagcgggga tacctgcagc cctatggaaa ggtcattgat cttggatgtg   6240
gcagaggggg ctggagttac tacgtcgcca ccatccgcaa agttcaagaa gtgaaaggat   6300
acacaaaagg aggccctggt catgaagaac ccgtgttggt gcaaagctat gggtggaaca   6360
tagtccgtct taagagtggg gtggacgtct ttcatatggc ggctgagccg tgtgacacgt   6420
tgctgtgtga cataggtgag tcatcatcta gtcctgaagt ggaagaagca cggacgctca   6480
gagtcctctc catggtgggg gattggcttg aaaaaagacc aggagccttt tgtataaaag   6540
tgttgtgccc atacaccagc actatgatgg aaaccctgga gcgactgcag cgtaggtatg   6600
ggggaggact ggtcagagtg ccactctccc gcaactctac acatgagatg tactgggtct   6660
ctggagcgaa aagcaacacc ataaaaagtg tgtccaccac gagccagctc ctcttggggc   6720
gcatggacgg gcctaggagg ccagtgaaat atgaggagga tgtgaatctc ggctctggca   6780
cgcgggctgt ggtaagctgc gctgaagctc ccaacatgaa gatcattggt aaccgcattg   6840
aaaggatccg cagtgagcac gcggaaacgt ggttctttga cgagaaccac ccatatagga   6900
catgggctta ccatggaagc tatgaggccc ccacacaagg gtcagcgtcc tctctaataa   6960
acggggttgt caggctcctg tcaaaaccct gggatgtggt gactggagtc acaggaatag   7020
ccatgaccga caccacaccg tatggtcagc aaagagtttt caaggaaaaa gtggacacta   7080
gggtgccaga cccccaagaa ggcactcgtc aggttatgag catggtctct tcctggttgt   7140
ggaaagagct aggcaaacac aaacggccac gagtctgcac caaagaagag ttcatcaaca   7200
aggttcgtag caatgcagca ttaggggcaa tatttgaaga ggaaaaagag tggaagactg   7260
cagtggaagc tgtgaacgat ccaaggttct gggctctagt ggacaaggaa agagagcacc   7320
acctgagagg agagtgccag agctgtgtgt acaacatgat gggaaaaaga gaaaagaaac   7380
aaggggaatt tggaaaggcc aagggcagcc gcgccatctg gtatatgtgg ctaggggcta   7440
gatttctaga gtttgaagcc cttggattct tgaacgagga tcactggatg gggagagaga   7500
actcaggagg tggtgttgaa gggctgggat tacaaagact cggatatgtc ctagaagaga   7560
tgagtcgtat accaggagga aggatgtatg cagatgacac tgctggctgg gacacccgca   7620
ttagcaggtt tgatctggag aatgaagctc taatcaccaa ccaaatggag aaagggcaca   7680
gggccttggc attggccata atcaagtaca cataccaaaa caaagtggta aaggtcctta   7740
gaccagctga aaaagggaaa acagttatgg acattatttc gagacaagac caaaggggga   7800
gcggacaagt tgtcacttac gctcttaaca catttaccaa cctagtggtg caactcattc   7860
ggaatatgga ggctgaggaa gttctagaga tgcaagactt gtggctgctg cggaggtcag   7920
agaaagtgac caactggttg cagagcaacg gatgggatag gctcaaacga atggcagtca   7980
```

```
gtggagatga ttgcgttgtg aagccaattg atgataggtt tgcacatgcc ctcaggttct   8040
tgaatgatat gggaaaagtt aggaaggaca cacaagagtg gaaaccctca actggatggg   8100
acaactggga agaagttccg ttttgctccc accacttcaa caagctccat ctcaaggacg   8160
ggaggtccat tgtggttccc tgccgccacc aagatgaact gattggccgg gcccgcgtct   8220
ctccaggggc gggatggagc atccgggaga ctgcttgcct agcaaaatca tatgcgcaaa   8280
tgtggcagct cctttatttc cacagaaggg acctccgact gatggccaat gccatttgtt   8340
catctgtgcc agttgactgg gttccaactg ggagaactac ctggtcaatc catggaaagg   8400
gagaatggat gaccactgaa gacatgcttg tggtgtggaa cagagtgtgg attgaggaga   8460
acgaccacat ggaagacaag accccagtta cgaaatggac agacattccc tatttgggaa   8520
aaagggaaga cttgtggtgt ggatctctca tagggcacag accgcgcacc acctgggctg   8580
agaacattaa aaacacagtc aacatggtgc gcaggatcat aggtgatgaa gaaaagtaca   8640
tggactacct atccacccaa gttcgctact tgggtgaaga agggtctaca cctggagtgc   8700
tgtaagcacc aatcttaatg ttgtcaggcc tgctagtcag ccacagcttg gggaaagctg   8760
tgcagcctgt gacccccca ggagaagctg ggaaaccaag cctatagtca ggccgagaac   8820
gccatggcac ggaagaagcc atgctgcctg tgagcccctc agaggacact gagtcaaaaa   8880
accccacgcg cttggaggcg caggatggga aaagaaggtg gcgaccttcc ccacccttca   8940
atctggggcc tgaactggag atcagctgtg gatctccaga agagggacta gtggttagag   9000
gagaccccc ggaaaacgca aaacagcata ttgacgctgg gaaagaccag agactccatg   9060
agtttccacc acgctggccg ccaggcacag atcgccgaat agcggcggcc ggtgtgggga   9120
aatccatggg tct                                                      9133
```

<210> SEQ ID NO 11
<211> LENGTH: 9394
<212> TYPE: DNA
<213> ORGANISM: Artificial Sequence
<220> FEATURE:
<223> OTHER INFORMATION: ZV-TNFSF14 construct

<400> SEQUENCE: 11

```
agttgttgat ctgtgtgaat cagactgcga cagttcgagt ttgaagcgaa agctagcaac     60
agtatcaaca ggttttattt tggatttgga aacgagagtt tctggtcatg aaaaacccaa    120
aaaagaaatc cggaggattc cggattgtca atatgctaaa acgcggagta gcccgtgtga    180
gcatggagga gagtgtcgta cggccctcag tgtttgtggt ggatggacag accgacatcc    240
cattcacgag gctgggacga agccaccgga gacagtcgtg cagtgtggcc cgggtgggtc    300
tgggtctctt gctgttgctg atgggggccg ggctggccgt ccaaggctgg ttcctcctgc    360
agctgcactg gcgtctagga gagatggtca cccgcctgcc tgacggacct gcaggctcct    420
gggagcagct gatacaagag cgaaggtctc acgaggtcaa cccagcagcg catctcacag    480
gggccaactc cagcttgacc ggcagcgggg ggccgctgtt atgggagact cagctgggcc    540
tggccttcct gaggggcctc agctaccacg atggggccct tgtggtcacc aaagctggct    600
actactacat ctactccaag gtgcagctgg gcggtgtggg ctgcccgctg ggcctggcca    660
gcaccatcac ccacggcctc tacaagcgca caccccgcta ccccgaggag ctggagctgt    720
tggtcagcca gcagtcaccc tgcggacggg ccaccagcag ctcccgggtc tggtgggaca    780
gcagcttcct gggtggtgtg gtacacctgg aggctgggga gaaggtggtc gtccgtgtgc    840
```

```
tggatgaacg cctggttcga ctgcgtgatg gtacccggtc ttacttcggg gctttcatgg    900
tgagtggggg ctccggcgtg aaacagactt tgaattttga ccttctcaag ttggccggag    960
acgtcgagtc caaccctggg cccgcggccg ccctgaacac aaagaatgga tctatttccc   1020
ttatgtgctt ggccttaggg ggagtgttga tcttcttatc cacagccgtc tctgctgatg   1080
tggggtgctc ggtggacttc tcaaagaagg agacgagatg cggtaccggg gtgttcgtct   1140
ataacgacgt tgaagcctgg agggacaggt acaagtacca tcctgactcc ccccgtagat   1200
tggcagcagc agtcaagcaa gcctgggaag atggtatctg cgggatctcc tctgtttcaa   1260
gaatggaaaa catcatgtgg agatcagtag aaggggagct caacgcaatc ctggaagaga   1320
atggagttca actgacggtc gttgtgggat ctgtaaaaaa ccccatgggg agaggtccac   1380
agagattgcc cgtgcctgtg aacgagctgc cccacggctg gaaggcttgg gggaaatcgt   1440
atttcgtcag agcagcaaag acaaataaca gctttgtcgt ggatggtgac acactgaagg   1500
aatgcccact caaacataga gcatggaaca gctttcttgt ggaggatcat gggttcgggg   1560
tatttcacac tagtgtctgg ctcaaggtta gagaagatta ttcattagag tgtgatccag   1620
ccgttattgg aacagctgtt aagggaaagg aggctgtaca cagtgatcta ggctactgga   1680
ttgagagtga gaagaatgac acatggaggc tgaagagggc ccatctgatc gagatgaaaa   1740
catgtgaatg gccaaagtcc cacacattgt ggacagatgg aatagaagag agtgatctga   1800
tcatacccaa gtctttagct gggccactca gccatcacaa taccagagag ggctacagga   1860
cccaaatgaa agggccatgg cacagtgaag agcttgaaat tcggtttgag gaatgcccag   1920
gcactaaggt ccacgtggag gaaacatgtg gaacaagagg accatctctg agatcaacca   1980
ctgcaagcgg aagggtgatc gaggaatggt gctgcaggga gtgcacaatg cccccactgt   2040
cgttccgggc taaagatggc tgttggtatg gaatggagat aaggcccagg aaagaaccag   2100
aaagcaactt agtaaggtca atggtgactg caggatcaac tgatcacatg gaccacttct   2160
cccttggagt gcttgtgatc ctgctcatgg tgcaggaagg gctgaagaag agaatgacca   2220
caaagatcat cataagcaca tcaatggcag tgctggtagc tatgatcctg ggaggatttt   2280
caatgagtga cctggctaag cttgcaattt tgatgggtgc caccttcgcg gaaatgaaca   2340
ctggaggaga tgtagctcat ctggcgctga tagcggcatt caaagtcaga ccagcgttgc   2400
tggtatcttt catcttcaga gctaattgga caccccgtga aagcatgctg ctggccttgg   2460
cctcgtgtct tttgcaaact gcgatctccg ccttggaagg cgacctgatg gttctcatca   2520
atggttttgc tttggcctgg ttggcaatac gagcgatggt tgttccacgc actgataaca   2580
tcaccttggc aatcctggct gctctgacac cactggcccg gggcacactg cttgtggcgt   2640
ggagagcagg ccttgctact tgcggggggt ttatgctcct ctctctgaag ggaaaaggca   2700
gtgtgaagaa gaacttacca tttgtcatgg ccctgggact aaccgctgtg aggctggtcg   2760
accccatcaa cgtggtggga ctgctgttgc tcacaaggag tgggaagcgg agctggcccc   2820
ctagcgaagt actcacagct gttggcctga tatgcgcatt ggctggaggg ttcgccaagg   2880
cagatataga gatggctggg cccatggccg cggtcggtct gctaattgtc agttacgtgg   2940
tctcaggaaa gagtgtggac atgtacattg aaagagcagg tgacatcaca tgggaaaaag   3000
atgcggaagt cactggaaac agtccccggc tcgatgtggc gctagatgag agtggtgatt   3060
tctccctggt ggaggatgac ggtcccccca tgagagagat catactcaag gtggtcctga   3120
tgaccatctg tggcatgaac ccaatagcca taccctttgc agctggagcg tggtacgtat   3180
acgtgaagac tggaaaaagg agtggtgctc tatgggatgt gcctgctccc aaggaagtaa   3240
```

-continued

```
aaaaggggga gaccacagat ggagtgtaca gagtaatgac gcgtagactg ctaggttcaa   3300
cacaagttgg agtgggagtt atgcaagagg gggtctttca cactatgtgg cacgtcacaa   3360
aaggatccgc gctgagaagc ggtgaaggga gacttgatcc atactgggga gatgtcaagc   3420
aggatctggt gtcatactgt ggtccatgga agctagatgc cgcctgggat gggcacagcg   3480
aggtgcagct cttggccgtg ccccccggag agagagcgag gaacatccag actctgcccg   3540
gaatatttaa gacaaaggat ggggacattg gagcggttgc gctggattac ccagcaggaa   3600
cttcaggatc tccaatccta gacaagtgtg ggagagtgat aggactttat ggcaatgggg   3660
tcgtgatcaa aaacgggagt tatgttagtg ccatcaccca agggaggagg gaggaagaga   3720
ctcctgttga gtgcttcgag ccctcgatgc tgaagaagaa gcagctaact gtcttagact   3780
tgcatcctgg agctgggaaa accaggagag ttcttcctga aatagtccgt gaagccataa   3840
aaacaagact ccgtactgtg atcttagctc caaccagggt tgtcgctgct gaaatggagg   3900
aggcccttag agggcttcca gtgcgttata tgacaacagc agtcaatgtc acccactctg   3960
gaacagaaat cgtcgactta atgtgccatg ccaccttcac ttcacgtcta ctacagccaa   4020
tcagagtccc caactataat ctgtatatta tggatgaggc ccacttcaca gatccctcaa   4080
gtatagcagc aagaggatac atttcaacaa gggttgagat gggcgaggcg gctgccatct   4140
tcatgaccgc cacgccacca ggaacccgtg acgcatttcc ggactccaac tcaccaatta   4200
tggacaccga agtggaagtc ccagagagag cctggagctc aggctttgat tgggtgacgg   4260
atcattctgg aaaaacagtt tggtttgttc caagcgtgag gaacggcaat gagatcgcag   4320
cttgtctgac aaaggctgga aaacgggtca tacagctcag cagaaagact tttgagacag   4380
agttccagaa aacaaaacat caagagtggg actttgtcgt gacaactgac atttcagaga   4440
tgggcgccaa ctttaaagct gaccgtgtca tagattccag gagatgccta aagccggtca   4500
tacttgatgg cgagagagtc attctggctg gacccatgcc tgtcacacat gccagcgctg   4560
cccagaggag gggcgcata ggcaggaatc ccaacaaacc tggagatgag tatctgtatg   4620
gaggtgggtg cgcagagact gacgaagacc atgcacactg gcttgaagca agaatgctcc   4680
ttgacaatat ttacctccaa gatggcctca tagcctcgct ctatcgacct gaggccgaca   4740
aagtagcagc cattgaggga gagttcaagc ttaggacgga gcaaaggaag acctttgtgg   4800
aactcatgaa aagaggagat cttcctgttt ggctggccta tcaggttgca tctgccggaa   4860
taacctacac agatagaaga tggtgctttg atggcacgac caacaacacc ataatggaag   4920
acagtgtgcc ggcagaggtg tggaccagac acggagagaa aagagtgctc aaaccgaggt   4980
ggatggacgc cagagtttgt tcagatcatg cggccctgaa gtcattcaag gagtttgccg   5040
ctgggaaaag aggagcggct tttggagtga tggaagccct gggaacactg ccaggacaca   5100
tgacagagag attccaggaa gccattgaca acctcgctgt gctcatgcgg gcagagactg   5160
gaagcaggcc ttacaaagcc gcggcggccc aattgccgga gaccctagag accataatgc   5220
ttttggggtt gctgggaaca gtctcgctgg gaatcttctt cgtcttgatg aggaacaagg   5280
gcatagggaa gatgggcttt ggaatggtga ctcttggggc cagcgcatgg ctcatgtggc   5340
tctcggaaat tgagccagcc agaattgcat gtgtcctcat tgttgtgttc ctattgctgg   5400
tggtgctcat acctgagcca gaaaagcaaa gatctcccca ggacaaccaa atggcaatca   5460
tcatcatggt agcagtaggt cttctgggct tgattaccgc caatgaactc ggatggttgg   5520
agagaacaaa gagtgaccta agccatctaa tgggaaggag agaggagggg gcaaccatag   5580
```

```
gattctcaat ggacattgac ctgcggccag cctcagcttg ggccatctat gctgccttga   5640
caactttcat taccccagcc gtccaacatg cagtgaccac ctcatacaac aactactcct   5700
taatggcgat ggccacgcaa gctggagtgt tgtttggcat gggcaaaggg atgccattct   5760
acgcatggga ctttggagtc ccgctgctaa tgataggttg ctactcacaa ttaacacccc   5820
tgaccctaat agtggccatc attttgctcg tggcgcacta catgtacttg atcccaggcc   5880
tgcaggcagc agctgcgcgt gctgcccaga agagaacggc agctggcatc atgaagaacc   5940
ctgttgtgga tggaatagtg gtgactgaca ttgacacaat gacaattgac ccccaagtgg   6000
agaaaaagat gggacaggtg ctactcatag cagtagccgt ctccagcgcc atactgtcgc   6060
ggaccgcctg gggggtgggg gaggctgggg ctctgatcac agccgcaact tccactttgt   6120
gggaaggctc tccgaacaag tactggaact cctctacagc cacttcactg tgtaacattt   6180
ttaggggaag ttacttggct ggagcttctc taatctacac agtaacaaga aacgctggct   6240
tggtcaagag acgtgggggt ggaacaggag agaccctggg agagaaatgg aaggcccgct   6300
tgaaccagat gtcggccctg gagttctact cctacaaaaa gtcaggcatc accgaggtgt   6360
gcagagaaga ggcccgccgc gccctcaagg acggtgtggc aacgggaggc catgctgtgt   6420
cccgaggaag tgcaaagctg agatggttgg tggagcgggg atacctgcag ccctatggaa   6480
aggtcattga tcttggatgt ggcagagggg gctggagtta ctacgtcgcc accatccgca   6540
aagttcaaga agtgaaagga tacacaaaag gaggccctgg tcatgaagaa cccgtgttgg   6600
tgcaaagcta tgggtggaac atagtccgtc ttaagagtgg ggtggacgtc tttcatatgg   6660
cggctgagcc gtgtgacacg ttgctgtgtg acataggtga gtcatcatct agtcctgaag   6720
tggaagaagc acggacgctc agagtcctct ccatggtggg ggattggctt gaaaaaagac   6780
caggagcctt ttgtataaaa gtgttgtgcc catacaccag cactatgatg gaaaccctgg   6840
agcgactgca gcgtaggtat gggggaggac tggtcagagt gccactctcc cgcaactcta   6900
cacatgagat gtactgggtc tctggagcga aaagcaacac cataaaaagt gtgtccacca   6960
cgagccagct cctcttgggg cgcatggacg ggcctaggag gccagtgaaa tatgaggagg   7020
atgtgaatct cggctctggc acgcgggctg tggtaagctg cgctgaagct cccaacatga   7080
agatcattgg taaccgcatt gaaaggatcc gcagtgagca cgcggaaacg tggttctttg   7140
acgagaacca cccatatagg acatgggctt accatggaag ctatgaggcc cccacacaag   7200
ggtcagcgtc ctctctaata aacggggttg tcaggctcct gtcaaaaccc tgggatgtgg   7260
tgactggagt cacaggaata gccatgaccg acaccacacc gtatggtcag caaagagttt   7320
tcaaggaaaa agtggacact agggtgccag acccccaaga aggcactcgt caggttatga   7380
gcatggtctc ttcctggttg tggaaagagc taggcaaaca caaacggcca cgagtctgca   7440
ccaaagaaga gttcatcaac aaggttcgta gcaatgcagc attaggggca atatttgaag   7500
aggaaaaaga gtggaagact gcagtggaag ctgtgaacga tccaaggttc tgggctctag   7560
tggacaagga aagagagcac cacctgagag gagagtgcca gagctgtgtg tacaacatga   7620
tgggaaaaag agaaaagaaa caaggggaat ttggaaaggc caagggcagc cgcgccatct   7680
ggtatatgtg gctaggggct agatttctag agtttgaagc ccttggattc ttgaacgagg   7740
atcactggat ggggagagag aactcaggag gtggtgttga agggctggga ttacaaagac   7800
tcggatatgt cctagaagag atgagtcgta taccaggagg aaggatgtat gcagatgaca   7860
ctgctggctg ggacacccgc attagcaggt ttgatctgga gaatgaagct ctaatcacca   7920
accaaatgga gaaagggcac agggccttgg cattggccat aatcaagtac acataccaaa   7980
```

```
acaaagtggt aaaggtcctt agaccagctg aaaaagggaa aacagttatg gacattattt   8040
cgagacaaga ccaaaggggg agcggacaag ttgtcactta cgctcttaac acatttacca   8100
acctagtggt gcaactcatt cggaatatgg aggctgagga agttctagag atgcaagact   8160
tgtggctgct gcggaggtca gagaaagtga ccaactggtt gcagagcaac ggatgggata   8220
ggctcaaacg aatggcagtc agtggagatg attgcgttgt gaagccaatt gatgataggt   8280
ttgcacatgc cctcaggttc ttgaatgata tgggaaaagt taggaaggac acacaagagt   8340
ggaaaccctc aactggatgg gacaactggg aagaagttcc gttttgctcc caccacttca   8400
acaagctcca tctcaaggac gggaggtcca ttgtggttcc ctgccgccac caagatgaac   8460
tgattggccg ggcccgcgtc tctccagggg cgggatggag catccgggag actgcttgcc   8520
tagcaaaatc atatgcgcaa atgtggcagc tcctttattt ccacagaagg gacctccgac   8580
tgatggccaa tgccatttgt tcatctgtgc cagttgactg ggttccaact gggagaacta   8640
cctggtcaat ccatggaaag ggagaatgga tgaccactga agacatgctt gtggtgtgga   8700
acagagtgtg gattgaggag aacgaccaca tggaagacaa gaccccagtt acgaaatgga   8760
cagacattcc ctatttggga aaaagggaag acttgtggtg tggatctctc atagggcaca   8820
gaccgcgcac cacctgggct gagaacatta aaaacacagt caacatggtg cgcaggatca   8880
taggtgatga agaaaagtac atggactacc tatccaccca agttcgctac ttgggtgaag   8940
aagggtctac acctggagtg ctgtaagcac caatcttaat gttgtcaggc ctgctagtca   9000
gccacagctt ggggaaagct gtgcagcctg tgaccccccc aggagaagct gggaaaccaa   9060
gcctatagtc aggccgagaa cgccatggca cggaagaagc catgctgcct gtgagcccct   9120
cagaggacac tgagtcaaaa aaccccacgc gcttggaggc gcaggatggg aaaagaaggt   9180
ggcgaccttc cccacccttc aatctggggc ctgaactgga gatcagctgt ggatctccag   9240
aagagggact agtggttaga ggagaccccc cggaaaacgc aaaacagcat attgacgctg   9300
ggaaagacca gagactccat gagtttccac cacgctggcc gccaggcaca gatcgccgaa   9360
tagcggcggc cggtgtgggg aaatccatgg gtct                                9394
```

<210> SEQ ID NO 12
<211> LENGTH: 10807
<212> TYPE: DNA
<213> ORGANISM: Artificial Sequence
<220> FEATURE:
<223> OTHER INFORMATION: VAX2B construct

<400> SEQUENCE: 12

```
agttgttgat ctgtgtgaat cagactgcga cagttcgagt ttgaagcgaa agctagcaac     60
agtatcaaca ggttttattt tggatttgga aacgagagtt tctggtcatg aaaaacccaa    120
aaaagaaatc cggaggattc cggattgtca atatgctaaa acgcggagta gcccgtgtga    180
gccccttgg gggcttgaag aggctgccag ccggacttct gctgggtcat gggcccatca     240
ggatggtctt ggcgattcta gcctttttga gattcacggc aatcaagcca tcactgggtc    300
tcatcaatag atggggttca gtggggaaaa aagaggctat ggaaacaata aagaagttca    360
agaaagatct ggctgccatg ctgagaataa tcaatgctag gaaggagaag aagagacgag    420
gcgcagatac tagtgtcgga attgttggcc tcctgctgac cacagctatg gcagcggagg    480
tcactagacg tgggagtgca tactatatgt acttggacag aaacgatgct ggggaggcca    540
tatcttttcc aaccacattg ggatgaata agtgttatat acagatcatg gatcttggac     600
```

```
acatgtgtga tgccaccatg agctatgaat gccctatgct ggatgagggg gtggaaccag    660
atgacgtcga ttgttggtgc aacacgacgt caacttgggt tgtgtacgga acctgccatc    720
acaaaaaagg tgaagcacgg agatctagaa gagctgtgac gctcccctcc cattccacca    780
ggaagctgca aacgcggtcg caaacctggt tggaatcaag agaatacaca aagcacttga    840
ttagagtcga aaattggata ttcaggaacc ctggcttcgc gttagcagcg gccgccatcg    900
cttggctttt gggaagctca acgagccaaa aagtcatata cttggtcatg atactgctga    960
ttgccccggc atacagcatc aggtgcatag gagtcagcaa tagggacttt gtggaaggta   1020
tgtcaggtgg gacttgggtt gatgttgtct tggaacatgg aggttgtgtc accgtaatgg   1080
cacaggacaa accgactgtc gacatagagc tggttacaac aacagtcagc aacatggcgg   1140
aggtaagatc ctactgctat gaggcatcaa tatcagacat ggcttctgac agccgctgcc   1200
caacacaagg tgaagcctac cttgacaagc aatcagacac tcaatatgtc tgcaaaagaa   1260
cgttagtgga cagaggctgg ggaaatggat gtggactttt tggcaaaggg agcctggtga   1320
catgcgctaa gtttgcatgc tccaagaaaa tgaccgggaa gagcatccag ccagagaatc   1380
tggagtaccg gataatgctg tcagttcatg gctcccagca cagtgggatg atcgttacag   1440
acacaggaca tgaaactgat gagaatagag cgaaagttga gataacgccc aattcaccga   1500
gagccgaagc caccctgggg ggttttggaa gcctaggact tgattgtgaa ccgaggacag   1560
gccttgactt ttcagatttg tattacttga ctatgaataa caagcactgg ttggttcaca   1620
aggagtggtt ccacgacatt ccattacctt ggcacgctgg ggcagacacc ggaactccac   1680
actggaacaa caaagaagca ctggtagagt tcaaggacgc acatgccaaa aggcaaactg   1740
tcgtggttct agggagtcaa gaaggagcag ttcacacggc ccttgctgga gctctggagg   1800
ctgagatgga tggtgcaaag ggaaggctgt cctctggcca cctgaaatgt cgcctgaaaa   1860
tggataaact tagattgaag ggcgtgtcat actccttgtg tactgcagcg ttcacattca   1920
ccaagatccc ggctgaaaca ctgcacggga cagtcacagt ggagttacag tacgcaggga   1980
cagatggacc ttgcaaggtt ccagctcaga tggcggtgga catgcaaact ctgaccccag   2040
ttgggaggtt gataaccgct aaccccgtaa tcactgaaag cactgagaac tctaagatga   2100
tgctggaact tgatccacca tttggggact cttacattgt cataggagtc ggggagaaga   2160
agatcaccca ccactggcac aggagtggca gcaccattgg aaaagcattt gaagccactg   2220
tgagaggtgc caagagaatg gcagtcttgg gagacacagc ctgggacttt ggatcagttg   2280
gaggcgctct caactcattg ggcaagggca tccatcaaat ttttggagca gctttcaaat   2340
cattgtttgg aggaatgtcc tggttctcac aaattctcat tggaacgttg ctgatgtggt   2400
tgggtctgaa cacaaagaat ggatctattt cccttatgtg cttggcctta gggggagtgt   2460
tgatcttctt atccacagcc gtctctgctg atgtggggtg ctcggtggac ttctcaaaga   2520
aggagacgag atgcggtacc ggggtgttcg tctataacga cgttgaagcc tggagggaca   2580
ggtacaagta ccatcctgac tccccccgta gattggcagc agcagtcaag caagcctggg   2640
aagatggtat ctgcgggatc tcctctgttt caagaatgga aaacatcatg tggagatcag   2700
tagaagggga gctcaacgca atcctggaag agaatggagt tcaactgacg gtcgttgtgg   2760
gatctgtaaa aaaccccatg ggagaggtc cacagagatt gcccgtgcct gtgaacgagc    2820
tgccccacgg ctggaaggct tgggggaaat cgtatttcgt cagagcagca aagacaaata   2880
acagctttgt cgtggatggt gacacactga aggaatgccc actcaaacat agagcatgga   2940
acagctttct tgtggaggat catgggttcg ggtatttca cactagtgtc tggctcaagg    3000
```

ttagagaaga ttattcatta gagtgtgatc cagccgttat tggaacagct gttaagggaa 3060
aggaggctgt acacagtgat ctaggctact ggattgagag tgagaagaat gacacatgga 3120
ggctgaagag ggcccatctg atcgagatga aaacatgtga atggccaaag tcccacacat 3180
tgtggacaga tggaatagaa gagagtgatc tgatcatacc caagtcttta gctgggccac 3240
tcagccatca caataccaga gagggctaca ggacccaaat gaaagggcca tggcacagtg 3300
aagagcttga aattcggttt gaggaatgcc caggcactaa ggtccacgtg gaggaaacat 3360
gtggaacaag aggaccatct ctgagatcaa ccactgcaag cggaagggtg atcgaggaat 3420
ggtgctgcag ggagtgcaca atgcccccac tgtcgttccg ggctaaagat ggctgttggt 3480
atggaatgga gataaggccc aggaaagaac cagaaagcaa cttagtaagg tcaatggtga 3540
ctgcaggatc aactgatcac atggaccact tctcccttgg agtgcttgtg atcctgctca 3600
tggtgcagga agggctgaag aagagaatga ccacaaagat catcataagc acatcaatgg 3660
cagtgctggt agctatgatc ctgggaggat tttcaatgag tgacctggct aagcttgcaa 3720
ttttgatggg tgccaccttc gcggaaatga acactggagg agatgtagct catctggcgc 3780
tgatagcggc attcaaagtc agaccagcgt tgctggtatc tttcatcttc agagctaatt 3840
ggacaccccg tgaaagcatg ctgctggcct tggcctcgtg tcttttgcaa actgcgatct 3900
ccgccttgga aggcgacctg atggttctca tcaatggttt tgctttggcc tggttggcaa 3960
tacgagcgat ggttgttcca cgcactgata acatcacctt ggcaatcctg gctgctctga 4020
caccactggc ccggggcaca ctgcttgtgg cgtggagagc aggccttgct acttgcgggg 4080
ggtttatgct cctctctctg aagggaaaag gcagtgtgaa gaagaactta ccatttgtca 4140
tggccctggg actaaccgct gtgaggctgg tcgaccccat caacgtggtg ggactgctgt 4200
tgctcacaag gagtgggaag cggagctggc cccctagcga agtactcaca gctgttggcc 4260
tgatatgcgc attggctgga gggttcgcca aggcagatat agagatggct gggcccatgg 4320
ccgcggtcgg tctgctaatt gtcagttacg tggtctcagg aaagagtgtg gacatgtaca 4380
ttgaaagagc aggtgacatc acatgggaaa aagatgcgga agtcactgga aacagtcccc 4440
ggctcgatgt ggcgctagat gagagtggtg atttctccct ggtggaggat gacggtcccc 4500
ccatgagaga gatcatactc aaggtggtcc tgatgaccat ctgtggcatg aacccaatag 4560
ccataccctt tgcagctgga gcgtggtacg tatacgtgaa gactggaaaa aggagtggtg 4620
ctctatggga tgtgcctgct cccaaggaag taaaaaaggg ggagaccaca gatggagtgt 4680
acagagtaat gacgcgtaga ctgctaggtt caacacaagt tggagtggga gttatgcaag 4740
agggggtctt tcacactatg tggcacgtca caaaaggatc cgcgctgaga agcggtgaag 4800
ggagacttga tccatactgg ggagatgtca agcaggatct ggtgtcatac tgtggtccat 4860
ggaagctaga tgccgcctgg gatgggcaca gcgaggtgca gctcttggcc gtgccccccg 4920
gagagagagc gaggaacatc cagactctgc ccggaatatt taagacaaag gatggggaca 4980
ttggagcggt tgcgctggat tacccagcag gaacttcagg atctccaatc ctagacaagt 5040
gtgggagagt gataggactt tatggcaatg ggtcgtgat caaaaacggg agttatgtta 5100
gtgccatcac ccaagggagg agggaggaag agactcctgt tgagtgcttc gagccctcga 5160
tgctgaagaa gaagcagcta actgtcttag acttgcatcc tggagctggg aaaaccagga 5220
gagttcttcc tgaaatagtc cgtgaagcca taaaaacaag actccgtact gtgatcttag 5280
ctccaaccag ggttgtcgct gctgaaatgg aggaggccct tagagggctt ccagtgcgtt 5340

-continued

```
atatgacaac agcagtcaat gtcacccact ctggaacaga aatcgtcgac ttaatgtgcc   5400
atgccacctt cacttcacgt ctactacagc caatcagagt ccccaactat aatctgtata   5460
ttatggatga ggcccacttc acagatccct caagtatagc agcaagagga tacatttcaa   5520
caagggttga gatgggcgag gcggctgcca tcttcatgac cgccacgcca ccaggaaccc   5580
gtgacgcatt tccggactcc aactcaccaa ttatggacac cgaagtggaa gtcccagaga   5640
gagcctggag ctcaggcttt gattgggtga cggatcattc tggaaaaaca gtttggtttg   5700
ttccaagcgt gaggaacggc aatgagatcg cagcttgtct gacaaaggct ggaaaacggg   5760
tcatacagct cagcagaaag acttttgaga cagagttcca gaaaacaaaa catcaagagt   5820
gggactttgt cgtgacaact gacatttcag agatgggcgc caactttaaa gctgaccgtg   5880
tcatagattc caggagatgc ctaaagccgg tcatacttga tggcgagaga gtcattctgg   5940
ctggacccat gcctgtcaca catgccagcg ctgcccagag gagggggcgc ataggcagga   6000
atcccaacaa acctggagat gagtatctgt atggaggtgg gtgcgcagag actgacgaag   6060
accatgcaca ctggcttgaa gcaagaatgc tccttgacaa tatttacctc caagatggcc   6120
tcatagcctc gctctatcga cctgaggccg acaaagtagc agccattgag ggagagttca   6180
agcttaggac ggagcaaagg aagacctttg tggaactcat gaaaagagga gatcttcctg   6240
tttggctggc ctatcaggtt gcatctgccg gaataaccta cacagataga agatggtgct   6300
ttgatggcac gaccaacaac accataatgg aagacagtgt gccggcagag gtgtggacca   6360
gacacggaga gaaaagagtg ctcaaaccga ggtggatgga cgccagagtt tgttcagatc   6420
atgcggccct gaagtcattc aaggagtttg ccgctgggaa aagaggagcg gcttttggag   6480
tgatggaagc cctgggaaca ctgccaggac acatgacaga gagattccag gaagccattg   6540
acaacctcgc tgtgctcatg cgggcagaga ctggaagcag gccttacaaa gccgcggcgg   6600
cccaattgcc ggagacccta gagaccataa tgcttttggg gttgctggga acagtctcgc   6660
tgggaatctt cttcgtcttg atgaggaaca agggcatagg gaagatgggc tttggaatgg   6720
tgactcttgg ggccagcgca tggctcatgt ggctctcgga aattgagcca gccagaattg   6780
catgtgtcct cattgttgtg ttcctattgc tggtggtgct catacctgag ccagaaaagc   6840
aaagatctcc ccaggacaac caaatggcaa tcatcatcat ggtagcagta ggtcttctgg   6900
gcttgattac cgccaatgaa ctcggatggt tggagagaac aaagagtgac ctaagccatc   6960
taatgggaag gagagaggag gggcaacca taggattctc aatggacatt gacctgcggc   7020
cagcctcagc ttgggccatc tatgctgcct tgacaacttt cattacccca gccgtccaac   7080
atgcagtgac cacctcatac aacaactact ccttaatggc gatggccacg caagctggag   7140
tgttgtttgg catgggcaaa gggatgccat tctacgcatg ggactttgga gtcccgctgc   7200
taatgatagg ttgctactca caattaacac ccctgaccct aatagtggcc atcattttgc   7260
tcgtggcgca ctacatgtac ttgatcccag gcctgcaggc agcagctgcg cgtgctgccc   7320
agaagagaac ggcagctggc atcatgaaga accctgttgt ggatggaata gtggtgactg   7380
acattgacac aatgacaatt gacccccaag tggagaaaaa gatgggacag gtgctactca   7440
tagcagtagc cgtctccagc gccatactgt cgcggaccgc ctgggggtgg ggggaggctg   7500
gggctctgat cacagccgca acttccactt tgtgggaagg ctctccgaac aagtactgga   7560
actcctctac agccacttca ctgtgtaaca tttttagggg aagttacttg gctggagctt   7620
ctctaatcta cacagtaaca agaaacgctg gcttggtcaa gagacgtggg ggtggaacag   7680
gagagaccct gggagagaaa tggaaggccc gcttgaacca gatgtcggcc ctggagttct   7740
```

```
actcctacaa aaagtcaggc atcaccgagg tgtgcagaga agaggcccgc cgcgccctca   7800
aggacggtgt ggcaacggga ggccatgctg tgtcccgagg aagtgcaaag ctgagatggt   7860
tggtggagcg gggatacctg cagccctatg gaaaggtcat tgatcttgga tgtggcagag   7920
ggggctggag ttactacgtc gccaccatcc gcaaagttca agaagtgaaa ggatacacaa   7980
aaggaggccc tggtcatgaa gaacccgtgt tggtgcaaag ctatgggtgg aacatagtcc   8040
gtcttaagag tggggtggac gtctttcata tggcggctga gccgtgtgac acgttgctgt   8100
gtgacatagg tgagtcatca tctagtcctg aagtggaaga agcacggacg ctcagagtcc   8160
tctccatggt gggggattgg cttgaaaaaa gaccaggagc cttttgtata aaagtgttgt   8220
gcccatacac cagcactatg atggaaaccc tggagcgact gcagcgtagg tatgggggag   8280
gactggtcag agtgccactc tcccgcaact ctacacatga gatgtactgg gtctctggag   8340
cgaaaagcaa caccataaaa agtgtgtcca ccacgagcca gctcctcttg ggcgcatgg    8400
acgggcctag gaggccagtg aaatatgagg aggatgtgaa tctcggctct ggcacgcggg   8460
ctgtggtaag ctgcgctgaa gctcccaaca tgaagatcat tggtaaccgc attgaaagga   8520
tccgcagtga gcacgcggaa acgtggttct ttgacgagaa ccacccatat aggacatggg   8580
cttaccatgg aagctatgag gcccccacac aagggtcagc gtcctctcta ataaacgggg   8640
ttgtcaggct cctgtcaaaa ccctgggatg tggtgactgg agtcacagga atagccatga   8700
ccgacaccac accgtatggt cagcaaagag ttttcaagga aaaagtggac actagggtgc   8760
cagaccccca agaaggcact cgtcaggtta tgagcatggt ctcttcctgg ttgtggaaag   8820
agctaggcaa acacaaacgg ccacgagtct gcaccaaaga agagttcatc aacaaggttc   8880
gtagcaatgc agcattaggg gcaatatttg aagaggaaaa agagtggaag actgcagtgg   8940
aagctgtgaa cgatccaagg ttctgggctc tagtggacaa ggaaagagag caccacctga   9000
gaggagagtg ccagagctgt gtgtacaaca tgatgggaaa aagagaaaag aaacaagggg   9060
aatttggaaa ggccaagggc agccgcgcca tctggtatat gtggctaggg gctagatttc   9120
tagagttcga agcccttgga ttcttgaacg aggatcactg gatggggaga gagaactcag   9180
gaggtggtgt tgaagggctg ggattacaaa gactcggata tgtcctagaa gagatgagtc   9240
gtataccagg aggaaggatg tatgcagatg acactgctgg ctgggacacc cgcattagca   9300
ggtttgatct ggagaatgaa gctctaatca ccaaccaaat ggagaaaggg cacagggcct   9360
tggcattggc cataatcaag tacacatacc aaaacaaagt ggtaaaggtc cttagaccag   9420
ctgaaaaagg gaaaacagtt atggacatta tttcgagaca agaccaaagg gggagcggac   9480
aagttgtcac ttacgctctt aacacattta ccaacctagt ggtgcaactc attcggaata   9540
tggaggctga ggaagttcta gagatgcaag acttgtggct gctgcggagg tcagagaaag   9600
tgaccaactg gttgcagagc aacggatggg ataggctcaa acgaatggca gtcagtggag   9660
atgattgcgt tgtgaagcca attgatgata ggtttgcaca tgccctcagg ttcttgaatg   9720
atatgggaaa agttaggaag gacacacaag agtggaaacc ctcaactgga tgggacaact   9780
gggaagaagt tccgttttgc tcccaccact tcaacaagct ccatctcaag gacgggaggt   9840
ccattgtggt tccctgccgc caccaagatg aactgattgg ccgggcccgc gtctctccag   9900
gggcgggatg gagcatccgg gagactgctt gcctagcaaa atcatatgcg caaatgtggc   9960
agctccttta tttccacaga agggacctcc gactgatggc caatgccatt tgttcatctg  10020
tgccagttga ctgggttcca actgggagaa ctacctggtc aatccatgga aagggagaat  10080
```

ggatgaccac tgaagacatg cttgtggtgt ggaacagagt gtggattgag gagaacgacc 10140
acatggaaga caagacccca gttacgaaat ggacagacat tccctatttg ggaaaaaggg 10200
aagacttgtg gtgtggatct ctcatagggc acagaccgcg caccacctgg gctgagaaca 10260
ttaaaaacac agtcaacatg gtgcgcagga tcataggtga tgaagaaaag tacatggact 10320
acctatccac ccaagttcgc tacttgggtg aagaagggtc tacacctgga gtgctgtaag 10380
caccaatctt aatgttgtca ggcctgctag tcagccacag cttggggaaa gctgtgcagc 10440
ctgtgacccc cccaggagaa gctgggaaac caagcctata gtcaggccga gaacgccatg 10500
gcacggaaga agccatgctg cctgtgagcc cctcagagga cactgagtca aaaaacccca 10560
cgcgcttgga ggcgcaggat gggaaaagaa ggtggcgacc ttccccaccc ttcaatctgg 10620
ggcctgaact ggagatcagc tgtggatctc cagaagaggg actagtggtt agaggagacc 10680
ccccggaaaa cgcaaaacag catattgacg ctgggaaaga ccagagactc catgagtttc 10740
caccacgctg gccgccaggc acagatcgcc gaatagcggc ggccggtgtg gggaaatcca 10800
tgggtct 10807

<210> SEQ ID NO 13
<211> LENGTH: 12
<212> TYPE: DNA
<213> ORGANISM: Artificial Sequence
<220> FEATURE:
<223> OTHER INFORMATION: BsiWI linker

<400> SEQUENCE: 13
cgtacgagtg gg 12

<210> SEQ ID NO 14
<211> LENGTH: 14821
<212> TYPE: DNA
<213> ORGANISM: Artificial Sequence
<220> FEATURE:
<223> OTHER INFORMATION: VAXR1 construct

<400> SEQUENCE: 14
gaattctcaa tattggccat tagccatatt attcattggt tatatagcat aaatcaatat 60
tggctattgg ccattgcata cgttgtatct atatcataat atgtacattt atattggctc 120
atgtccaata tgaccgccat gttggcattg attattgact agttattaat agtaatcaat 180
tacggggtca ttagttcata gcccatatat ggagttccgc gttacataac ttacggtaaa 240
tggcccgcct ggctgaccgc ccaacgaccc ccgcccattg acgtcaataa tgacgtatgt 300
tcccatagta acgccaatag ggactttcca ttgacgtcaa tgggtggagt atttacggta 360
aactgcccac ttggcagtac atcaagtgta tcatatgcca agtccgcccc ctattgacgt 420
caatgacggt aaatggcccg cctggcatta tgcccagtac atgaccttac gggactttcc 480
tacttggcag tacatctacg tattagtcat cgctattacc atggtgatgc ggttttggca 540
gtacaccaat gggcgtggat agcggtttga ctcacgggga tttccaagtc tccaccccat 600
tgacgtcaat gggagtttgt tttggcacca aaatcaacgg gactttccaa aatgtcgtaa 660
taaccccgcc ccgttgacgc aaatgggcgg taggcgtgta cggtgggagg tctatataag 720
cagagctcgt ttagtgaacc gagttgttga tctgtgtgaa tcagactgcg acagttcgag 780
tttgaagcga aagctagcaa cagtatcaac aggttttatt ttggatttgg aaacgagagt 840
ttctggtcat gaaaaaccca aaaaagaaat ccggaggatt ccggattgtc aatatgctaa 900
aacgcggagt agcccgtgtg agccgtacga tggtgagcaa gggcgaggag ctgttcaccg 960

-continued

```
gggtggtgcc catcctggtc gagctggacg gcgacgtaaa cggccacaag ttcagcgtgt   1020
ccggcgaggg cgagggcgat gccacctacg gcaagctgac cctgaagttc atctgcacca   1080
ccggcaagct gcccgtgccc tggcccaccc tcgtgaccac cctgacctac ggcgtgcagt   1140
gcttcagccg ctaccccgac cacatgaagc agcacgactt cttcaagtcc gccatgcccg   1200
aaggctacgt ccaggagcgc accatcttct tcaaggacga cggcaactac aagacccgcg   1260
ccgaggtgaa gttcgagggc gacaccctgg tgaaccgcat cgagctgaag ggcatcgact   1320
tcaaggagga cggcaacatc ctggggcaca agctggagta caactacaac agccacaacg   1380
tctatatcat ggccgacaag cagaagaacg gcatcaaggt gaacttcaag atccgccaca   1440
acatcgagga cggcagcgtg cagctcgccg accactacca gcagaacacc cccatcggcg   1500
acggccccgt gctgctgccc gacaaccact acctgagcac ccagtccgcc ctgagcaaag   1560
accccaacga gaagcgcgat cacatggtcc tgctggagtt cgtgaccgcc gccgggatca   1620
ctctcggcat ggacgagctg tacaagagtg ggggctccgg cgtgaaacag actttgaatt   1680
ttgaccttct caagttggcc ggagacgtcg agtccaaccc tgggcccgcg gccgccctga   1740
acacaaagaa tggatctatt tcccttatgt gcttggcctt agggggagtg ttgatcttct   1800
tatccacagc cgtctctgct gatgtggggt gctcggtgga cttctcaaag aaggagacga   1860
gatgcggtac cggggtgttc gtctataacg acgttgaagc ctggagggac aggtacaagt   1920
accatcctga ctccccccgt agattggcag cagcagtcaa gcaagcctgg gaagatggta   1980
tctgcgggat ctcctctgtt tcaagaatgg aaaacatcat gtggagatca gtagaagggg   2040
agctcaacgc aatcctggaa gagaatggag ttcaactgac ggtcgttgtg ggatctgtaa   2100
aaaaccccat ggggagaggt ccacagagat tgcccgtgcc tgtgaacgag ctgccccacg   2160
gctggaaggc ttgggggaaa tcgtatttcg tcagagcagc aaagacaaat aacagctttg   2220
tcgtggatgg tgacacactg aaggaatgcc cactcaaaca tagagcatgg aacagctttc   2280
ttgtggagga tcatgggttc ggggtatttc acactagtgt ctggctcaag gttagagaag   2340
attattcatt agagtgtgat ccagccgtta ttggaacagc tgttaaggga aaggaggctg   2400
tacacagtga tctaggctac tggattgaga gtgagaagaa tgacacatgg aggctgaaga   2460
gggcccatct gatcgagatg aaaacatgtg aatggccaaa gtcccacaca ttgtggacag   2520
atggaataga agagagtgat ctgatcatac ccaagtcttt agctgggcca ctcagccatc   2580
acaataccag agagggctac aggacccaaa tgaaagggcc atggcacagt gaagagcttg   2640
aaattcggtt tgaggaatgc ccaggcacta aggtccacgt ggaggaaaca tgtggaacaa   2700
gaggaccatc tctgagatca accactgcaa gcggaagggt gatcgaggaa tggtgctgca   2760
gggagtgcac aatgccccca ctgtcgttcc gggctaaaga tggctgttgg tatggaatgg   2820
agataaggcc caggaaagaa ccagaaagca acttagtaag gtcaatggtg actgcaggat   2880
caactgatca catggaccac ttctcccttg gagtgcttgt gatcctgctc atggtgcagg   2940
aagggctgaa gaagagaatg accacaaaga tcatcataag cacatcaatg gcagtgctgg   3000
tagctatgat cctgggagga ttttcaatga gtgacctggc taagcttgca attttgatgg   3060
gtgccacctt cgcggaaatg aacactggag gagatgtagc tcatctggcg ctgatagcgg   3120
cattcaaagt cagaccagcg ttgctggtat ctttcatctt cagagctaat tggacacccc   3180
gtgaaagcat gctgctggcc ttggcctcgt gtcttttgca aactgcgatc tccgccttgg   3240
aaggcgacct gatggttctc atcaatggtt ttgctttggc ctggttggca atacgagcga   3300
```

-continued

```
tggttgttcc acgcactgat aacatcacct tggcaatcct ggctgctctg acaccactgg   3360
cccggggcac actgcttgtg gcgtggagag caggccttgc tacttgcggg gggtttatgc   3420
tcctctctct gaagggaaaa ggcagtgtga agaagaactt accatttgtc atggccctgg   3480
gactaaccgc tgtgaggctg gtcgacccca tcaacgtggt gggactgctg ttgctcacaa   3540
ggagtgggaa gcggagctgg ccccctagcg aagtactcac agctgttggc ctgatatgcg   3600
cattggctgg agggttcgcc aaggcagata tagagatggc tgggcccatg gccgcggtcg   3660
gtctgctaat tgtcagttac gtggtctcag gaaagagtgt ggacatgtac attgaaagag   3720
caggtgacat cacatgggaa aaagatgcgg aagtcactgg aaacagtccc cggctcgatg   3780
tggcgctaga tgagagtggt gatttctccc tggtggagga tgacggtccc cccatgagag   3840
agatcatact caaggtggtc ctgatgacca tctgtggcat gaacccaata gccataccct   3900
ttgcagctgg agcgtggtac gtatacgtga agactggaaa aaggagtggt gctctatggg   3960
atgtgcctgc tcccaaggaa gtaaaaaagg gggagaccac agatggagtg tacagagtaa   4020
tgacgcgtag actgctaggt tcaacacaag ttggagtggg agttatgcaa gagggggtct   4080
ttcacactat gtggcacgtc acaaaaggat ccgcgctgag aagcggtgaa gggagacttg   4140
atccatactg ggagatgtc aagcaggatc tggtgtcata ctgtggtcca tggaagctag   4200
atgccgcctg ggatgggcac agcgaggtgc agctcttggc cgtgcccccc ggagagagag   4260
cgaggaacat ccagactctg cccggaatat ttaagacaaa ggatggggac attggagcgg   4320
ttgcgctgga ttacccagca ggaacttcag gatctccaat cctagacaag tgtgggagag   4380
tgataggact ttatggcaat ggggtcgtga tcaaaaacgg gagttatgtt agtgccatca   4440
cccaagggag gagggaggaa gagactcctg ttgagtgctt cgagccctcg atgctgaaga   4500
agaagcagct aactgtctta gacttgcatc ctggagctgg gaaaaccagg agagttcttc   4560
ctgaaatagt ccgtgaagcc ataaaaacaa gactccgtac tgtgatctta gctccaacca   4620
gggttgtcgc tgctgaaatg gaggaggccc ttagagggct tccagtgcgt tatatgacaa   4680
cagcagtcaa tgtcacccac tctggaacag aaatcgtcga cttaatgtgc catgccacct   4740
tcacttcacg tctactacag ccaatcagag tccccaacta taatctgtat attatggatg   4800
aggcccactt cacagatccc tcaagtatag cagcaagagg atacatttca acaagggttg   4860
agatgggcga ggcggctgcc atcttcatga ccgccacgcc accaggaacc cgtgacgcat   4920
ttccggactc caactcacca attatggaca ccgaagtgga agtcccagag agagcctgga   4980
gctcaggctt tgattgggtg acggatcatt ctggaaaaac agtttggttt gttccaagcg   5040
tgaggaacgg caatgagatc gcagcttgtc tgacaaaggc tggaaaacgg gtcatacagc   5100
tcagcagaaa gacttttgag acagagttcc agaaaacaaa acatcaagag tgggactttg   5160
tcgtgacaac tgacatttca gagatgggcg ccaactttaa agctgaccgt gtcatagatt   5220
ccaggagatg cctaaagccg gtcatacttg atggcgagag agtcattctg gctggaccca   5280
tgcctgtcac acatgccagc gctgcccaga ggagggggcg cataggcagg aatcccaaca   5340
aacctggaga tgagtatctg tatggaggtg ggtgcgcaga gactgacgaa gaccatgcac   5400
actggcttga agcaagaatg ctccttgaca atatttacct ccaagatggc ctcatagcct   5460
cgctctatcg acctgaggcc gacaaagtag cagccattga gggagagttc aagcttagga   5520
cggagcaaag gaagaccttt gtggaactca tgaaaagagg agatcttcct gtttggctgg   5580
cctatcaggt tgcatctgcc ggaataacct acacagatag aagatggtgc tttgatggca   5640
cgaccaacaa caccataatg gaagacagtg tgccggcaga ggtgtggacc agacacggag   5700
```

```
agaaaagagt gctcaaaccg aggtggatgg acgccagagt ttgttcagat catgcggccc   5760
tgaagtcatt caaggagttt gccgctggga aaagaggagc ggcttttgga gtgatggaag   5820
ccctgggaac actgccagga cacatgacag agagattcca ggaagccatt gacaacctcg   5880
ctgtgctcat gcgggcagag actggaagca ggccttacaa agccgcggcg gcccaattgc   5940
cggagaccct agagaccata atgcttttgg ggttgctggg aacagtctcg ctgggaatct   6000
tcttcgtctt gatgaggaac aagggcatag ggaagatggg ctttggaatg gtgactcttg   6060
gggccagcgc atggctcatg tggctctcgg aaattgagcc agccagaatt gcatgtgtcc   6120
tcattgttgt gttcctattg ctggtggtgc tcatacctga gccagaaaag caaagatctc   6180
cccaggacaa ccaaatggca atcatcatca tggtagcagt aggtcttctg ggcttgatta   6240
ccgccaatga actcggatgg ttggagagaa caaagagtga cctaagccat ctaatgggaa   6300
ggagagagga gggggcaacc ataggattct caatggacat tgacctgcgg ccagcctcag   6360
cttgggccat ctatgctgcc ttgacaactt tcattacccc agccgtccaa catgcagtga   6420
ccacctcata caacaactac tccttaatgg cgatggccac gcaagctgga gtgttgtttg   6480
gcatgggcaa agggatgcca ttctacgcat gggactttgg agtcccgctg ctaatgatag   6540
gttgctactc acaattaaca cccctgaccc taatagtggc catcattttg ctcgtggcgc   6600
actacatgta cttgatccca ggcctgcagg cagcagctgc gcgtgctgcc cagaagagaa   6660
cggcagctgg catcatgaag aaccctgttg tggatggaat agtggtgact gacattgaca   6720
caatgacaat tgacccccaa gtggagaaaa agatgggaca ggtgctactc atagcagtag   6780
ccgtctccag cgccatactg tcgcggaccg cctgggggtg gggggaggct ggggctctga   6840
tcacagccgc aacttccact ttgtgggaag gctctccgaa caagtactgg aactcctcta   6900
cagccacttc actgtgtaac atttttaggg gaagttactt ggctggagct tctctaatct   6960
acacagtaac aagaaacgct ggcttggtca agagacgtgg gggtggaaca ggagagaccc   7020
tgggagagaa atggaaggcc cgcttgaacc agatgtcggc cctggagttc tactcctaca   7080
aaaagtcagg catcaccgag gtgtgcagag aagaggcccg ccgcgccctc aaggacggtg   7140
tggcaacggg aggccatgct gtgtcccgag gaagtgcaaa gctgagatgg ttggtggagc   7200
ggggatacct gcagccctat ggaaaggtca ttgatcttgg atgtggcaga gggggctgga   7260
gttactacgt cgccaccatc cgcaaagttc aagaagtgaa aggatacaca aaaggaggcc   7320
ctggtcatga agaacccgtg ttggtgcaaa gctatgggtg gaacatagtc cgtcttaaga   7380
gtggggtgga cgtctttcat atggcggctg agccgtgtga cacgttgctg tgtgacatag   7440
gtgagtcatc atctagtcct gaagtggaag aagcacggac gctcagagtc ctctccatgg   7500
tgggggattg gcttgaaaaa agaccaggag ccttttgtat aaaagtgttg tgcccataca   7560
ccagcactat gatggaaacc ctggagcgac tgcagcgtag gtatggggga ggactggtca   7620
gagtgccact ctcccgcaac tctacacatg agatgtactg ggtctctgga gcgaaaagca   7680
acaccataaa aagtgtgtcc accacgagcc agctcctctt ggggcgcatg gacgggccta   7740
ggaggccagt gaaatatgag gaggatgtga atctcggctc tggcacgcgg gctgtggtaa   7800
gctgcgctga agctcccaac atgaagatca ttggtaaccg cattgaaagg atccgcagtg   7860
agcacgcgga aacgtggttc tttgacgaga accacccata taggacatgg gcttaccatg   7920
gaagctatga ggcccccaca caagggtcag cgtcctctct aataaacggg gttgtcaggc   7980
tcctgtcaaa accctgggat gtggtgactg gagtcacagg aatagccatg accgacacca   8040
```

-continued

```
caccgtatgg tcagcaaaga gttttcaagg aaaaagtgga cactagggtg ccagaccccc   8100
aagaaggcac tcgtcaggtt atgagcatgg tctcttcctg gttgtggaaa gagctaggca   8160
aacacaaacg gccacgagtc tgcaccaaag aagagttcat caacaaggtt cgtagcaatg   8220
cagcattagg ggcaatattt gaagaggaaa aagagtggaa gactgcagtg gaagctgtga   8280
acgatccaag gttctgggct ctagtggaca aggaaagaga gcaccacctg agaggagagt   8340
gccagagctg tgtgtacaac atgatgggaa aaagagaaaa gaaacaaggg gaatttggaa   8400
aggccaaggg cagccgcgcc atctggtata tgtggctagg ggctagattt ctagagtttg   8460
aagcccttgg attcttgaac gaggatcact ggatggggag agagaactca ggaggtggtg   8520
ttgaagggct gggattacaa agactcggat atgtcctaga agagatgagt cgtataccag   8580
gaggaaggat gtatgcagat gacactgctg gctgggacac ccgcattagc aggtttgatc   8640
tggagaatga agctctaatc accaaccaaa tggagaaagg gcacagggcc ttggcattgg   8700
ccataatcaa gtacacatac caaaacaaag tggtaaaggt ccttagacca gctgaaaaag   8760
ggaaaacagt tatggacatt atttcgagac aagaccaaag ggggagcgga caagttgtca   8820
cttacgctct taacacattt accaacctag tggtgcaact cattcggaat atggaggctg   8880
aggaagttct agagatgcaa gacttgtggc tgctgcggag gtcagagaaa gtgaccaact   8940
ggttgcagag caacggatgg gataggctca aacgaatggc agtcagtgga gatgattgcg   9000
ttgtgaagcc aattgatgat aggtttgcac atgccctcag gttcttgaat gatatgggaa   9060
aagttaggaa ggacacacaa gagtggaaac cctcaactgg atgggacaac tgggaagaag   9120
ttccgttttg ctcccaccac ttcaacaagc tccatctcaa ggacgggagg tccattgtgg   9180
ttccctgccg ccaccaagat gaactgattg gccgggcccg cgtctctcca ggggcgggat   9240
ggagcatccg ggagactgct tgcctagcaa aatcatatgc gcaaatgtgg cagctccttt   9300
atttccacag aagggacctc cgactgatgg ccaatgccat ttgttcatct gtgccagttg   9360
actgggttcc aactgggaga actacctggt caatccatgg aaagggagaa tggatgacca   9420
ctgaagacat gcttgtggtg tggaacagag tgtggattga ggagaacgac cacatggaag   9480
acaagacccc agttacgaaa tggacagaca ttccctattt gggaaaaagg gaagacttgt   9540
ggtgtggatc tctcataggg cacagaccgc gcaccacctg ggctgagaac attaaaaaca   9600
cagtcaacat ggtgcgcagg atcataggtg atgaagaaaa gtacatggac tacctatcca   9660
cccaagttcg ctacttgggt gaagaagggt ctacacctgg agtgctgtaa gcaccaatct   9720
taatgttgtc aggcctgcta gtcagccaca gcttggggaa agctgtgcag cctgtgaccc   9780
ccccaggaga agctgggaaa ccaagcctat agtcaggccg agaacgccat ggcacggaag   9840
aagccatgct gcctgtgagc ccctcagagg acactgagtc aaaaaacccc acgcgcttgg   9900
aggcgcagga tgggaaaaga aggtggcgac cttccccacc cttcaatctg gggcctgaac   9960
tggagatcag ctgtggatct ccagaagagg gactagtggt tagaggagac cccccggaaa  10020
acgcaaaaca gcatattgac gctgggaaag accagagact ccatgagttt ccaccacgct  10080
ggccgccagg cacagatcgc cgaatagcgg cggccggtgt ggggaaatcc atgggtctgg  10140
gtcggcatgg catctccacc tcctcgcggt ccgacctggg catccgaagg aggacgcacg  10200
tccactcgga tggctaaggg agttcgaatc tcatgtttga cagcttatta attaagactc  10260
gcgacagaca tgataagata cattgatgag tttggacaaa ccacaactag aatgcagtga  10320
aaaaaatgct ttatttgtga aatttgtgat gctattgctt tatttgtaac cattataagc  10380
tgcaataaac aagttaacaa caacaattgc attcatttta tgtttcaggt tcagggggag  10440
```

-continued

```
atgtgggagg ttttttaaag caagtaaaac ctctacaaat gtgtcatcga taagctttaa  10500
tgcggtagtt tatcacagtt aaattgctaa cgcagtcagg caccgtgtat gaaatctaac  10560
aatgcgctca tcgtcatcct cggcaccgtc accctggatg ctgtaggcat aggcttggtt  10620
atgccggtac tgccgggcct cttgcgggat atcgtccatt ccgacagcat cgccagtcac  10680
tatggcgtgc tgctagcgct atatgcgttg atgcaatttc tatgcgcacc cgttctcgga  10740
gcactgtccg accgctttgg ccgccgccca gtcctgctcg cttcgctact tggagccact  10800
atcgactacg cgatcatggc gaccacaccc gtcctgtgga tcctctacgc cggacgcatc  10860
gtggccggca tcaccggcgc cacaggtgcg gttgctggcg cctatatcgc cgacatcacc  10920
gatggggaag atcgggctcg ccacttcggg ctcatgagcg cttgtttcgg cgtgggtatg  10980
gtggcaggcc ccgtggccgg gggactgttg ggcgccatct ccttgcatgc accattcctt  11040
gcggcggcgg tgctcaacgg cctcaaccta ctactgggct gcttcctaat gcaggagtcg  11100
cataagggag agcgtcgacc gatgcccttg agagccttca acccagtcag ctccttccgg  11160
tgggcgcggg gcatgactat cgtcgccgca cttatgactg tcttctttat catgcaactc  11220
gtaggacagg tgccggcagc gctctgggtc attttcggcg aggaccgctt tcgctggagc  11280
gcgacgatga tcggcctgtc gcttgcggta ttcggaatct tgcacgccct cgctcaagcc  11340
ttcgtcactg gtcccgccac caaacgtttc ggcgagaagc aggccattat cgccggcatg  11400
gcggccgacg cgctgggcta cgtcttgctg gcgttcgcga cgcgaggctg gatggccttc  11460
cccattatga ttcttctcgc ttccggcggc atcgggatgc ccgcgttgca ggccatgctg  11520
tccaggcagg tagatgacga ccatcaggga cagcttcaag gatcgctcgc ggctcttacc  11580
agcctaactt cgatcactgg accgctgatc gtcacggcga tttatgccgc ctcggcgagc  11640
acatggaacg ggttggcatg gattgtaggc gccgccctat accttgtctg cctccccgcg  11700
ttgcgtcgcg gtgcatggag ccgggccacc tcgacctgaa tggaagccgg cggcacctcg  11760
ctaacggatt caccactcca agaattggag ccaatcaatt cttgcggaga actgtgaatg  11820
cgcaaaccaa cccttggcag aacatatcca tcgcgtccgc catctccagc agccgcacgc  11880
ggcgcatctc gggcagcgtt gggtcctggc cacgggtgcg catgatcgtg ctcctgtcgt  11940
tgaggacccg gctaggctgg cggggttgcc ttactggtta gcagaatgaa tcaccgatac  12000
gcgagcgaac gtgaagcgac tgctgctgca aaacgtctgc gacctgagca acaacatgaa  12060
tggtcttcgg tttccgtgtt tcgtaaagtc tggaaacgcg gaagtcagcg ccctgcacca  12120
ttatgttccg gatctgcatc gcaggatgct gctggctacc ctgtggaaca cctacatctg  12180
tattaacgaa gcgctggcat tgaccctgag tgatttttct ctggtcccgc cgcatccata  12240
ccgccagttg tttaccctca caacgttcca gtaaccgggc atgttcatca tcagtaaccc  12300
gtatcgtgag catcctctct cgtttcatcg gtatcattac ccccatgaac agaaatcccc  12360
cttacacgga ggcatcagtg accaaacagg aaaaaaccgc ccttaacatg gcccgcttta  12420
tcagaagcca gacattaacg cttctggaga aactcaacga gctggacgcg gatgaacagg  12480
cagacatctg tgaatcgctt cacgaccacg ctgatgagct ttaccgcagc tgcctcgcgc  12540
gtttcggtga tgacggtgaa aacctctgac acatgcagct cccggagacg gtcacagctt  12600
gtctgtaagc ggatgccggg agcagacaag cccgtcaggg cgcgtcagcg ggtgttggcg  12660
ggtgtcgggg cgcagccatg acccagtcac gtagcgatag cggagtgtat actggcttaa  12720
ctatgcggca tcagagcaga ttgtactgag agtgcaccat atgcggtgtg aaataccgca  12780
```

```
cagatgcgta aggagaaaat accgcatcag gcgctcttcc gcttcctcgc tcactgactc  12840
gctgcgctcg gtcgttcggc tgcggcgagc ggtatcagct cactcaaagg cggtaatacg  12900
gttatccaca gaatcagggg ataacgcagg aaagaacatg tgagcaaaag gccagcaaaa  12960
ggccaggaac cgtaaaaagg ccgcgttgct ggcgtttttc cataggctcc gcccccctga  13020
cgagcatcac aaaaatcgac gctcaagtca gaggtggcga aacccgacag gactataaag  13080
ataccaggcg tttccccctg gaagctccct cgtgcgctct cctgttccga ccctgccgct  13140
taccggatac ctgtccgcct ttctcccttc gggaagcgtg gcgctttctc atagctcacg  13200
ctgtaggtat ctcagttcgg tgtaggtcgt tcgctccaag ctgggctgtg tgcacgaacc  13260
ccccgttcag cccgaccgct gcgccttatc cggtaactat cgtcttgagt ccaacccggt  13320
aagacacgac ttatcgccac tggcagcagc cactggtaac aggattagca gagcgaggta  13380
tgtaggcggt gctacagagt tcttgaagtg gtggcctaac tacggctaca ctagaaggac  13440
agtatttggt atctgcgctc tgctgaagcc agttaccttc ggaaaaagag ttggtagctc  13500
ttgatccggc aaacaaacca ccgctggtag cggtggtttt tttgtttgca agcagcagat  13560
tacgcgcaga aaaaaaggat ctcaagaaga tcctttgatc ttttctacgg ggtctgacgc  13620
tcagtggaac gaaaactcac gttaagggat tttggtcatg agattatcaa aaaggatctt  13680
cacctagatc cttttaaatt aaaaatgaag ttttaaatca atctaaagta tatatgagta  13740
aacttggtct gacagttacc aatgcttaat cagtgaggca cctatctcag cgatctgtct  13800
atttcgttca tccatagttg cctgactccc cgtcgtgtag ataactacga tacgggaggg  13860
cttaccatct ggccccagtg ctgcaatgat accgcgagac ccacgctcac cggctccaga  13920
tttatcagca ataaaccagc cagccggaag ggccgagcgc agaagtggtc ctgcaacttt  13980
atccgcctcc atccagtcta ttaattgttg ccgggaagct agagtaagta gttcgccagt  14040
taatagtttg cgcaacgttg ttgccattgc tgcaggcatc gtggtgtcac gctcgtcgtt  14100
tggtatggct tcattcagct ccggttccca acgatcaagg cgagttacat gatcccccat  14160
gttgtgcaaa aaagcggtta gctccttcgg tcctccgatc gttgtcagaa gtaagttggc  14220
cgcagtgtta tcactcatgg ttatggcagc actgcataat tctcttactg tcatgccatc  14280
cgtaagatgc ttttctgtga ctggtgagta ctcaaccaag tcattctgag aatagtgtat  14340
gcggcgaccg agttgctctt gcccggcgtc aacacgggat aataccgcgc cacatagcag  14400
aactttaaaa gtgctcatca ttggaaaacg ttcttcgggg cgaaaactct caaggatctt  14460
accgctgttg agatccagtt cgatgtaacc cactcgtgca cccaactgat cttcagcatc  14520
ttttactttc accagcgttt ctgggtgagc aaaaacagga aggcaaaatg ccgcaaaaaa  14580
gggaataagg gcgacacgga aatgttgaat actcatactc ttcctttttc aatattattg  14640
aagcatttat cagggttatt gtctcatgag cggatacata tttgaatgta tttagaaaaa  14700
taaacaaata ggggttccgc gcacatttcc ccgaaaagtg ccacctgacg tctaagaaac  14760
cattattatc atgacattaa cctataaaaa taggcgtatc acgaggccct ttcgtcttca  14820
a                                                                  14821
```

<210> SEQ ID NO 15
<211> LENGTH: 717
<212> TYPE: DNA
<213> ORGANISM: Artificial Sequence
<220> FEATURE:
<223> OTHER INFORMATION: eGFP

<400> SEQUENCE: 15

```
atggtgagca agggcgagga gctgttcacc ggggtggtgc ccatcctggt cgagctggac     60

ggcgacgtaa acggccacaa gttcagcgtg tccggcgagg gcgagggcga tgccacctac    120

ggcaagctga ccctgaagtt catctgcacc accggcaagc tgcccgtgcc ctggcccacc    180

ctcgtgacca ccctgaccta cggcgtgcag tgcttcagcc gctaccccga ccacatgaag    240

cagcacgact tcttcaagtc cgccatgccc gaaggctacg tccaggagcg caccatcttc    300

ttcaaggacg acggcaacta caagacccgc gccgaggtga agttcgaggg cgacaccctg    360

gtgaaccgca tcgagctgaa gggcatcgac ttcaaggagg acggcaacat cctggggcac    420

aagctggagt acaactacaa cagccacaac gtctatatca tggccgacaa gcagaagaac    480

ggcatcaagg tgaacttcaa gatccgccac aacatcgagg acggcagcgt gcagctcgcc    540

gaccactacc agcagaacac ccccatcggc gacggccccg tgctgctgcc cgacaaccac    600

tacctgagca cccagtccgc cctgagcaaa gaccccaacg agaagcgcga tcacatggtc    660

ctgctggagt tcgtgaccgc cgccgggatc actctcggca tggacgagct gtacaag       717
```

```
<210> SEQ ID NO 16
<211> LENGTH: 2382
<212> TYPE: DNA
<213> ORGANISM: Artificial Sequence
<220> FEATURE:
<223> OTHER INFORMATION: Packaging vector

<400> SEQUENCE: 16

atgaaaaacc caaaaaagaa atccggagga ttccggattg tcaatatgct aaaacgcgga     60

gtagcccgtg tgagcccctt tgggggcttg aagaggctgc cagccggact tctgctgggt    120

catgggccca tcaggatggt cttggcgatt ctagcctttt tgagattcac ggcaatcaag    180

ccatcactgg gtctcatcaa tagatggggt tcagtgggga aaaaagaggc tatggaaaca    240

ataaagaagt tcaagaaaga tctggctgcc atgctgagaa taatcaatgc taggaaggag    300

aagaagagac gaggcgcaga tactagtgtc ggaattgttg gcctcctgct gaccacagct    360

atggcagcgg aggtcactag acgtgggagt gcatactata tgtacttgga cagaaacgat    420

gctggggagg ccatatcttt tccaaccaca ttggggatga ataagtgtta tatacagatc    480

atggatcttg gacacatgtg tgatgccacc atgagctatg aatgccctat gctggatgag    540

ggggtggaac cagatgacgt cgattgttgg tgcaacacga cgtcaacttg ggttgtgtac    600

ggaacctgcc atcacaaaaa aggtgaagca cggagatcta gaagagctgt gacgctcccc    660

tcccattcca ccaggaagct gcaaacgcgg tcgcaaacct ggttggaatc aagagaatac    720

acaaagcact tgattagagt cgaaaattgg atattcagga accctggctt cgcgttagca    780

gcggccgcca tcgcttggct tttgggaagc tcaacgagcc aaaaagtcat atacttggtc    840

atgatactgc tgattgcccc ggcatacagc atcaggtgca taggagtcag caatagggac    900

tttgtggaag gtatgtcagg tgggacttgg gttgatgttg tcttggaaca tggaggttgt    960

gtcaccgtaa tggcacagga caaaccgact gtcgacatag agctggttac aacaacagtc   1020

agcaacatgg cggaggtaag atcctactgc tatgaggcat caatatcaga catggcttct   1080

gacagccgct gcccaacaca aggtgaagcc taccttgaca agcaatcaga cactcaatat   1140

gtctgcaaaa gaacgttagt ggacagaggc tggggaaatg gatgtggact tttggcaaa    1200

gggagcctgg tgacatgcgc taagtttgca tgctccaaga aaatgaccgg gaagagcatc   1260

cagccagaga atctggagta ccggataatg ctgtcagttc atggctccca gcacagtggg   1320
```

atgatcgtta atgacacagg acatgaaact gatgagaata gagcgaaagt tgagataacg 1380
cccaattcac cgagagccga agccaccctg gggggttttg gaagcctagg acttgattgt 1440
gaaccgagga caggccttga cttttcagat ttgtattact tgactatgaa taacaagcac 1500
tggttggttc acaaggagtg gttccacgac attccattac cttggcacgc tggggcagac 1560
accggaactc cacactggaa caacaaagaa gcactggtag agttcaagga cgcacatgcc 1620
aaaaggcaaa ctgtcgtggt tctagggagt caagaaggag cagttcacac ggcccttgct 1680
ggagctctgg aggctgagat ggatggtgca aagggaaggc tgtcctctgg ccacctgaaa 1740
tgtcgcctga aaatggataa acttagattg aagggcgtgt catactcctt gtgtactgca 1800
gcgttcacat tcaccaagat cccggctgaa acactgcacg ggacagtcac agtggagtta 1860
cagtacgcag ggacagatgg accttgcaag gttccagctc agatggcggt ggacatgcaa 1920
actctgaccc cagttgggag gttgataacc gctaaccccg taatcactga aagcactgag 1980
aactctaaga tgatgctgga acttgatcca ccatttgggg actcttacat tgtcatagga 2040
gtcggggaga agaagatcac ccaccactgg cacaggagtg gcagcaccat tggaaaagca 2100
tttgaagcca ctgtgagagg tgccaagaga atggcagtct tgggagacac agcctgggac 2160
tttggatcag ttggaggcgc tctcaactca ttgggcaagg gcatccatca aatttttgga 2220
gcagctttca aatcattgtt tggaggaatg tcctggttct cacaaattct cattggaacg 2280
ttgctgatgt ggttgggtct gaacacaaag aatggatcta tttcccttat gtgcttggcc 2340
ttagggggag tgttgatctt cttatccaca gccgtctctg ct 2382

<210> SEQ ID NO 17
<211> LENGTH: 794
<212> TYPE: PRT
<213> ORGANISM: Artificial Sequence
<220> FEATURE:
<223> OTHER INFORMATION: Packaging vector

<400> SEQUENCE: 17

Met Lys Asn Pro Lys Lys Lys Ser Gly Gly Phe Arg Ile Val Asn Met
1 5 10 15

Leu Lys Arg Gly Val Ala Arg Val Ser Pro Phe Gly Gly Leu Lys Arg
20 25 30

Leu Pro Ala Gly Leu Leu Leu Gly His Gly Pro Ile Arg Met Val Leu
35 40 45

Ala Ile Leu Ala Phe Leu Arg Phe Thr Ala Ile Lys Pro Ser Leu Gly
50 55 60

Leu Ile Asn Arg Trp Gly Ser Val Gly Lys Lys Glu Ala Met Glu Thr
65 70 75 80

Ile Lys Lys Phe Lys Lys Asp Leu Ala Ala Met Leu Arg Ile Ile Asn
85 90 95

Ala Arg Lys Glu Lys Lys Arg Arg Gly Ala Asp Thr Ser Val Gly Ile
100 105 110

Val Gly Leu Leu Leu Thr Thr Ala Met Ala Ala Glu Val Thr Arg Arg
115 120 125

Gly Ser Ala Tyr Tyr Met Tyr Leu Asp Arg Asn Asp Ala Gly Glu Ala
130 135 140

Ile Ser Phe Pro Thr Thr Leu Gly Met Asn Lys Cys Tyr Ile Gln Ile
145 150 155 160

Met Asp Leu Gly His Met Cys Asp Ala Thr Met Ser Tyr Glu Cys Pro
165 170 175

```
Met Leu Asp Glu Gly Val Glu Pro Asp Asp Val Asp Cys Trp Cys Asn
            180                 185                 190

Thr Thr Ser Thr Trp Val Val Tyr Gly Thr Cys His His Lys Lys Gly
        195                 200                 205

Glu Ala Arg Arg Ser Arg Arg Ala Val Thr Leu Pro Ser His Ser Thr
    210                 215                 220

Arg Lys Leu Gln Thr Arg Ser Gln Thr Trp Leu Glu Ser Arg Glu Tyr
225                 230                 235                 240

Thr Lys His Leu Ile Arg Val Glu Asn Trp Ile Phe Arg Asn Pro Gly
                245                 250                 255

Phe Ala Leu Ala Ala Ala Ala Ile Ala Trp Leu Leu Gly Ser Ser Thr
            260                 265                 270

Ser Gln Lys Val Ile Tyr Leu Val Met Ile Leu Leu Ile Ala Pro Ala
        275                 280                 285

Tyr Ser Ile Arg Cys Ile Gly Val Ser Asn Arg Asp Phe Val Glu Gly
    290                 295                 300

Met Ser Gly Gly Thr Trp Val Asp Val Val Leu Glu His Gly Gly Cys
305                 310                 315                 320

Val Thr Val Met Ala Gln Asp Lys Pro Thr Val Asp Ile Glu Leu Val
                325                 330                 335

Thr Thr Thr Val Ser Asn Met Ala Glu Val Arg Ser Tyr Cys Tyr Glu
            340                 345                 350

Ala Ser Ile Ser Asp Met Ala Ser Asp Ser Arg Cys Pro Thr Gln Gly
        355                 360                 365

Glu Ala Tyr Leu Asp Lys Gln Ser Asp Thr Gln Tyr Val Cys Lys Arg
    370                 375                 380

Thr Leu Val Asp Arg Gly Trp Gly Asn Gly Cys Gly Leu Phe Gly Lys
385                 390                 395                 400

Gly Ser Leu Val Thr Cys Ala Lys Phe Ala Cys Ser Lys Lys Met Thr
                405                 410                 415

Gly Lys Ser Ile Gln Pro Glu Asn Leu Glu Tyr Arg Ile Met Leu Ser
            420                 425                 430

Val His Gly Ser Gln His Ser Gly Met Ile Val Asn Asp Thr Gly His
        435                 440                 445

Glu Thr Asp Glu Asn Arg Ala Lys Val Glu Ile Thr Pro Asn Ser Pro
    450                 455                 460

Arg Ala Glu Ala Thr Leu Gly Gly Phe Gly Ser Leu Gly Leu Asp Cys
465                 470                 475                 480

Glu Pro Arg Thr Gly Leu Asp Phe Ser Asp Leu Tyr Tyr Leu Thr Met
                485                 490                 495

Asn Asn Lys His Trp Leu Val His Lys Glu Trp Phe His Asp Ile Pro
            500                 505                 510

Leu Pro Trp His Ala Gly Ala Asp Thr Gly Thr Pro His Trp Asn Asn
        515                 520                 525

Lys Glu Ala Leu Val Glu Phe Lys Asp Ala His Ala Lys Arg Gln Thr
    530                 535                 540

Val Val Val Leu Gly Ser Gln Glu Gly Ala Val His Thr Ala Leu Ala
545                 550                 555                 560

Gly Ala Leu Glu Ala Glu Met Asp Gly Ala Lys Gly Arg Leu Ser Ser
                565                 570                 575

Gly His Leu Lys Cys Arg Leu Lys Met Asp Lys Leu Arg Leu Lys Gly
            580                 585                 590

Val Ser Tyr Ser Leu Cys Thr Ala Ala Phe Thr Phe Thr Lys Ile Pro
```

-continued

```
        595                 600                 605

Ala Glu Thr Leu His Gly Thr Val Thr Val Glu Leu Gln Tyr Ala Gly
    610                 615                 620

Thr Asp Gly Pro Cys Lys Val Pro Ala Gln Met Ala Val Asp Met Gln
625                 630                 635                 640

Thr Leu Thr Pro Val Gly Arg Leu Ile Thr Ala Asn Pro Val Ile Thr
                645                 650                 655

Glu Ser Thr Glu Asn Ser Lys Met Met Leu Glu Leu Asp Pro Pro Phe
            660                 665                 670

Gly Asp Ser Tyr Ile Val Ile Gly Val Gly Glu Lys Lys Ile Thr His
        675                 680                 685

His Trp His Arg Ser Gly Ser Thr Ile Gly Lys Ala Phe Glu Ala Thr
    690                 695                 700

Val Arg Gly Ala Lys Arg Met Ala Val Leu Gly Asp Thr Ala Trp Asp
705                 710                 715                 720

Phe Gly Ser Val Gly Gly Ala Leu Asn Ser Leu Gly Lys Gly Ile His
                725                 730                 735

Gln Ile Phe Gly Ala Ala Phe Lys Ser Leu Phe Gly Gly Met Ser Trp
            740                 745                 750

Phe Ser Gln Ile Leu Ile Gly Thr Leu Leu Met Trp Leu Gly Leu Asn
        755                 760                 765

Thr Lys Asn Gly Ser Ile Ser Leu Met Cys Leu Ala Leu Gly Gly Val
    770                 775                 780

Leu Ile Phe Leu Ser Thr Ala Val Ser Ala
785                 790


<210> SEQ ID NO 18
<211> LENGTH: 75
<212> TYPE: DNA
<213> ORGANISM: Artificial Sequence
<220> FEATURE:
<223> OTHER INFORMATION: F2A

<400> SEQUENCE: 18

ggctccggcg tgaaacagac tttgaatttt gaccttctca agttggccgg agacgtcgag      60

tccaaccctg ggccc                                                       75
```

ZIKA VIRUS CONSTRUCTS AND THERAPEUTIC COMPOSITIONS THEREOF

CROSS-REFERENCE TO RELATED APPLICATIONS

This application claims the benefit of U.S. Patent Application No. 62/850,759, filed May 21, 2019, which is herein incorporated by reference in its entirety.

REFERENCE TO A SEQUENCE LISTING SUBMITTED VIA EFS-WEB

The content of the ASCII text file of the sequence listing named “20200520_034044_204WO1_ST25” which is 121 kb in size was created on May 19, 2020, and electronically submitted via EFS-Web herewith the application is incorporated herein by reference in its entirety.

BACKGROUND OF THE INVENTION

1. Field of the Invention

The present invention generally relates to Zika virus mutants and therapeutic compositions thereof, which may be used in the treatment of cancer.

2. Description of the Related Art

Gliomas are a type of brain tumor comprised of non-neuronal glial cells. Glioma accounts for 80% of all primary malignant brain tumors. Despite decades of research, patients with glioblastoma, the most common and deadly form of glioma, have a 5-year survival rate of 5.1%. Standard therapy for high-grade glioma requires a combination of surgical resection, radiation, and chemotherapy. Despite recent advances in malignant glioma research, only modest progress has been achieved in improving patient prognosis and quality of life. Glioblastoma (GB), the most common primary malignant brain tumor, is nearly universally fatal, with an average survival of 16 months following gross-total resection and adjuvant therapy. Glioblastoma is comprised of a heterogeneous cell population consisting of self-renewing cancer stem cells (CSCs) and varying degrees of differentiated tumor cells. Glioblastoma, also known as glioblastoma multiforme (GBM), likely arises from transformed glial populations of oligodendrocytes and the tumor propagating cells are a mix of oligodendrocyte progenitor cells (OPCs)/astrocytes/and undifferentiated glioblasts.

PCT publication WO 2018/035294 discloses the oncolytic effect of wild-type ZIKV strains on tumor cells, particularly gliomas and glioblastomas. Zika virus (ZIKV) is a mosquito-borne human pathogen of the Flaviviridae family. The ZIKV genome consists of a 10.8-kilobase single-stranded positive-sense RNA that codes for three structural proteins (capsid (C), membrane (prM/M), and envelope (E)) and seven non-structural proteins (NS1, NS2A, NS2B, NS3, NS4A, NS4B, and NS5). In addition, there are short UTRs on both the 5' and 3' ends of the genome. The mature ZIKV virion is roughly spherical and about 50 nm in diameter. It contains a nucleocapsid that is surrounded by an icosahedral shell consisting of 180 copies of both E glycoprotein and M protein anchored in a lipid bilayer. The flavivirus E protein, arranged as dimers on the surface of the mature virion, is the major viral protein involved in host-cell entry factor binding and fusion. Each E protein monomer consists of four domains—three ectodomains (DI, DII, and DIII) and a transmembrane domain (TM). The structurally central DI acts as a bridge between DII and DIII and contains one N-linked glycosylation site (N154). The N-linked glycosylation site is conserved across most flaviviruses and has been shown to be important for optimal infection of mosquito and mammalian cells. DII includes the dimerization interface and a fusion loop that interacts with the endosomal membrane after conformation change. The IgG-like DIII is a continuous polypeptide segment and is thought to be important for binding to entry factors. Several host entry factors, including DC-SIGN, AXL, and TYRO3, have been shown to be important for mediating ZIKV infection.

ZIKV infection is mostly asymptomatic, but it can cause influenza-like symptoms, such as fever, headache, joint pain, and maculopapular rash. Unfortunately, the recent outbreak of ZIKV in the Americas indicates that ZIKV can cause more serious disease, including microcephaly, other congenital malformations, and Guillain-Barré syndrome, and even death.

SUMMARY OF THE INVENTION

In some embodiments, the present invention provides a Zika Vector comprising a Zika virus genome, which lacks sequences that encode functional Zika virus capsid, matrix, and envelope proteins as described herein. In some embodiments, the present invention provides a ZIKV-E mutant, which comprises an E gene that encodes an envelope (E) protein having one or more amino acid mutations (i.e., substitutions, deletions, and/or insertions) as compared to the wildtype E protein (e.g., SEQ ID NO: 2), and (2) exhibits reduced E protein glycosylation as compared to a wildtype ZIKV strain (e.g., GenBank Accession Number KU501215, clinical isolate PRVABC59) having asparagine at amino acid position 154 (N154) in the envelope protein. The Zika Vector and the ZIKV-E mutant may be used to deliver one or more passenger sequences to a subject or a cell. In some embodiments the one or more passenger sequences are exogenous to the Zika virus genome of the given Zika Vector or ZIKV-E mutant. In some embodiments, the one or more passenger sequences is or encodes an immunomodulatory agent. In some embodiments, the immunomodulatory agent is IL2, IL15, IL18, CCL5 (RANTES), or TNFSF14 (LIGHT). In some embodiments, the one or more passenger sequences is or encodes a protein of interest, e.g., a therapeutic protein or an antigen or antigenic epitope thereof. In some embodiments, the Zika Vector is a ZIKV-Im mutant as described herein. In some embodiments, the ZIKV-E mutant is a ZIKV-Im mutant as described herein. In some embodiments, the present invention provides compositions which comprise one or more ZIKV constructs (i.e., one or more ZIKV-E mutants, one or more Zika Vectors, and/or one or more ZIKV-Im mutants) as described herein.

In some embodiments, the present invention provides a method of treating a cancer and/or aberrant neuroprogenitor cells in a subject, which comprises administering one or more ZIKV constructs or a pharmaceutical composition thereof to the subject. In some embodiments, the ZIKV construct is a ZIKV-E mutant as described herein. In some embodiments, the ZIKV construct is a ZIKV-Im mutant as described herein. In some embodiments, the ZIKV construct is both a ZIKV-E mutant and a ZIKV-Im mutant. In some embodiments, the ZIKV construct is a Zika Vector. In some embodiments, the one or more Zika Vectors and/or the one or more ZIKV-E mutants comprise one or more passenger sequences. In some embodiments the one or more passenger sequences are exogenous to the Zika virus genome of the given Zika Vector or ZIKV-E mutant. In some embodiments, the passenger sequence is or encodes an immunomodulatory agent. In some embodiments, the immunomodulatory agent is IL2, IL15, IL18, CCL5 (RANTES), or TNFSF14 (LIGHT). In some embodiments, the passenger sequences is or encodes a therapeutic protein such as CT20p-NP, Poropeptide-Bax, R8-Bax, RRM-IL12, RRM-MV, or TAT-Bim, BAC1-ELP-H1, or RGD-PEG-Suc-PD0325901. In some embodiments, a therapeutically effective amount of the one or more ZIKV constructs is administered to the subject by, for example, by subcutaneous delivery, intravenous delivery, intratumoral delivery, intracerebral delivery, and/or intracarotid delivery. In some embodiments, the one or more ZIKV constructs are administered to the subject a ratio of about 1:1 to about 10:1 of the cells to be treated or infected by the given construct. In some embodiments, the method further comprises administering one or more AKT inhibitors, e.g., MK-2206, to the subject. In some embodiments, the cancer is a ZIKV-treatable cancer such as a glioma, a glioblastoma, a neuroblastoma, or a retinoblastoma. In some embodiments, subject is mammalian. In some embodiments, subject is human.

In some embodiments, the present invention provides a method of delivering one or more passenger sequences to a subject or a cell, which comprises administering one or more Zika Vectors comprising the one or more passenger sequences to the subject or cell. In some embodiments the one or more passenger sequences are exogenous to the Zika virus genome of the one or more Zika Vectors. In some embodiments, the one or more passenger sequences are or encode an immunomodulatory agent. In some embodiments, the immunomodulatory agent is IL2, IL15, IL18, CCL5 (RANTES), or TNFSF14 (LIGHT). In some embodiments, the one or more passenger sequences encode a protein of interest, e.g., a therapeutic protein or an antigen or antigenic epitope thereof.

In some embodiments, the present invention provides a method of inducing an immune response in a subject, which comprises administering to the subject one or more ZIKV constructs as described herein. In some embodiments, the ZIKV construct is a ZIKV-E mutant as described herein. In some embodiments, the ZIKV construct is a ZIKV-Im mutant as described herein. In some embodiments, the ZIKV construct is both a ZIKV-E mutant and a ZIKV-Im mutant. In some embodiments, the ZIKV construct is a Zika Vector. In some embodiments, the one or more Zika Vectors and/or the one or more ZIKV-E mutants comprise one or more passenger sequences. In some embodiments the one or more passenger sequences are exogenous to the Zika virus genome of the given Zika Vector or ZIKV-E mutant. In some embodiments, the one or more passenger sequences are or encode an immunomodulatory agent. In some embodiments, the immunomodulatory agent is IL2, IL15, IL18, CCL5 (RANTES), or TNFSF14 (LIGHT). In some embodiments, the one or more passenger sequences encode an antigen or an antigenic epitope thereof. In some embodiments, the antigen or the antigenic epitope is of a pathogen. In some embodiments, the one or more passenger sequences encode a nucleocapsid protein, an envelope protein, a spike protein, or one or more fragments thereof of a given virus. In some embodiments, an immunogenic amount of the one or more ZIKV constructs is administered to the subject.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description explain the principles of the invention.

DESCRIPTION OF THE DRAWINGS

This invention is further understood by reference to the drawings wherein:

FIG. 2 is a graph showing the induction of apoptotic cell death by a ZIKV-E mutant (VAX2B) in glioblastoma cancer cells at 24 hours post infection. The first bar on the left is Mock followed by two sets of bars in which the first bar of each set is ZIKV wild-type (PRVABC59), and the second bar of each set is VAX2B. FIG. 3 is a Kaplan-Meier survival plot showing the percent survival of Ifnar1−/− mice following infection with wild-type ZIKV (PRVABC59 and MR766) and ZIKV-E mutants (VAX2A and VAX2B). Negative control mice (Mock) and mice infected with the ZIKV-E mutants exhibited 100% survival over the entire study period. FIG. 4 shows the serum viral load of VAX2B at 7 days post infection (dpi). FIG. 5 shows the mean percent body weight change of mice post-subcutaneous inoculation with Mock, wild-type PRVABC59, wild-type MR766 and two different ZIKV-E mutants, VAX2A and VAX2B. Furthermore, body weight of individual mouse for each group is given for mock, wild-type PRVABC59, wild-type MR766, VAX2A, and VAX2B. Error bars represent the standard deviation (SD). Students t-test, p value<0.05(*), and p<0.0001(***).

FIG. 6 shows exemplary bright field images taken 7 days post-infection (dpi). Cell lines that were susceptible to the ZIKV-E mutant are categorized as "Responders" and cell lines that were less susceptible are categorized as "Non-Responders". FIG. 7 is a graph showing cell viability of the indicated cell lines at 7 dpi. FIG. 8 is a graph summarizing the cleaved caspase 3/7 activity (apoptosis) of the indicated cell lines at 7 dpi. FIG. 9 and FIG. 10: Graphs showing that the indicated Non-Responder (FIG. 9) and Responder (FIG. 10) GBM cell lines support high levels of ZIKV-E mutant viral production.

FIG. 12 schematically shows the experimental design of in vivo experiments using 8-10 week old Female NSG mice. Subjects were divided into three groups: Control (PBS), ZIKV-E, and ZIKV-E Pre-Treatment. Subjects of the ZIKV-E Pre-Treatment Group were treated with the ZIKV-E mutant 4 hours before xenograft implantation. Xenograft implantation: $2\times10^6$ U-87 MG cells were implanted SQ in the left hind flank of each subject. On Day 17 and Day 24, Controls and ZIKV-E Pre-Treatment subjects were administered PBS while the ZIKV-E subjects were treated with the ZIKV-E mutant. The dose of the ZIKV-E mutant (VAX2B) administered was MOI 1 ($2\times10^6$ PFU/mouse). FIG. 13 is a graph showing that subjects pretreated with the ZIKV-E mutant do not develop tumors and treatment with the ZIKV-E mutant effectively reduced tumor volume ($mm^3$) by Day 34. By Day 43, only a small connective tissue tumor remnant in some ZIKV-E subjects. FIG. 14 is a Kaplan-Meier Survival curve (n=8 mice/group) showing that untreated positive controls (Group A, PBS+ tumor xenograft) died by Day 40, whereas subjects of the negative control, ZIKV-E, and ZIKV-E Pre-Treatment Groups exhibit 100% survival past Day 40. FIG. 15 is a graph summarizing the ZIKV-E mutant viral titers in subjects of the positive control group (taken Days 30-38) and the ZIKV-E group (taken Day 43). Error bars represent the standard deviation (SD). Students t-test indicated statistically significant ($p<0.0001$) differences between Group A and ZIKV-E group.

FIG. 16 is a graph showing that the ZIKV-E treated subjects maintained their body weight. FIG. 17 is a Kaplan-Meier survival plot showing 100% survival of ZIKV-E subjects. FIG. 18 is a graph showing that the ZIKV-E mutant, at least, inhibited the growth of the GS025 tumor cells. Error bars represent the standard deviation (SD). Students t-test, $p<0.05$(*), $p<0.001$(), and $p<0.0001$ (*).

FIG. 24: Kaplan-Meier survival graph shows 100% mortality in wildtype ZIKV infected pups and complete protection in VAXR1 inoculated pups. FIG. 25: VAXR1 inoculated mice did not have any replicating virus, which had below detectable level of virus compared to wild-type virus infected pups. * $p<0.0001$ FIG. 26: Schematic diagram of immunization and key timepoints. FIG. 27: Percent body weight change in PBS control (Un-Vac) and VAXR1 (Vac) immunized mice. FIG. 28: Percent body weight change of pregnant animals. FIG. 29**: Body weight of E20.5 fetuses of vaccinated (Vac) and un-vaccinated (Un-Vac) pregnant mice. Growth retardation was observed in fetuses of un-vaccinated mothers, but not in fetuses of vaccinated mothers.

FIG. 30: The percentage of splenic monocytes, neutrophils, dendritic cells, and B-cells were determined for PBS, and vaccinated and non-vaccinated mice at 8 days after subcutaneous ZIKV challenge. FIG. 31: Percentage of splenic CD4+ T-cells, central memory CD4+ T-cells (CD4+CD44+CD62L+), effector memory CD4+ T-cells (CD4+CD44+CD62L−), CD8a+ T-cells, central memory CD8+ T-cells (CD8+CD44+ CD62L+), and effector memory CD8+ T-cells (CD8+CD44+ CD62L−) at 8 days after subcutaneous ZIKV challenge.

DETAILED DESCRIPTION OF THE INVENTION

Figure 1:
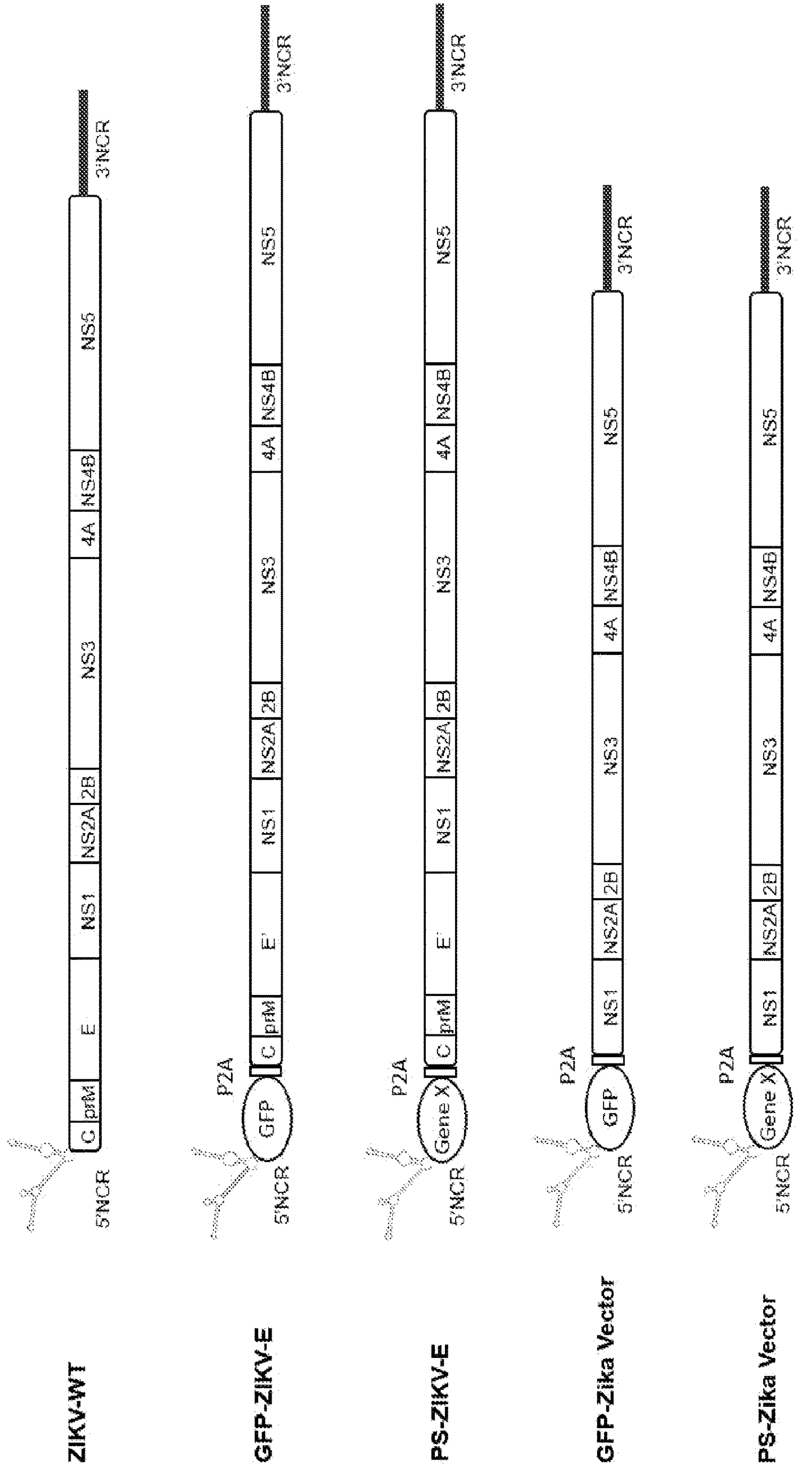
FIG. 1 schematically shows some of the ZIKV constructs exemplified herein: a wild-type ZIKV strain (ZIKV-WT), a GFP-labeled ZIKV-E mutant (GFP-ZIKV-E), a ZIKV-E mutant comprising a passenger sequence, Gene X (PS-ZIKV-E), a GFP-labeled Zika Vector, which lacks the structural genes encoding capsid, prM, and E proteins (GFP-Zika Vector), and a Zika Vector comprising a passenger sequence, Gene X (PS-Zika Vector). GFP=green fluorescent protein, P2A=F2A linker sequence, Gene X=gene encoding a passenger sequence such as an immunomodulatory agent (e.g., a cytokine such as CCL5, IL18, IL2, and TNFSF14).

FIG. 1 schematically shows a wild-type Zika virus (ZIKV-WT) and ZIKV constructs: ZIKV-E mutants (GFP-ZIKV-E and PS-ZIKV-E) and Zika Vectors (GFP-Zika Vector and PS-Zika Vector). As provided herein, ZIKV-E mutants exhibit oncolytic activity and better in vivo safety profiles compared to wildtype ZIKV strains (e.g., PRV-ABC59, and MR766) and Zika Vectors are safe delivery vectors for passenger sequences. That is, subjects infected with wildtype ZIKV strains had significantly more weight loss, viral replication, and mortality compared with subjects infected with the recombinant ZIKV-E mutants and Zika Vectors as described herein.

Figure 2:
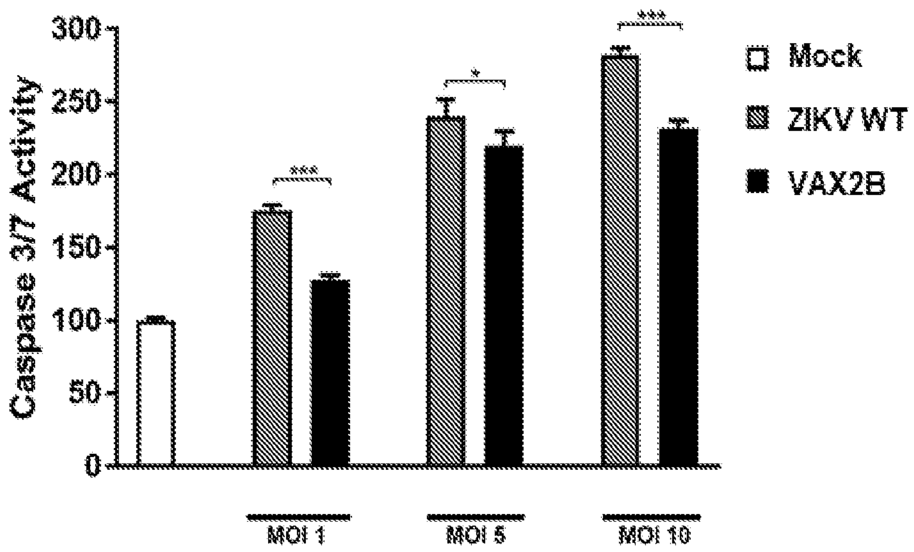
FIG. 2-FIG. 5: Safety profile of ZIKV-E mutants.
Figure 3:
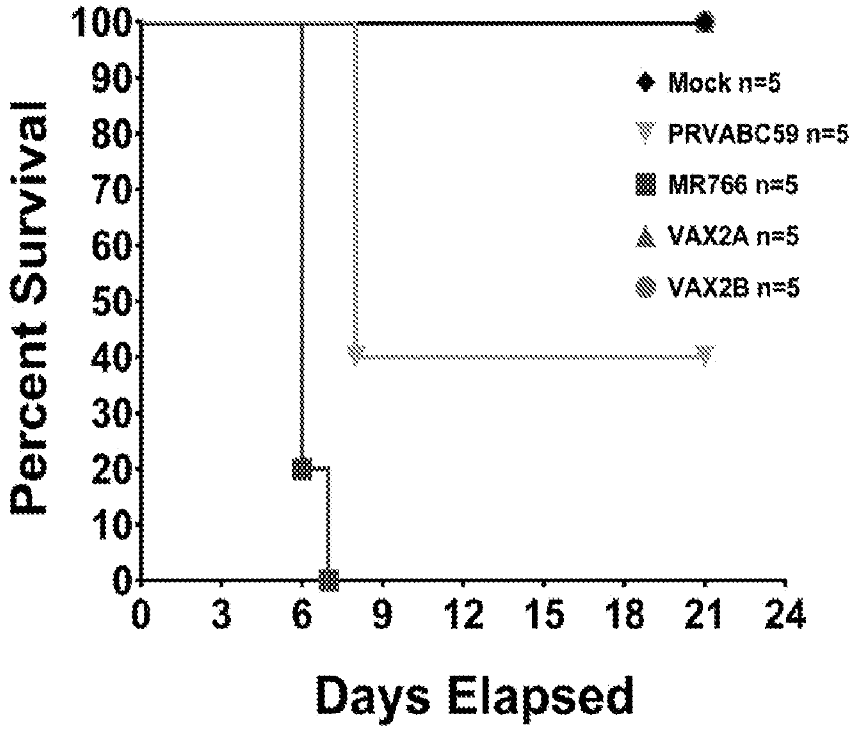
Figure 4:
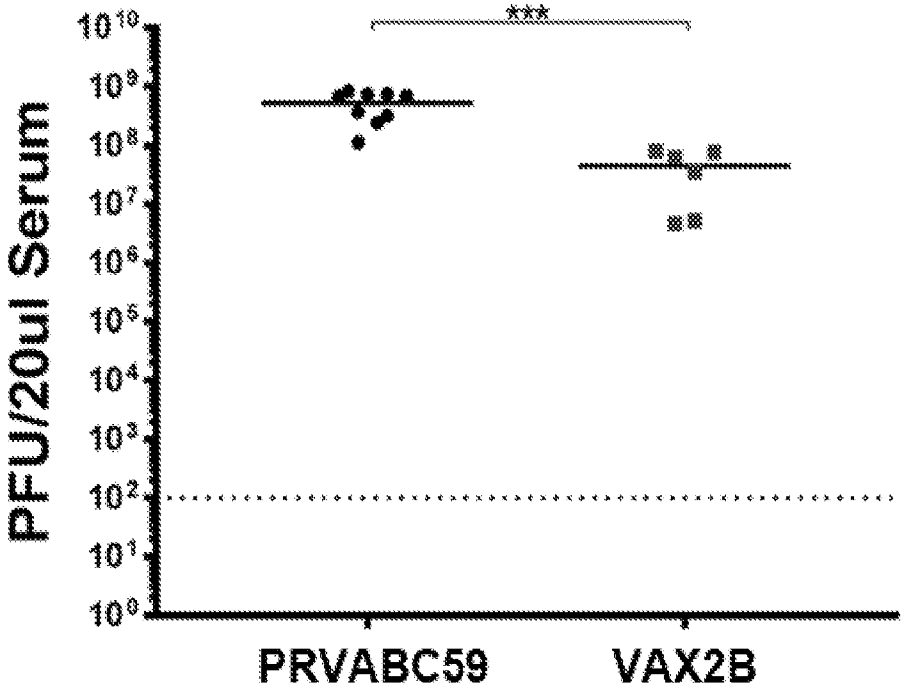
Figure 5:
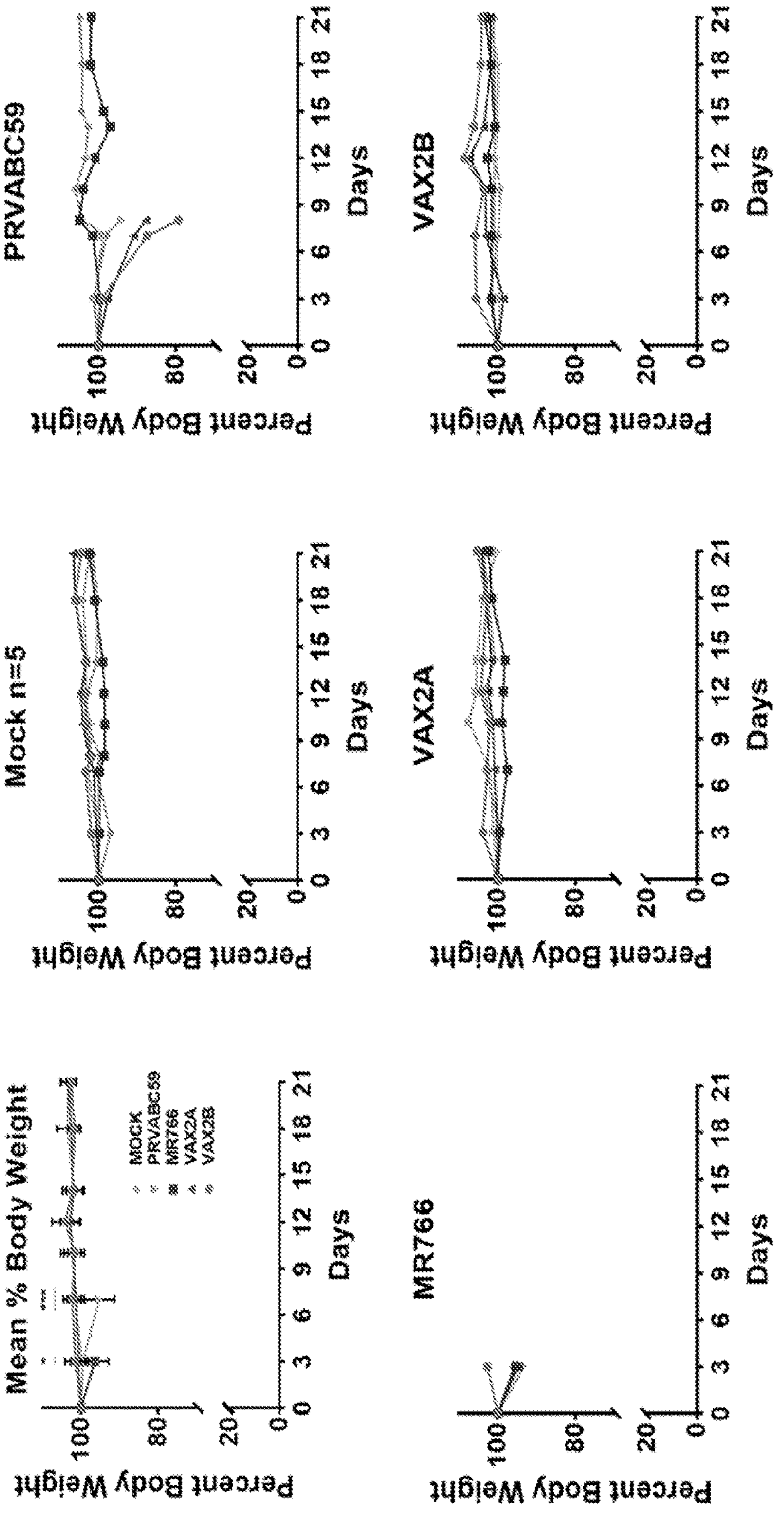

As shown in FIG. 2, glioblastoma (GB) cells infected with a ZIKV-E mutant (with an envelope (E) protein having SEQ ID NO: 1, wherein the amino acid residue at position 154 is Thr) as compared to a wildtype E protein (SEQ ID NO: 2) had poor viability and underwent caspase 3/7-mediated apoptotic cell death. The safety profile of the ZIKV-E mutant was evaluated in a pre-clinical mice model. 8-12 weeks old ifnral-1-were infected with a dose of $1\times10^6$ pfu/mouse through subcutaneous route and the mice were followed up for 21 days. As shown in FIG. 5, mice infected with the ZIKV-E mutants remained healthy without having weight loss. As shown in FIG. 4, at Day 7 post-infection, mice infected with the ZIKV-E mutants had an order of magnitude lower blood viral load than those infected with wildtype ZIKV strains. As shown in FIG. 3, mice infected with the ZIKV-E mutants exhibited 100% survival, whereas mice infected with wildtype ZIKV strains exhibited at least 60% mortality before 9 days post infection. Therefore, compared to wildtype ZIKV strains (e.g., PRVABC59 and MR766), ZIKV-E mutants provide a superior in vivo safety profile.

Figure 22:
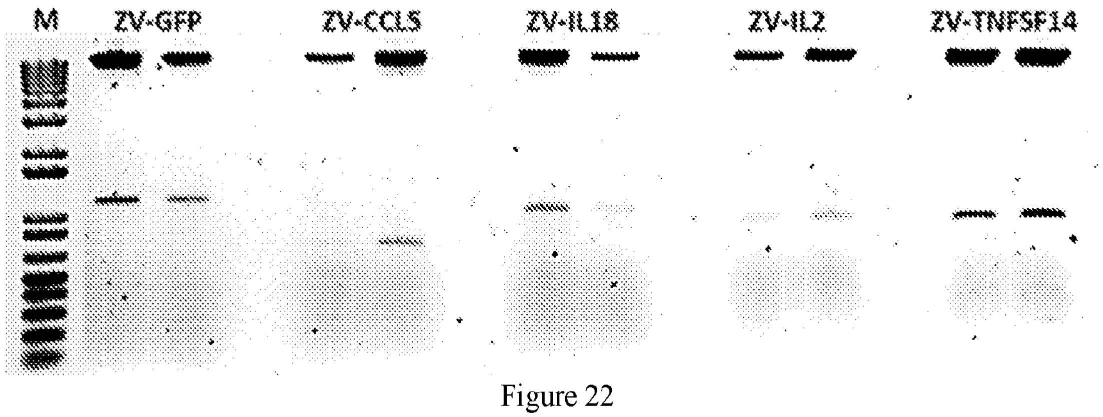
FIG. 22 is a DNA gel electrophoresis image of digestion of ZIKV-Im mutant constructs. Genes encoding GFP, CCL5, IL18, IL2, and TNFSF14 were cloned into Zika Vector of FIG. 20. Gel image shows two independent clones per construct. M: 1 kb plus DNA ladder.

Also disclosed herein are ZIKV-Im mutants, which are Zika Vectors that express an immunomodulatory agent, e.g., an immunoadjuvant. Specifically, sequences encoding human cytokines CCL5 (SEQ ID NO: 3), IL18 (SEQ ID NO: 4), IL2 (SEQ ID NO: 5), and TNFSF14 (LIGHT) (SEQ ID NO: 6) were cloned into a Zika Vector lacking structural genes (Capsid, prM, and envelope), e.g., SEQ ID NO: 7, to result in ZV-CCL5 (SEQ ID NO: 8), ZV-IL18 (SEQ ID NO: 9), ZV-IL2 (SEQ ID NO: 10), and ZV-TNFSF14 (SEQ ID NO: 11), respectively. For constructing these recombinant viruses, cloning strategies, and primers for PCR amplifications of the target genes were designed and developed to create two overlapping segments. These two segments were then PCR stitched into one segment and inserted into a specific region in the 5' end of the envelope region. The final PCR product was cloned into the plasmid encoding the parental wild-type ZIKV strain (PRVABC59) and the insert (i.e., nucleic acid molecule encoding the immunomodulatory agent) was confirmed by restriction analysis using EcoRI-KpnI enzymes and sequenced for verification. See FIG. 22.

While generating the ZV-CCL5, ZV-IL18, ZV-IL2, and ZV-TNFSF14 constructs, the structural genes, i.e., Capsid, prM, and envelope (E), were removed to make these constructs into one-cycle replication competent vectors. For production of the viral particles, the structural genes and the constructs containing the gene encoding the immunomodulatory agent can be packaged using 293T cells. The resulting viral particles can be used as therapeutic agents alone or in combination with replication competent ZIKV-E mutants and/or other ZIKV constructs.

ZIKV-E Mutants, Zika Vectors, and ZIKV-Im Mutants

As used herein, "ZIKV constructs" include ZIKV-E mutants, Zika Vectors, and/or ZIKV-Im mutants as described herein.

In some embodiments, ZIKV-E mutants are contemplated herein. As used herein, a "ZIKV-E mutant" refers to a recombinant Zika virus (ZIKV) that (1) has an E gene that encodes an envelope (E) protein having one or more amino acid mutations (i.e., substitutions, deletions, and/or insertions) as compared to the wildtype E protein (SEQ ID NO: 2), and (2) exhibits reduced E protein glycosylation as compared to a wildtype ZIKV strain (e.g., GenBank Accession Number KU501215, clinical isolate PRVABC59) having asparagine at amino acid position 154 (N154) in the envelope protein. In some embodiments, the one or more amino acid mutations of the ZIKV-E mutants comprise an N154X substitution, wherein X is any amino acid other than asparagine. In some embodiments, the N154X substitution is N154T, N154H, N154D, N154Y, N154T, N154S, N154I, N154K, or N154K. In some embodiments, the N154X substitution is N154T, N154D, N154E, N154S, N154A, N154V, or N154Q. In some embodiments, the N154X substitution is N154T, N154D, N154E, N154S, or N154A. In some embodiments, the N154X substitution is N154T or N154D. In some embodiments, the ZIKV-E mutants have an E protein having at least 90%, 91%, 92%, 93%, 94%, 95%, 96%, 97%, 98%, or 99% sequence identity to SEQ ID NO: 1, and an amino acid residue other than Asn at amino acid position 154, and preferably the amino acid at position 154 is Thr, Asp, Glu, Ser, Ala, Val, or Gln, more preferably the amino acid at position 154 is Thr, Asp, Glu, Ser, Ala, and most preferably the amino acid at position 154 is Thr or Asp. In some embodiments, the ZIKV-E mutants are also ZIKV-Im mutants as described in the paragraph below. In some embodiments, the ZIKV-E mutants lack one or more structural proteins (e.g., genes encoding Capsid, prM, and/or Envelope proteins).

As used herein, a "Zika Vector" or "Zika Vaccine Vector" refers to a replication defective viral vector that comprises a Zika virus genome except for sequences encoding functional Zika virus capsid, matrix, and envelope proteins. In some embodiments, the Zika Vectors lack sequences that encode Zika virus capsid, matrix, and envelope proteins. The Zika virus genome may be of any Zika virus known in the art, including those set forth in WO 2018035294. In some embodiments, the Zika virus genome has 94%, 95%, 96%, 97%, 98%, 99%, or 100% sequence identity to Accession No. NC_012532.1. In some embodiments, the Zika virus genome comprises the sequence set forth in Accession No. NC 012532.1. In some embodiments, the Zika virus genome comprises a sequence as set forth in Accession No. NC_012532.1, with one or more silent mutations thereof. In some embodiments, the Zika Vector comprises a sequence that has 90%, 91%, 92%, 93%, 94%, 95%, 96%, 97%, 98%, 99%, or 100% sequence identity to nucleotides 742-9337 of SEQ ID NO: 1. In some embodiments, the Zika Vector comprises nucleotides 742-9337 of SEQ ID NO: 1, with one or more silent mutations. In some embodiments, the Zika Vector comprises a CMV promoter. In some embodiments, the Zika Vector comprises a BsiWI linker sequence. In some embodiments, the Zika Vector comprises a hepatitis delta virus ribozyme (HDVR) sequence. In some embodiments, the Zika Vector comprises an SV40 PolyA sequence. In some embodiments, the Zika Vector comprises a pBR322 cloning vector sequence.

As used herein, a "passenger sequence" refers to any nucleic acid molecule of interest that are exogenous to the ZIKV genome. Non-limiting examples of passenger sequences include nucleic acid sequences that encode immunomodulatory agents such as cytokines, antigens and antigenic epitopes, and therapeutic proteins. Exemplary therapeutic proteins include Bac-7-ELP-p21, BAC1-ELP-H1, BR2, Buforin IIb, Cardiac natriuretic peptides, CT20p-NP, Dox-TAT, F8A, FWCS, Int-H1-S6A, LPD-PEG-NGR, Magainin II, NRC-3, NRC-7, p16, Pen-ELP-H1, Pen-ELP-p21, PNC-2, PNC-21, PNC-27, PNC-28, PNC-7, Poropeptide-Bax, R8-Bax, RGD-PEG-Suc-PD0325901, RGD-SSL-Dox, RRM-IL12, RRM-MV, TAT-Bim, Tat-αHDM2, VWCS, Neo-2/15, and the like. In some embodiments, the therapeutic protein is CT20p-NP, Poropeptide-Bax, R8-Bax, RRM-IL12, RRM-MV, or TAT-Bim. In some embodiments, the therapeutic protein is BAC1-ELP-H1 or RGD-PEG-Suc-PD0325901.

In some embodiments, ZIKV-Im mutants are contemplated herein. As used herein, a "ZIKV-Im mutant" refers to a Zika virus (ZIKV) (including Zika Vectors) that has been modified to express an exogenous immunomodulatory agent, such as a cytokine. In some embodiments, the cytokine is a human cytokine. In some embodiments, the cytokine is IL2, IL15, IL18, CCL5 (RANTES), or TNFSF14 (LIGHT). In some embodiments, the ZIKV-Im mutants are also ZIKV-E mutants as described in the paragraph above. In some embodiments, the ZIKV-Im mutants lack one or more structural proteins genes (e.g., genes encoding Capsid, prM, and/or Envelope proteins).

Compositions

Compositions, including pharmaceutical compositions and vaccines, comprising, consisting essentially of, or consisting of one or more ZIKV constructs are contemplated herein. As used herein, the phrase "consists essentially of" in the context of "a composition consisting essentially of [a given] ZIKV construct" means that the composition may comprise additional ingredients, including active pharmaceutical ingredients, except for other ZIKV constructs other than the given ZIKV construct. The term "pharmaceutical composition" refers to a composition suitable for pharmaceutical use in a subject. A pharmaceutical composition generally comprises a therapeutically effective amount of an active agent, e.g., one or more ZIKV constructs as contemplated herein, and a pharmaceutically acceptable carrier. In some embodiments, the pharmaceutical compositions comprise one or more ZIKV constructs and a pharmaceutically acceptable carrier that is suitable for administration to a subject.

As used herein, a "pharmaceutically acceptable vehicle" or "pharmaceutically acceptable carrier" are used interchangeably and refer to solvents, dispersion media, coatings, antibacterial and antifungal agents, isotonic and absorption delaying agents, and the like, that are compatible with pharmaceutical administration and comply with the applicable standards and regulations, e.g., the pharmacopeial standards set forth in the United States Pharmacopeia and the National Formulary (USP-NF) book, for pharmaceutical administration. Thus, for example, unsterile water is excluded as a pharmaceutically acceptable carrier for, at least, intravenous administration. Pharmaceutically acceptable vehicles include those known in the art. See, e.g., Remington: The Science and Practice of Pharmacy 20th ed (2000) Lippincott Williams & Wilkins, Baltimore, MD In some embodiments, the pharmaceutically acceptable vehicle is one that is suitable for intravenous, subcutaneous, intranasal, or intratumoral administration to a subject. In some embodiments, the pharmaceutically acceptable carrier is sterile. In some embodiments, the pharmaceutically acceptable carrier is sterile saline, which may be buffered. Preferred pharmaceutical compositions are those comprising, consisting essentially of, or consisting of one or more ZIKV constructs in a therapeutically effective amount or an immunogenic amount, and a pharmaceutically acceptable vehicle.

As used herein, an "effective amount" refers to a dosage or amount sufficient to produce a desired result. The desired result may comprise an objective or subjective change as compared to a control in, for example, in vitro assays, and other laboratory experiments. As used herein, a "therapeutically effective amount" refers to an amount sufficient to produce a desired therapeutic result as compared to a negative control. The desired therapeutic result may comprise an objective or subjective improvement in, e.g., long-term survival, effective prevention of a disease state, the level or concentration of a given biomarker, and the like. Therapeutically effective amount includes amounts that treat, prevent, or inhibit a given disease or condition, such as ZIKV-treatable cancer, in a subject as compared to a control, such as a placebo. The skilled artisan will appreciate that certain factors may influence the amount required to effectively treat a subject, including the degree of the given disease or affliction, previous treatments, the general health and age of the subject, and the like. Nevertheless, therapeutically effective amounts may be readily determined by methods in the art. In some embodiments, a therapeutically effective amount of a given ZIKV construct comprises about 10e3 to 10e11 (log scale) viral particles (VP). In some embodiments, the therapeutically effective amount comprises about 10e4 to 10e11 (log scale) viral particles (VP). In some embodiments, the therapeutically effective amount comprises about 10e3, 10e4, 10e5, 10e6, 10e7, 10e8, 10e9, 10e10, or 10e11 of VP. The therapeutically effective amount may depend the extent of the given disease or amount of tissue to be treated. For example, tumor volumes of about 1 $cm^3$ can be treated with about 10e3 to 10e9 viral particles and tumor volumes of about 100 $cm^3$ can be treated with about 10e6 to 10e11 viral particles. In some embodiments, the therapeutically effective amount is one that provides a multiplicity of infection (MOI) of at least 1, an MOI of 1-10, or an MOI of 1-5. In some embodiments, the therapeutically effective amount is one that provides an MOI of 1, 2, 3, 4, or 5. In some embodiments, the therapeutically effective amount is at least about the amount of cells to be treated (i.e., intended to be infected by the viral particles). In some embodiments, the ratio of viral particles to cells to be treated ranges from about 1:1 to about 10:1. In some embodiments, the ratio of viral particles to cells to be treated ranges from about 1:1 to about 5:1. In some embodiments, the ratio of viral particles to cells to be treated is about 1:1, about 2:1, about 3:1, about 4:1, or about 5:1.

In addition to the one or more ZIKV constructs, pharmaceutical compositions may include one or more supplementary agents. Examples of suitable supplementary agents include chemotherapeutics such as taxanes; epothilones; histone deacetylase inhibitors; inhibitors of topoisomerase I; inhibitors of topoisomerase II; kinase inhibitors; retinoids, vinca alkaloids, and the like. In some embodiments, the one or more supplementary agents are temozolomide, procarbazine, carmustine, lomustine, vincristine, and the like. In some embodiments, the pharmaceutical compositions comprising one or more ZIKV constructs further include on or more AKT inhibitors such as MK-2206 (8-[4-(1-Aminocyclobutyl)phenyl]-9-phenyl-2H-[1,2,4]triazolo[3,4-f][1,6] naphthyridin-3-one), Perifosine (KRX-0401), miltefosine, Capivasertib (AZD5363), Ipatasertib (RG7440), Pictilisib (GDC-0941), Wortamannin, and the like.

Vaccines provide a protective immune response when administered to a subject. In some embodiments, a "vaccine", is a pharmaceutical composition that comprises an immunogenic amount of at least one ZIKV construct and provides a protective immune response when administered to a subject. The protective immune response may be complete or partial, e.g., a reduction in symptoms as compared with an unvaccinated subject. As used herein, an "immunogenic amount" is an amount that is sufficient to elicit an immune response in a subject and depends on a variety of factors such as the immunogenicity of the given ZIKV construct, the degree of the given infection, the manner of administration, the general state of health of the subject, and the like. The typical immunogenic amounts of a given ZIKV construct for initial and boosting immunizations range from about 0.01-0.5 μg/kg, about 0.1-0.5 μg/kg, or about 0.35-0.5 μg/kg body weight of a subject. For example, the typical immunogenic amount for initial and boosting immunization for therapeutic or prophylactic administration for a human subject ranges from about 1-50 μg, about 1-40 μg, about 1-35 μg, about 1-30 μg, about 1-25 μg, about 1-20 μg, or about 1-15 μg. In some embodiments a single dose of a ZIKV construct for a human subject ranges from about 1-25 μg, about 5-20 μg, or about 7.5-16 μg. Examples of suitable immunization protocols include an initial vaccination (time 0), followed by one or more booster immunization at 1, 2, 3, and/or 4 weeks, or 1, 2, 3, 4, 5, and/or 6 months, or 1 or 2 years which these initial immunization vaccination may be followed by further booster immunization if needed or desired. For example, an exemplary two dose schedule is a booster immunization 6 to 12 months after the initial vaccination and an exemplary three dose schedule is a first booster immunization at 2 months and a second booster immunization at 6 months after the initial vaccination.

In addition to the one or more ZIKV constructs, the pharmaceutical compositions may include an adjuvant and/or stabilizers in the art, e.g., $MgCl_2$, $MgSO_4$, lactose-sorbitol, and sorbitol-gelatine. As used herein, an "adjuvant" refers to any substance which, when administered in conjunction with (e.g., before, during, or after) a pharmaceutically active agent, such as a ZIKV construct as disclosed herein, aids the pharmaceutically active agent in its mechanism of action. Thus, an adjuvant as contemplated herein is a substance that aids the ability of the given ZIKV construct to cause oncolysis and/or elicit an immune response against cancer cells. Suitable adjuvants include incomplete Freund's adjuvant, alum, aluminum phosphate, aluminum hydroxide, N-acetyl-muramyl-L-threonyl-D-isoglutamine (thr-MDP), N-acetyl-nor-muramyl-L-alanyl-D-isoglutamine (CGP 11637, nor-MDP), N-acetylmuramyl-Lalanyl-D-isoglutaminyl-L-alanine-2-(1'-2'-dipa-lmitoyl-sn-glycero-3-hydroxy-phosphoryloxy)-ethylamine (CGP 19835A, MTP-PE), and RIBI, which comprise three components extracted from bacteria, monophosphoryl lipid A, trehalose dimycolate and cell wall skeleton (NPL+TDM+CWS) in a 2% squalene/Tween 80 emulsion. In some embodiments, the adjuvant is an immunoadjuvant, such as a cytokine. The effectiveness of an adjuvant may be determined by methods in the art. In some embodiments, the immunoadjuvant is provided as a recombinant expression product, i.e., an immunoadjuvant which the given ZIKV construct has been recombinantly modified to express.

Pharmaceutical compositions may be formulated for the intended route of delivery, including intravenous, intramuscular, intra peritoneal, subcutaneous, intraocular, intrathecal, intraarticular, intrasynovial, cisternal, intrahepatic, intralesional injection, intracranial injection, infusion, and/or inhaled routes of administration using methods known in the art. Pharmaceutical compositions may include one or more of the following: pH buffered solutions, adjuvants (e.g., preservatives, wetting agents, emulsifying agents, and dispersing agents), liposomal formulations, nanoparticles, dispersions, suspensions, or emulsions, as well as sterile powders for reconstitution into sterile injectable solutions or dispersions. The compositions and formulations may be optimized for increased stability and efficacy using methods in the art. See, e.g., Carra et al., (2007) Vaccine 25:4149-4158.

The compositions may be administered to a subject by any suitable route including oral, transdermal, subcutaneous, intranasal, inhalation, intramuscular, intratumoral, and intravascular administration. It will be appreciated that the preferred route of administration and pharmaceutical formulation will vary with the condition and age of the subject, the nature of the condition to be treated, the therapeutic effect desired, and the particular ZIKV construct used.

The pharmaceutical compositions may be provided in dosage unit forms. As used herein, a "dosage unit form" refers to physically discrete units suited as unitary dosages for the subject to be treated; each unit containing a predetermined quantity of the one or more ZIKV constructs calculated to produce the desired therapeutic effect in association with the required pharmaceutically acceptable carrier. The specification for the dosage unit forms of the invention are dictated by and directly dependent on the unique characteristics of the given ZIKV construct and desired therapeutic effect to be achieved, and the limitations inherent in the art of compounding such an active compound for the treatment of individuals.

Therapeutic Methods

Because ZIKV strains activate antitumor immunity in vivo (Chen, et al. (2018) mBio 9(5): e01683-18) and, as provided herein, ZIKV constructs exhibit oncolytic activity, methods of treating subjects for a cancer, which comprise administering to the subjects one or more ZIKV constructs (preferably one or more ZIKV-E mutants and/or one or more ZIKV-Im mutants), are contemplated herein. In some embodiments, the cancer is a ZIKV-treatable cancer.

As used herein, a "ZIKV-treatable cancer" includes craniopharyngiomas, ependymomas (e.g., myxopapillary ependymoma papillary ependymomas, subependymomas, anaplastic ependymomas), glioblastoma multiforme (GBM), glioblastomas, gliomas, low, mid, and high grade astrocytomas, medulloblastomas, meningiomas, neuroblastomas, oligodendrogliomas, oligodendrogliomas, pituitary adenomas, primitive neuroectodermal tumors, retinoblastomas, and cancers in which the cancer cells express one or more flavivirus receptors involved in flavivirus cell entry. See, e.g., Laureti, et al. (2018). Frontiers in Immunology 9: 2180. In some embodiments, the one or more flavivirus receptors is GRP78, SDC2, HSP90AB1, TYRO2, AXL, and/or MERTK. In some embodiments, the one or more flavivirus receptors is AXL. In some embodiments, the ZIKV-treatable cancer is a glioblastoma, a glioma, a neuroblastoma, or a retinoblastoma. Examples of cancers in which the cancer cells express a flavivirus receptor involved in flavivirus cell entry include skin cancers (e.g., basal cell carcinoma, squamous cell carcinoma, melanoma, Merkel cell carcinoma, atypical fibroxanthoma, cutaneous lymphoma, and dermatofibrosarcoma), lung cancers (e.g., small cell lung cancers (SCLC) and non-small cell lung cancers (NSCLC)) and gastrointestinal cancers (e.g., esophageal cancer (carcinoma), stomach cancer (gastric cancer), liver cancer (hepatocellular carcinoma), pancreatic cancer, and colorectal cancers).

In some embodiments, the ZIKV-treatable cancer is glioblastoma multiforme (GBM). In some embodiments, the ZIKV-treatable cancer is glioblastoma multiforme (GBM) and treatment with a therapeutically effective amount of one or more ZIKV constructs (preferably one or more ZIKV-E mutants and/or one or more ZIKV-Im mutants) increases the overall survival of the subject by about 2 to about 6 months as compared to negative control subjects. In some embodiments, the ZIKV-treatable cancer is glioblastoma multiforme (GBM) and treatment with a therapeutically effective amount of one or more ZIKV-E mutants and/or one or more ZIKV-Im mutants results in about 30% or more reduction in tumor growth and/or tumor size. In some embodiments, the ZIKV-treatable cancer is glioblastoma multiforme (GBM) and treatment with a therapeutically effective amount of one or more ZIKV-E mutants and/or one or more ZIKV-Im mutants results in about 70% or more reduction in tumor growth and/or tumor size.

Because ZIKV preferentially infects and/or replicates in neuroprogenitor cells over adult brain cells, methods of treating subjects for diseases and disorders caused by or associated with aberrant neuroprogenitor cells, which comprise administering to the subject one or more ZIKV constructs (preferably one or more ZIKV-E mutants and/or one or more ZIKV-Im mutants), are contemplated herein. Diseases and disorders caused by or associated with aberrant neuroprogenitor cells include epilepsy, schizophrenia, autism spectrum disorders (ASDs), neurodegenerative diseases (e.g., Parkinson's disease (PD) and Alzheimer's disease (AD)), and the like. See, e.g., Ladran, et al. (2013) Neural stem and progenitor cells in health and disease. Wiley interdisciplinary reviews. Systems biology and medicine, 5(6): 701-715.

In some embodiments, the methods comprise administering a therapeutically effective amount of one or more ZIKV constructs to a subject. In some embodiments, the therapeutically effective amount comprises about 10e3 to 10e11 (log scale) viral particles (VP). In some embodiments, the therapeutically effective amount comprises about 10e4 to 10e11 (log scale) viral particles (VP). In some embodiments, the therapeutically effective amount comprises about 10e3, 10e4, 10e5, 10e6, 10e7, 10e8, 10e9, 10e10, or 10e11. The therapeutically effective amount may depend the extent of the given disease or amount of tissue to be treated. For example, tumor volumes of about 1 $cm^3$ can be treated with about 10e3 to 10e9 viral particles and tumor volumes of about 100 $cm^3$ can be treated with about 10e6 to 10e11 viral particles. In some embodiments, the therapeutically effective amount is one that provides a multiplicity of infection (MOI) of at least 1, an MOI of 1-10, or an MOI of 1-5. In some embodiments, the therapeutically effective amount is one that provides an MOI of 1, 2, 3, 4, or 5. In some embodiments, the therapeutically effective amount is at least about the amount of cells to be treated (i.e., intended to be infected by the viral particles). In some embodiments, the ratio of viral particles to cells to be treated ranges from about 1:1 to about 10:1. In some embodiments, the ratio of viral particles to cells to be treated ranges from about 1:1 to about 5:1. In some embodiments, the ratio of viral particles to cells to be treated is about 1:1, about 2:1, about 3:1, about 4:1, or about 5:1.

In some embodiments, one or more ZIKV constructs may be administered to a subject to induce in a subject an immune response against a given target. In some embodiments, the given target is a ZIKV protein or antigenic epitope thereof. In some embodiments, the given target is a virus and the one or more ZIKV constructs is a Zika Vector that comprises one or more passenger sequences that encode a nucleocapsid protein, an envelope protein, a spike protein, and/or one or more antigenic fragments thereof of the virus. In some embodiments, the immunogenic amount administered to the subject for the initial vaccination and boosting immunization, if any, ranges from about 0.01-0.5 μg/kg, about 0.1-0.5 μg/kg, or about 0.35-0.5 μg/kg body weight of a subject. In some embodiments, the immunogenic amount administered to a human subject for the initial vaccination and boosting immunization, if any, is about 1-50 μg, about 1-40 μg, about 1-35 μg, about 1-30 μg, about 1-25 μg, about 1-20 μg, or about 1-15 μg. In some embodiments, the immunogenic amount administered to a human subject for the initial vaccination and boosting immunization, if any, is about 1-25 μg, about 5-20 μg, or about 7.5-16 μg. In some embodiments, the subject is administered a boosting immunization at 1, 2, 3, and/or 4 weeks, or 1, 2, 3, 4, 5, and/or 6 months, or 1 or 2 years which these initial vaccination may be followed by further booster immunization if needed or desired. For example, an exemplary two dose schedule is a booster immunization 6 to 12 months after the initial vaccination and an exemplary three dose schedule is a first booster immunization at 2 months and a second booster immunization at 6 months after the initial vaccination.

It should be noted that treatment of a subject with a therapeutically effective amount or an immunogenic amount may be administered as a single dose or as a series of several doses. The dosages used for treatment may increase or decrease over the course of a given treatment. Optimal dosages for a given set of conditions may be ascertained by those skilled in the art using dosage-determination tests and/or diagnostic assays in the art. Dosage-determination tests and/or diagnostic assays may be used to monitor and adjust dosages during the course of treatment. In some embodiments, a single dose of about $1\times10^4$ to about $1\times10^6$ pfu of the one or more ZIKV constructs is administered to the subject. In some embodiments, a dose of the one or more ZIKV constructs, which are replication competent, results in about $10^3$ to about $10^5$ copies of the in the blood of the subject.

In some embodiments, the one or more ZIKV constructs are administered in the form of a pharmaceutical composition, such as those contemplated herein, including those described in the "Compositions" section above. In some embodiments, the one or more ZIKV constructs are intravenously administered. In some embodiments, the one or more ZIKV constructs are subcutaneously administered. In some embodiments, the one or more ZIKV constructs are intratumorally administered.

In some embodiments, the subject to be treated is mammalian. In some embodiments, the subject is an animal such as a rodent or a non-human primate. In some embodiments, the subject is human. In some embodiments, the subject the subject is "in need thereof". As used herein, a subject "in need thereof" is one who has been diagnosed as having a cancer, such as a ZIKV-treatable cancer, aberrant neuroprogenitor cells (in the case of treating cancer or aberrant neuroprogenitor cells), or one who is at risk of infection by a given pathogen (in the case of inducing an immune response in a subject against the given pathogen).

Toxicity and therapeutic efficacy of ZIKV constructs according to the instant invention and compositions thereof can be determined using cell cultures and/or experimental animals and pharmaceutical procedures in the art. For example, one may determine the lethal dose, $LC_{50}$ (the dose expressed as concentration×exposure time that is lethal to 50% of the population) or the $LD_{50}$ (the dose lethal to 50% of the population), and the $ED_{50}$ (the dose therapeutically effective in 50% of the population) by methods in the art. The dose ratio between toxic and therapeutic effects is the therapeutic index and it can be expressed as the ratio $LD_{50}/ED_{50}$. ZIKV constructs s which exhibit large therapeutic indices are preferred. While ZIKV constructs that result in toxic side-effects may be used, care should be taken to design a delivery system that targets such compounds to the site of treatment to minimize potential damage to uninfected cells and, thereby, reduce side-effects.

The data obtained from the cell culture assays and animal studies can be used in formulating a range of dosages for use in humans. Preferred dosages provide a range of circulating concentrations that include the $ED_{50}$ with little or no toxicity. The dosage may vary depending upon the dosage form employed and the route of administration utilized. Therapeutically effective amounts and dosages of a given ZIKV construct can be estimated initially from cell culture assays. A dose may be formulated in animal models to achieve a circulating plasma concentration range that includes the $IC_{50}$ (i.e., the concentration of the test compound which achieves a half-maximal inhibition of symptoms) as determined in cell culture. Such information can be used to more accurately determine useful doses in humans. Levels in plasma may be measured, for example, by high performance liquid chromatography. Additionally, a dosage suitable for a given subject can be determined by an attending physician or qualified medical practitioner, based on various clinical factors.

Kits

Kits comprising one or more ZIKV constructs as described herein and/or compositions thereof, optionally in combination with one or more supplementary agents, are contemplated herein. In some embodiments, the one or more ZIKV constructs or compositions thereof are packaged together with one or more reagents or drug delivery devices for administering the ZIKV constructs or compositions thereof to a subject. In some embodiments, the kits comprise the one or more ZIKV constructs, optionally in one or more unit dosage forms, packaged together as a pack and/or in drug delivery device, e.g., a pre-filled syringe.

In some embodiments, the kits include a carrier, package, or container that may be compartmentalized to receive one or more containers, such as vials, tubes, and the like. In some embodiments, the kits optionally include an identifying description or label or instructions relating to its use. In some embodiments, the kits include information prescribed by a governmental agency that regulates the manufacture, use, or sale of compounds and compositions as contemplated herein.

The following examples are intended to illustrate but not to limit the invention.

EXAMPLES

Cell Lines and Subjects

U-87 MG cell line (human glioblastoma; astrocytoma; classified as grade IV) was purchased from the American Type Culture Collection (ATCC, USA) and other GBM cell lines were maintained using complete Eagle's Minimum Essential Medium (EMEM) (Fisher Scientific). Complete EMEM was supplemented with 10% fetal bovine serum (FBS), penicillin (100 units/ml), and streptomycin (100 mg/ml) (Life Technologies). The cells were maintained at 37° C. with 5% $CO_2$ and were passage every third day using 1× trypsin with EDTA.

NGS (NOD scid gamma) mice. Immunodeficient mice obtained from the Jackson Laboratory (Mount Desert Island, ME). Because NGS mice are immunodeficient, the results of the experiments herein indicate is likely linked to direct cell killing and phagocytic removal of debris by ZIKV-E mutants.

ZIKV Wild-Type Strains and Parental Construct

An Asian genotype, clinical isolate PRVABC59 (GenBank accession number KU501215) and MR766 (GenBank accession number LC002520) were used as wild-type ZIKV strains. The original stocks (P=3) were subjected to additional passages in Vero cells to generate working viral stocks. Viral titers were measured by plaque assay as described previously.

PRVABC59 was amplified in C6/36 cells, and total RNA of infected cells was extracted with Purelink RNA Mini Kit (Ambion). ZIKV cDNA covering the complete genome was synthesized using SuperScript III reverse transcriptase (Thermo Fisher) with random hexamer (Fragments 1 to 5) or ZIKV specific primer against the last 20 nt of ZIKV 3'-end (Fragment 6). Then, six ZIKV sub-genomic fragments covering the whole genome were amplified using KOD polymerase (Millipore). Six fragments were assembled into EcoR I linearized pBR322 plasmid to generate pZ-PR plasmid using HiFi DNA Assembly Cloning Kit (NEB), and further transformed into DH10B *E. coli*. The whole sequence of pZ-PR plasmid (Accession No. KY583506) was verified by Sanger DNA sequencing.

Recombinant ZIKV was generated from plasmid pZ-PR, containing the full-length cDNA of ZIKV Puerto Rico strain, using the previously describe method (Shan et al., 2016) with some modifications. In brief, pZ-PR plasmid was amplified in DH10B *E. coli* and then purified using PureLink HiPure Plasmid Midiprep Kit (Thermo Fisher). To generate DNA template for RNA in vitro transcription, 100 μg of pZ-PR was linearized with BstBI, followed by end blunting with Mung Bean Nuclease (NEB). Then, the end-blunted template DNA was purified with phenol-chloroform, precipitated with ethanol, and resuspended in 20 μl RNase-free water. 5'-capped RNA was in vitro transcribed using mMESSAGE mMACHINE T7 kit (Ambion) with 1 μg template DNA and an additional 1 μl of 30 mM GTP solution. In vitro transcribed RNA was further purified with phenolchloroform, precipitated with ethanol, resuspended in 100 μl RNase-free water, aliquoted, and stored in −80° C. freezer.

For cell transfection, 12 μg of RNA was mixed with $5\times10^6$ BHK21 cells in 200 μl Electroporation Solution (Bioland), and electroporated in 4-mm cuvette with the GenePulser apparatus (Bio-Rad) at the setting of 240 V and 950 μF, pulsing once. After a 10-minute recovery at room temperature, transfected cells were resuspended in 10 ml warm culturing medium, incubated in cell incubator overnight, and then washed once and replenished with fresh medium. Three to four days post electroporation when about 40% of cells showing CPE, supernatants were collected, span at 8000 g for 10 minutes at 4° C. to remove cellular debris, aliquoted, and stored at −80° C.

Zika Viral Infection

Glioblastoma cells were seeded at a density of $3\times10^4$ cells per well in a 48-well plate ($1.5\times10^4$ cells per well of 96-well plate). The next day, a viral inoculum was prepared in a serum-free base media at a Multiplicity of Infection (MOI) of 1 or 10. 200 (100 μL per well of 96-well plate) of viral inoculum was added to each well and the inoculated plates were incubated in 37° C. with 5% $CO_2$ for 2-4 hours. At the end of incubation, the inoculum was replaced with 10% FBS supplemented media. For the mock infection control, the cells received only basic media that was used for preparing the viral inoculum. This mock or uninfected control cells were included for each time point for comparison. At the indicated time points, samples were collected for various assays, including immunofluorescence assay, cell viability assay, caspase 3/7 assay and reverse transcription quantitative PCR (RT-qPCR).

Caspase 3/7 Activity Assay for Apoptosis Measurement

Caspase-Glo 3/7 Assay (Promega, USA) was performed as per the manufacturer's protocol. At indicated time points, Zika virus infected and control mock infected cells in the 96-well plate were incubated with the proluminescent caspase-3/7 substrate for 1 hour at room temperature. Subsequently, 100 μL of lysate was transferred to a white 96 well microtiter plate for reading the luminescence signal using a luminometer (Glomax Microplate Luminometer, Promega).

Cell Viability Assay

CellTiter-Glo Luminescent assay (Promega, USA) to measure intracellular ATP content is performed as per the manufacturer's protocol. At indicated time points, Zika virus infected and control mock infected cells in the 96-well plate are incubated with the substrate for 1 hour at room temperature. Subsequently, 100 μL of lysate is transferred to a white 96 well microtiter plate for reading the luminescence signal using a luminometer (Glomax Microplate Luminometer, Promega).

Reverse Transcription Quantitative PCR Analysis

Total RNA is extracted from mock and infected glioma cells at the designated time points using an RNeasy Mini Kit (QIAGEN). After treatment with RNase-free DNase, 1 μg of RNA is reverse-transcribed into cDNA using random hexamer primer and the SuperScript III Reverse Transcriptase Kit (Life Technologies) as recommended by the manufacturer. The following conditions are used for cDNA amplification: 65° C. for 5 minutes; 4° C. for 1 minute followed by 55° C. for 60 minutes and 72° C. for 15 minutes. Quantitative real-time PCR is carried out using Platinum SYBR Green qPCR SuperMix-UDG with ROX Kit (Life Technologies) by the QuantStudio™ 12K Flex Real-Time PCR System (Life Technologies). Known copy numbers (from 10e0 to 10e10) of ZIKV gene template are included as a standard. The relative concentration of each transcript is calculated using $2^{-\Delta CT}$ method using glyceraldehyde 3-phosphate dehydrogenase (GAPDH) threshold cycle ($C_T$) values for normalization. The normalized $C_T$ values are used for calculating copy numbers. The following conditions are used for transcript amplification: 50° C. for 2 minutes; 95° C. for 2 minutes followed by 40 cycles of 95° C. for 15 seconds and 60° C. for 1 minute, in conjunction with the appropriate primer pairs.

Immunofluorescence Assay

Immunofluorescence assay is performed on both the mock and infected Vero cells fixed with methanol. The fixed cells are incubated at −20° C. for 30 minutes, then washed three times with 1×PBS. Following three PBS washes, the cells are permeabilized and blocked with 10% fetal bovine serum, 3% BSA, 0.1% Triton-x 100 in PBS. Subsequently, the fixed and permeabilized cells are incubated with mouse monoclonal antibody for Flavivirus group antigen (D1-4G2-4-15 (4G2)) (Absolute Antibody Ltd.) at a 1:200 dilution for up to 6 hours or overnight incubation at 4° C. The secondary antibodies, goat anti-mouse polyclonal antibody (Alexa Fluor® 488) (Life Technologies, USA) are added at 1:1000 dilutions and incubated for 1 hour at room temperature. Between antibody changes the cells are washed five times with PBS. The nuclei were stained with the addition of 4',6-diamidino-2-phenylindole (DAPI) (Life Technologies, USA).

Example 1. ZIKV-E Mutants

ZIKV-E mutants were prepared as described in Gong, et al. (2018) iScience 1: 97-111. Briefly, the Asian genotype Zika virus (GenBank accession number KU501215, clinical isolate PRVABC59) was modified using recombinant techniques in the art to result in N154X substitutions in the envelope protein. “VAX2A” refers to a ZIKV-E mutant that has an N154D substitution in the envelope protein. “VAX2B” refers to a ZIKV-E mutant that has an N154T substitution in the envelope protein.

D. Construction of ZIKV-E Mutants

To generate the plasmid construct for ZIKV-E mutants, PCR primers were designed with desired mutation in envelope amino acid position 154. To generate full length fragments for cloning, the corresponding left and right fragments flanking the desired mutation site were amplified using high fidelity KOD DNA polymerase (Millipore) for 18 cycles. Each corresponding left and right fragments were combined, and the resulting full-length DNA inserts were generated by amplification with KOD polymerase for 20 cycles. Then, the full-length inserts were digested with KpnI and EcoRI, while the vector pZ-PR plasmid was digested with KpnI and EcoRI followed by treatment with Shrimp Alkaline Phosphatase (NEB). Ligation was performed for each of the three sub libraries with T4 DNA ligase (NEB) with a vector: insert ratio of 1:5. Ligated products were purified with phenol-chloroform, precipitated with ethanol, resuspended in 10 μl sterilized water, and electroporated into DH10B *E. coli* competent cells. For each of the three sub libraries, about 40,000 colonies were collected from LB plates, and directly subjected to plasmid DNA purification. DNA plasmids were stored at −80° C. in aliquot.

To generate ZIKV-E mutants, BHK21 cells were electroporated with in vitro transcribed RNA, and viral supernatant were collected at 4 days post transfection. ZIKV-E mutants were further amplified in C6/36 cells, then supernatants were collected, clarified of debris, and stored at −80° C. in aliquot. Virion RNA was also extracted, and reverse transcribed to cDNA. E protein coding sequence of all ZIKV-E mutants were PCR amplified individually, followed by Sanger DNA sequencing to verify the sequence. SEQ ID NO: 12 is the construct of VAX2B. FIG. 2 shows that the VAX2B retained the anti-tumoral activity by inducing apoptotic death of infected U87 GBM cancer cells.

E. Preclinical Safety Study of ZIKV-E Mutants

To assess the safety profile of ZIKV-E mutants, 4-6 week old Ifnra1$^{-/-}$ mice were inoculated with VAX2B ($1\times10^6$ pfu per mouse; subcutaneous route). As a positive control, mice were infected with unmodified wild-type Zika viruses (PRV-ABC59 and MR766 strains). Infected animals were monitored twice daily for three weeks. The wild-type virus infected animals had significant mortality and exhibited signs of neurological disease (paralysis). Negative control mice (Mock) and mice infected with VAX2B exhibited 100% survival over the entire study period FIG. 3). Moreover, the serum viral load of VAX2B was 10-100 fold lower than wild-type virus at 7 days post infection (dpi) (FIG. 4) indicating viral attenuation. Furthermore, VAX2B infected mice stayed healthy without any weight loss throughout the study (FIG. 5) suggesting loss of virulence.

Figure 6:
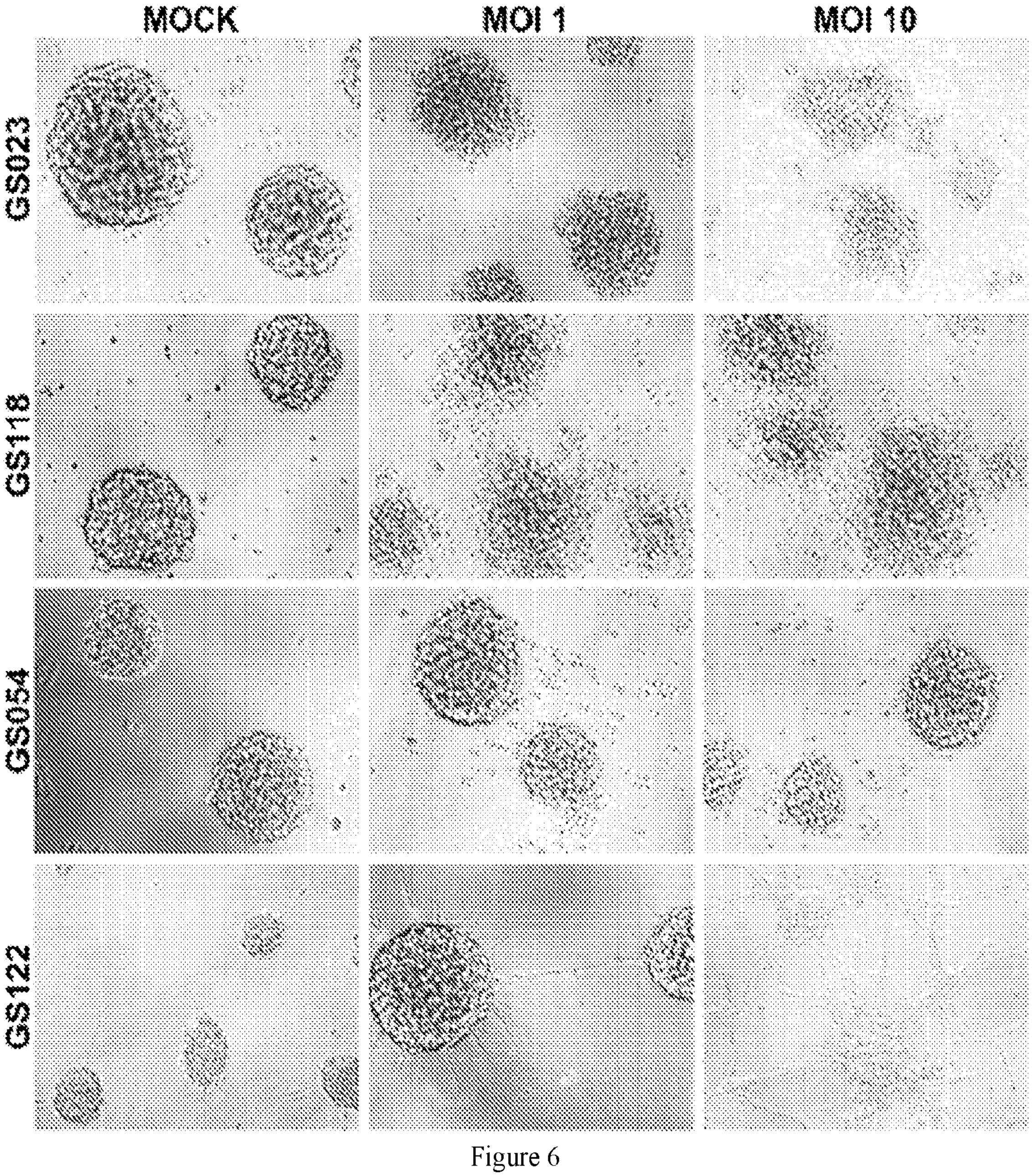
FIG. 6-FIG. 10: Glioblastoma Multiforme (GBM) cell line screening assays. Multiple GBM cell lines were infected with a ZIKV-E mutant (VAX2B) at viral doses MOI 1 and MOI 10 in 96-well plate format in triplicate and 2 independent platings. Tumoroid spheres attached to the plate. Every other day, fresh neuronal supplement (NS) media was added.
Figure 7:
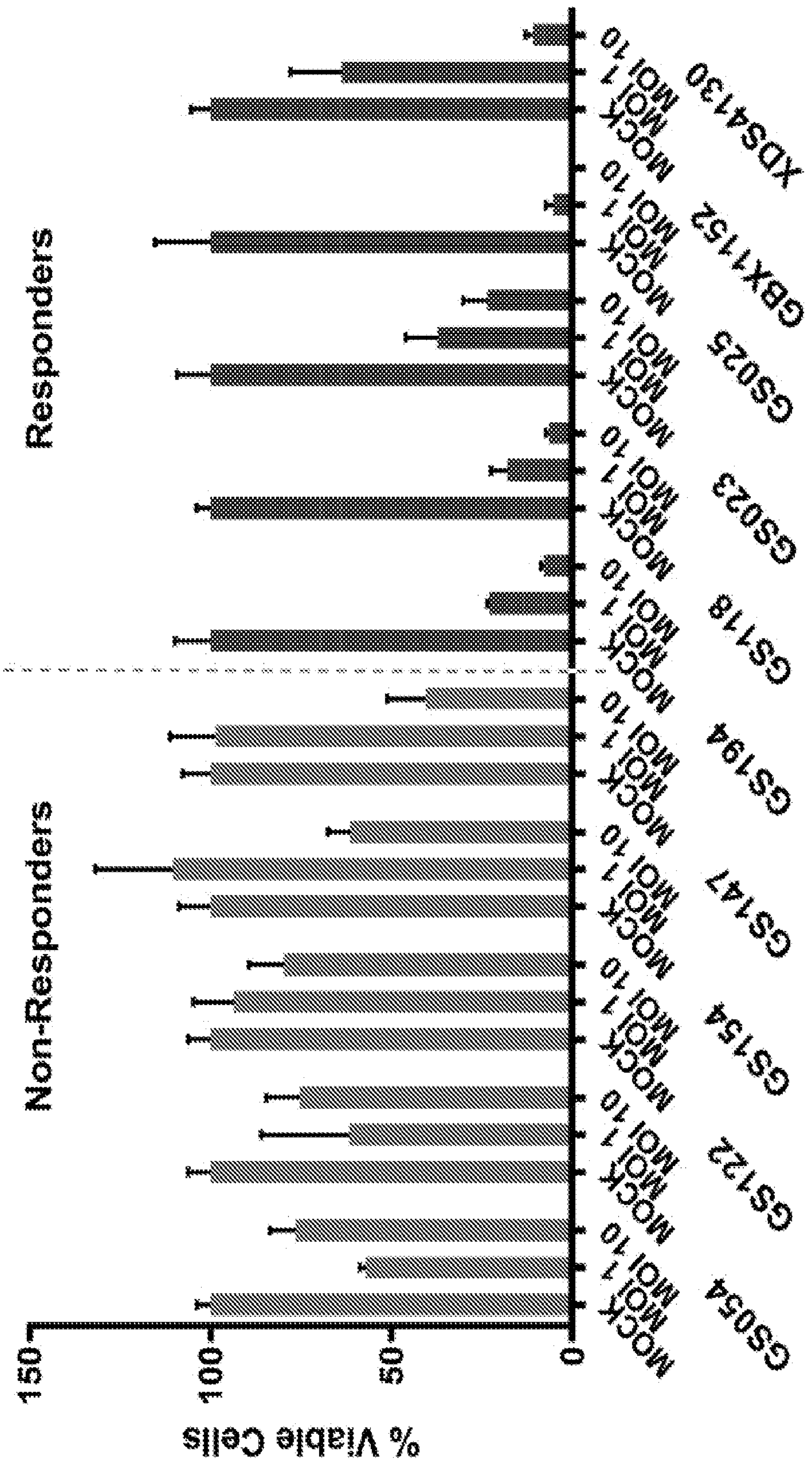
Figure 8:
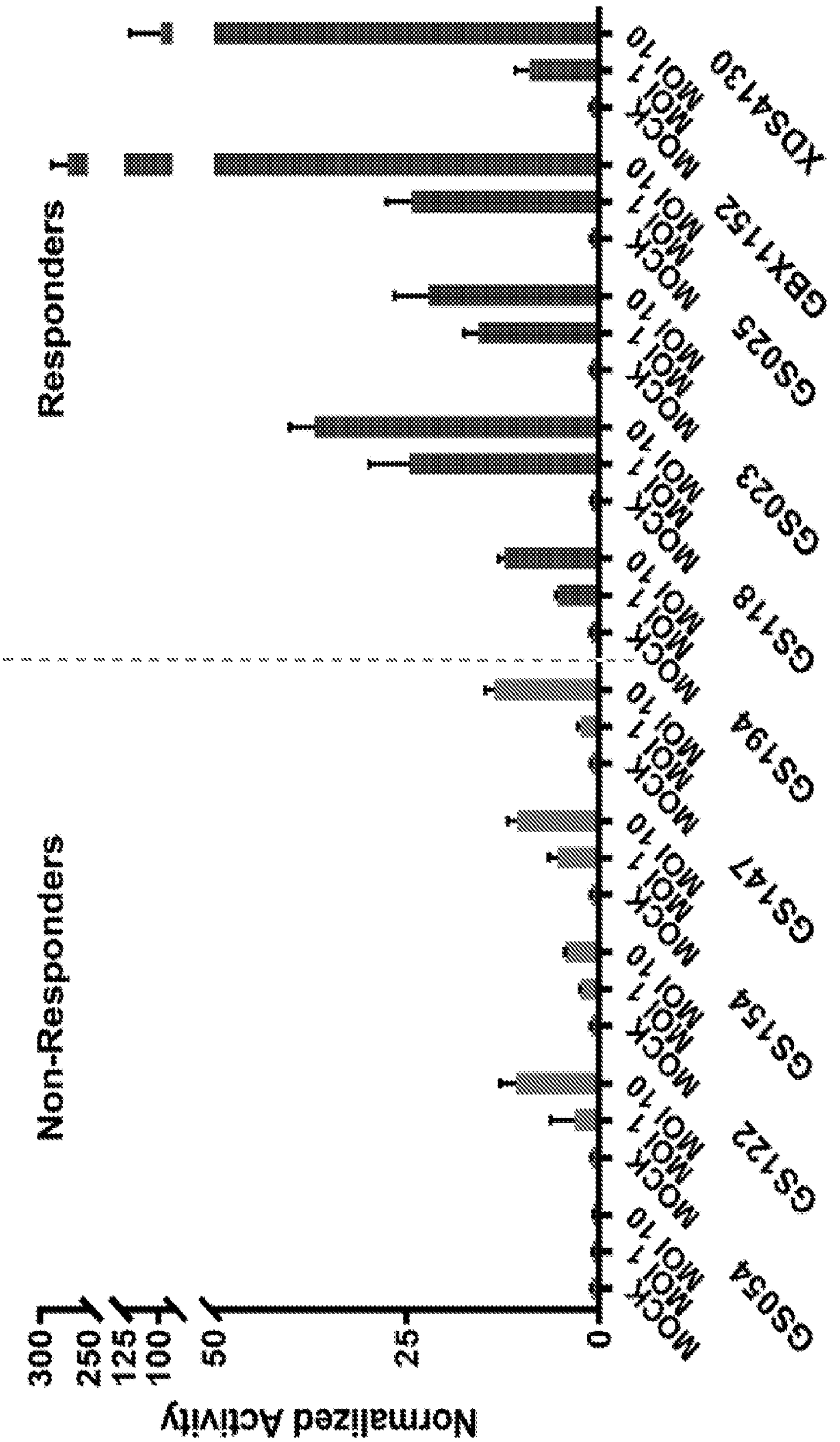
Figure 9:
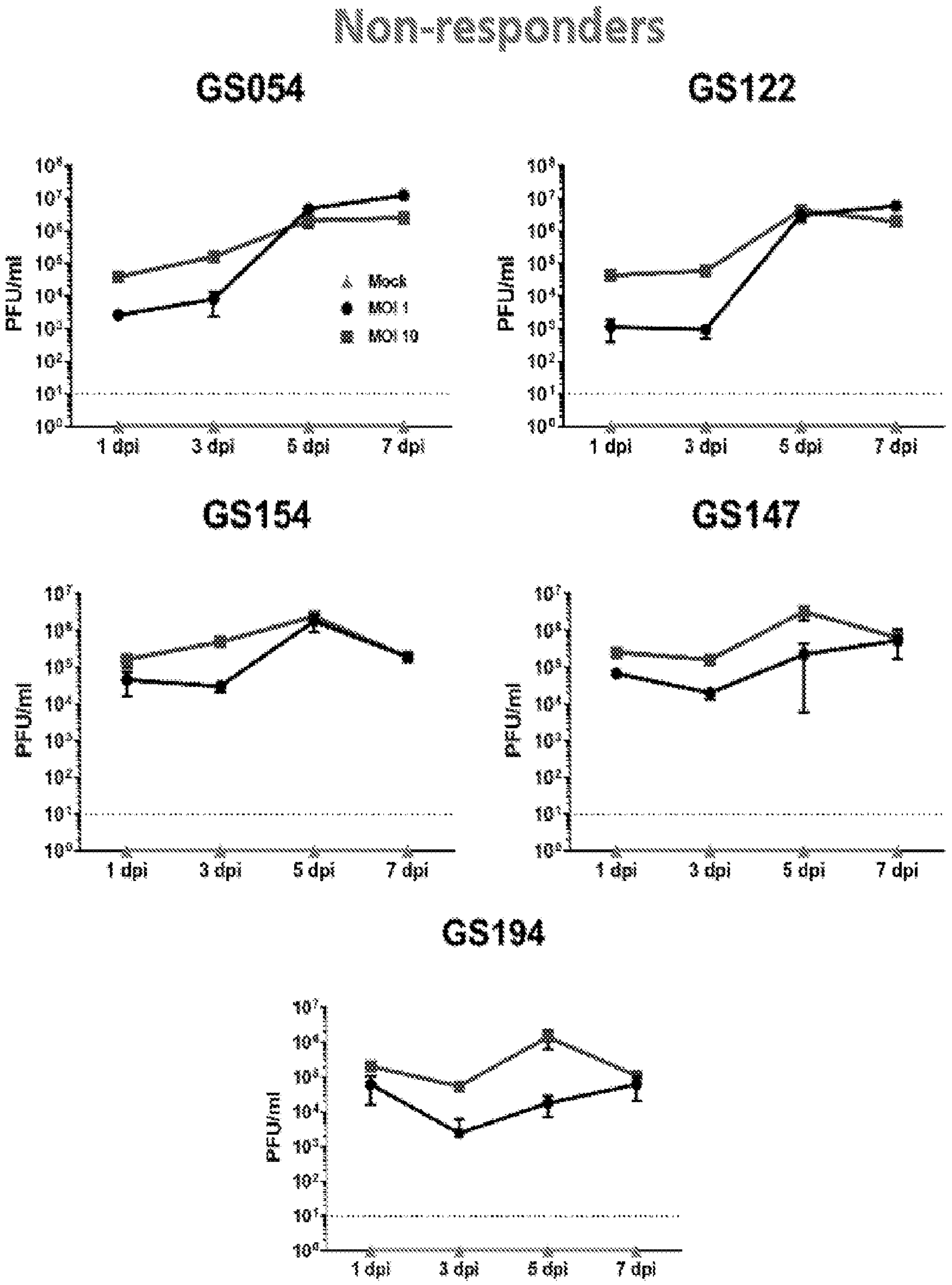
Figure 10:
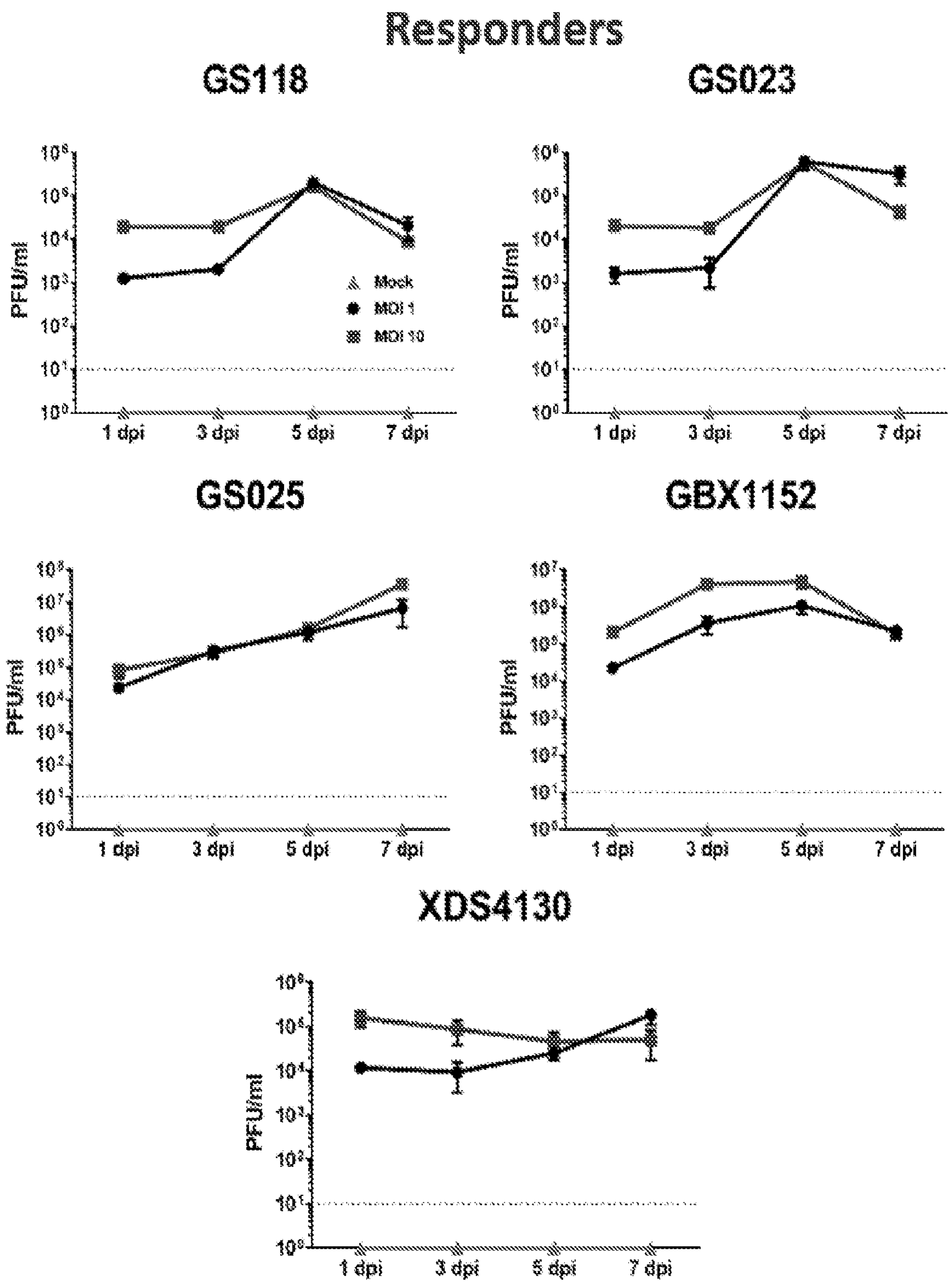

D. Assessing Susceptibility of Various Primary Human GBM Lines to ZIKV-E Mutants Primary human GBM lines were infected with VAX2B at an MOI of 1 and 10 to determine susceptibility to infection. After infection, based on the level of apoptotic cell death the primary GBM lines were categorized into two different groups, responders and non-responders (FIG. 6). The responder group demonstrated decreased in cell viability and increase cell apoptosis, whereas non-responders exhibited little decrease in cell viability (FIG. 7) and minimal apoptotic activity (FIG. 8). Both responder and non-responder lines exhibited high viral titers and active viral replication of VAX2B (FIG. 9 and FIG. 10).

F. Combination Therapy

Figure 11:
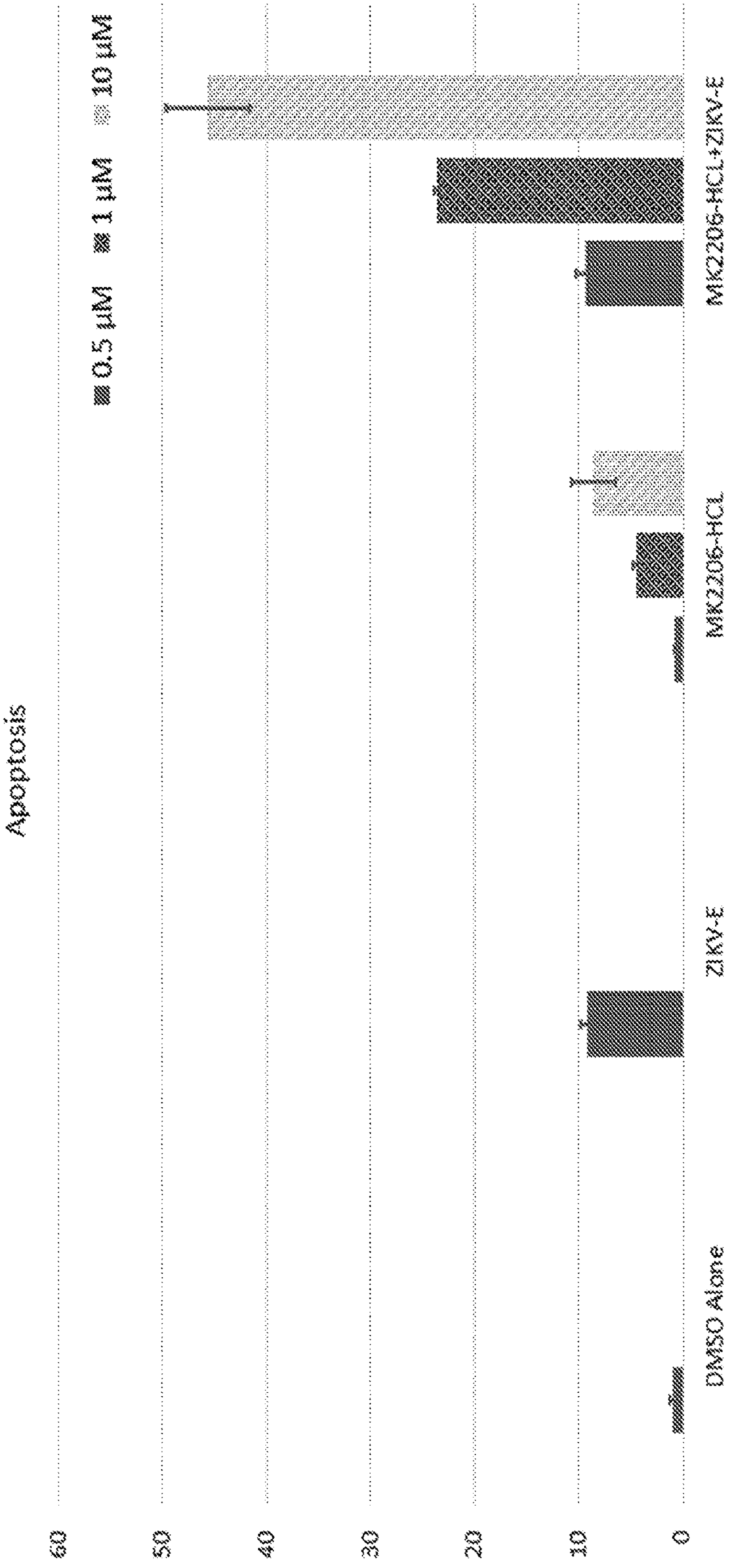
FIG. 11 is a graph showing that the combination of an AKT pathway inhibitor, MK-2206, and a ZIKV-E mutant (VAX2B) synergistically increases the percent apoptosis of non-responder GBM primary cells (GS054).

Active replication of virus in non-responder lines with additional treatment can potentially create a synergistic effect to provide a strong kill response in an otherwise non-responding line. Detailed analysis of the exomes revealed that the many of the non-responder cell lines had phosphatase and tensin homolog (PTEN) loss of function mutations. Hypothesizing that PTEN loss can lead to uninhibited activation of PI3K-AKT pathway and contribute to resistance to apoptosis induced by ZIKV-E mutants, the effects of VAX2B (at an MOI of 1 or 10) combined with different concentrations of an AKT inhibitor, MK-2206, on the non-responder cell line GS054 were evaluated. FIG. 11 shows that the combination of a ZIKV-E mutant and AKT inhibitors may be synergistic against cancer cells having PTEN loss of function nutations. Western blot analysis confirmed the inhibition of AKT phosphorylation in the treated cells. AKT inhibitors did not significantly impact viral titers.

G. In Vivo Efficacy Studies in Mouse Xenograft Model

Figure 12:
FIG. 12-FIG. 15: ZIKV-E mutants are safe and effective oncolytic therapeutics.
Figure 13:
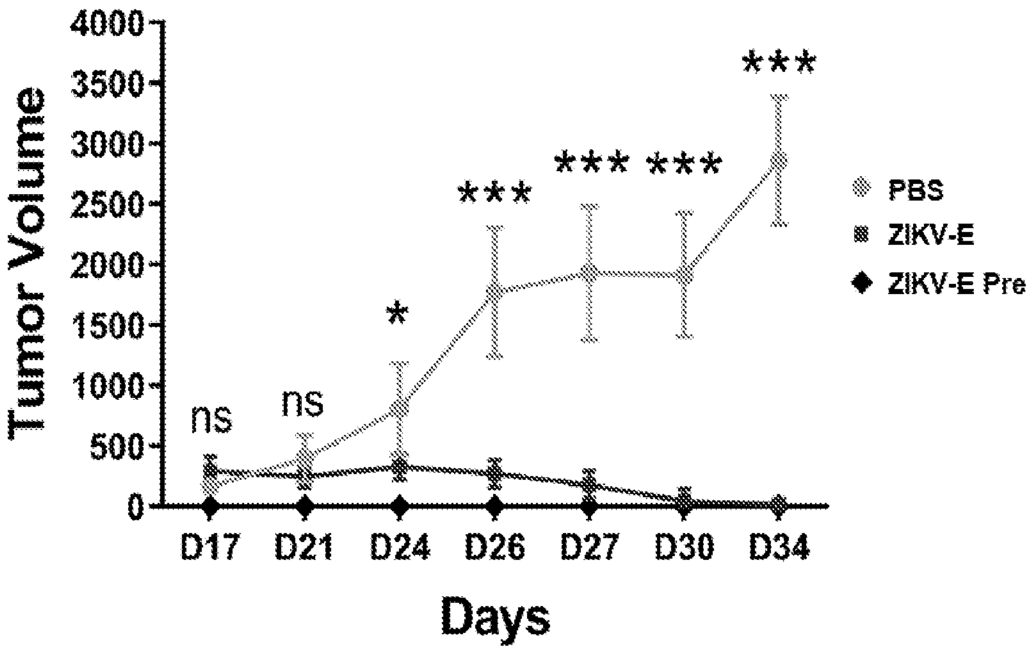
Figure 14:
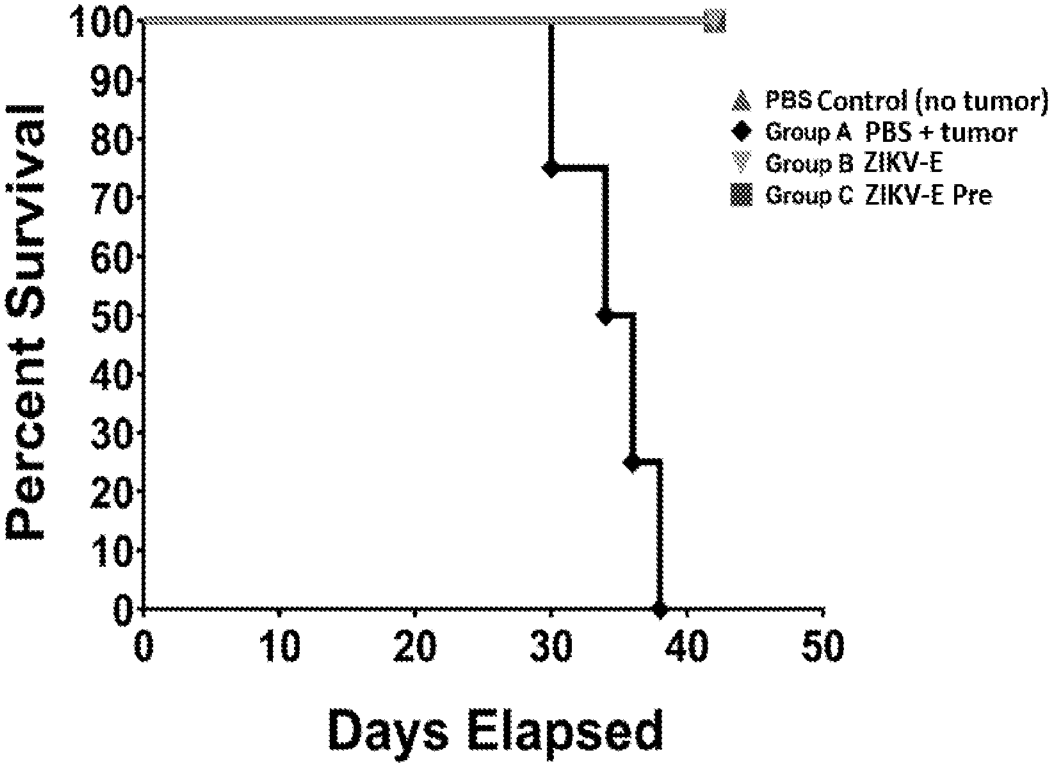
Figure 15:
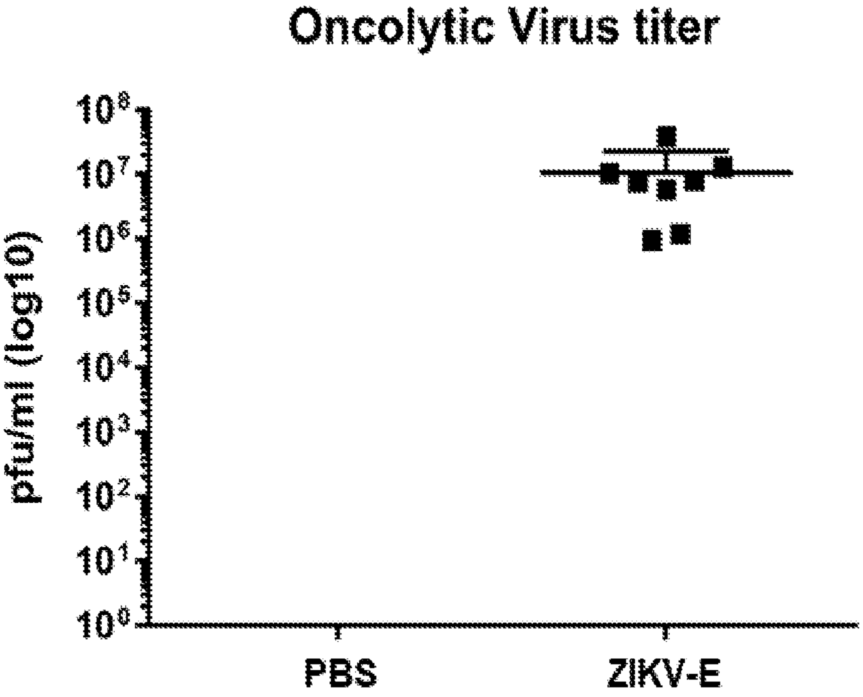

To evaluate the anti-tumor therapeutic properties of VAX2B, NSG mice were xenografted with U87 cells in the left flank region on Day 0. A schematic of study outline is provided in FIG. 12. Except for the ZIKV-E Pretreatment Group, subjects developed visible and palpable tumor mass in the inoculated site at Day 17. Subsequently, the tumor containing mice (ZIKV-E Group) received VAX2B ($2\times10^6$ pfu/mouse) intratumorally. The tumor mass in the untreated (PBS Group) gradually increased in size (FIG. 13) reaching euthanasia endpoint. By Day 40, all the untreated subjects succumbed to cancer burden, whereas VAX2B treated subjects underwent tumor remission (FIG. 14). Viral titers from subjects indicate that that the anti-tumor activity is due to direct oncolytic effect of the ZIKV-E mutant (FIG. 15). Histopathology and immunohistochemical analysis revealed viral replication in tumor cells and infiltration of inflammatory cells and apoptotic cell death.

Figure 16:
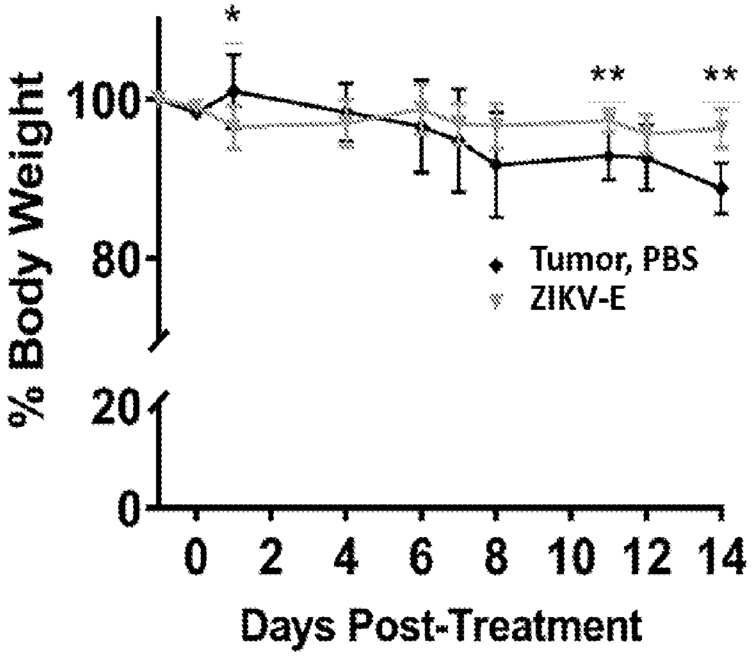
FIG. 16-FIG. 18: ZIKV-E mutants are effective oncolytic therapeutics against cancer cells that tend to be resistant to epidermal growth factor receptor (EGFR) inhibitors. 8-10 week old Female NSG mice were implanted with $2\times10^6$ GBM GS025 cells SQ in the left hind flank. On Day 41 and Day 48 the control group (n=8) received PBS and the treatment group (n=8) received VAX2B ($2\times10^6$ pfu/mouse) intratumorally.
Figure 17:
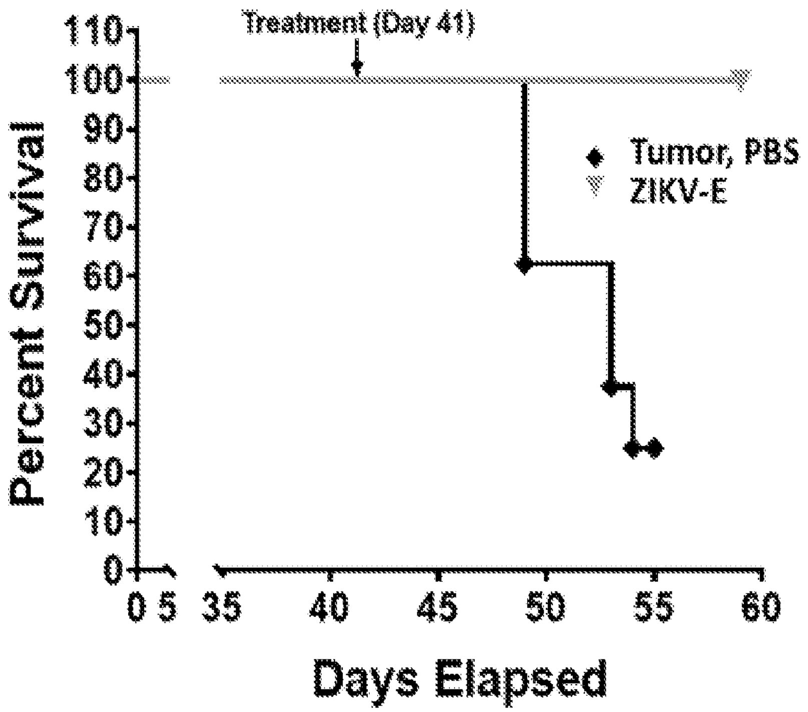
Figure 18:
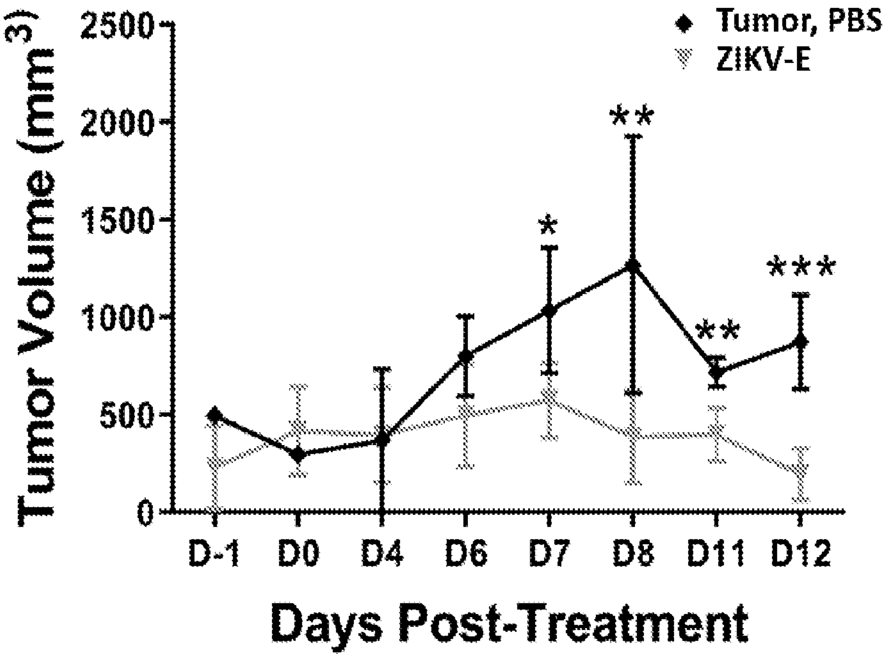

In a subsequent study, the in vivo efficacy of VAX2B against tumors resistant to EGFR inhibitors was evaluated. NSG mice were xenografted with human GBM derived GS025 cells in the left flank region on Day 0 GS025 cells have amplified EGF receptors and cells develop resistance to EGFR inhibitors. On Day 41 and Day 48 the control group received PBS and the treatment group received VAX2B ($2\times10^6$ pfu/mouse) intratumorally. Subject treated with VAX2B maintained their body weight (FIG. 16) and 100% survived (FIG. 17). Unlike treated subjects, the tumor mass in untreated subjects gradually increased in size (FIG. 18). Viral titers in subjects indicate that that the anti-tumor activity is due to direct oncolytic effect of the ZIKV-E mutant.

These studies show that ZIKV-E mutants, alone or in combination, with other agents, e.g., AKT inhibitors, are safe and effective in treating cancers such as glioblastomas.

Example 2. Zika Vector and ZIKV-Im Mutants

Figure 19:
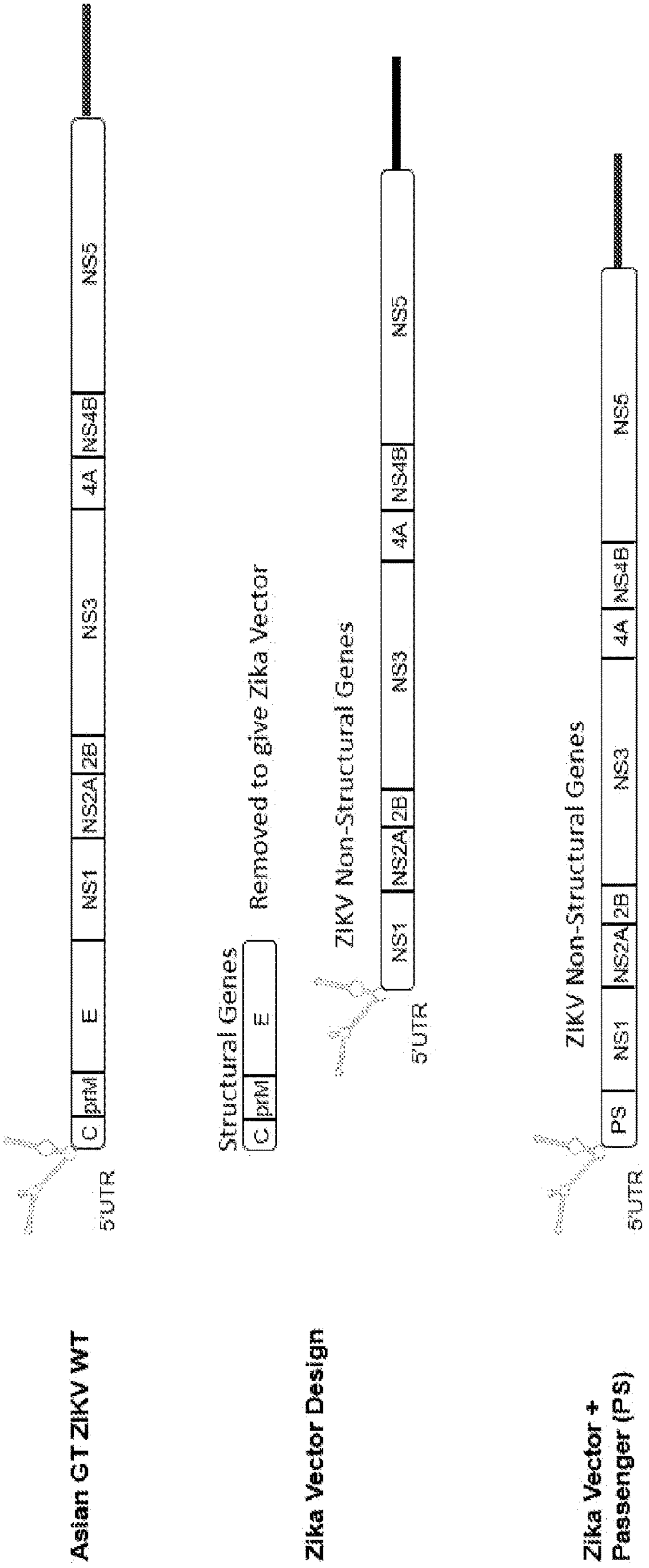
FIG. 19 schematically shows the design of a Zika Vector as described herein. The structural genes of a ZIKV virus are removed or can be replaced with a given passenger sequence, e.g., a nucleic acid sequence that encodes a desired therapeutic protein such as an immunomodulatory agent.
Figure 20:
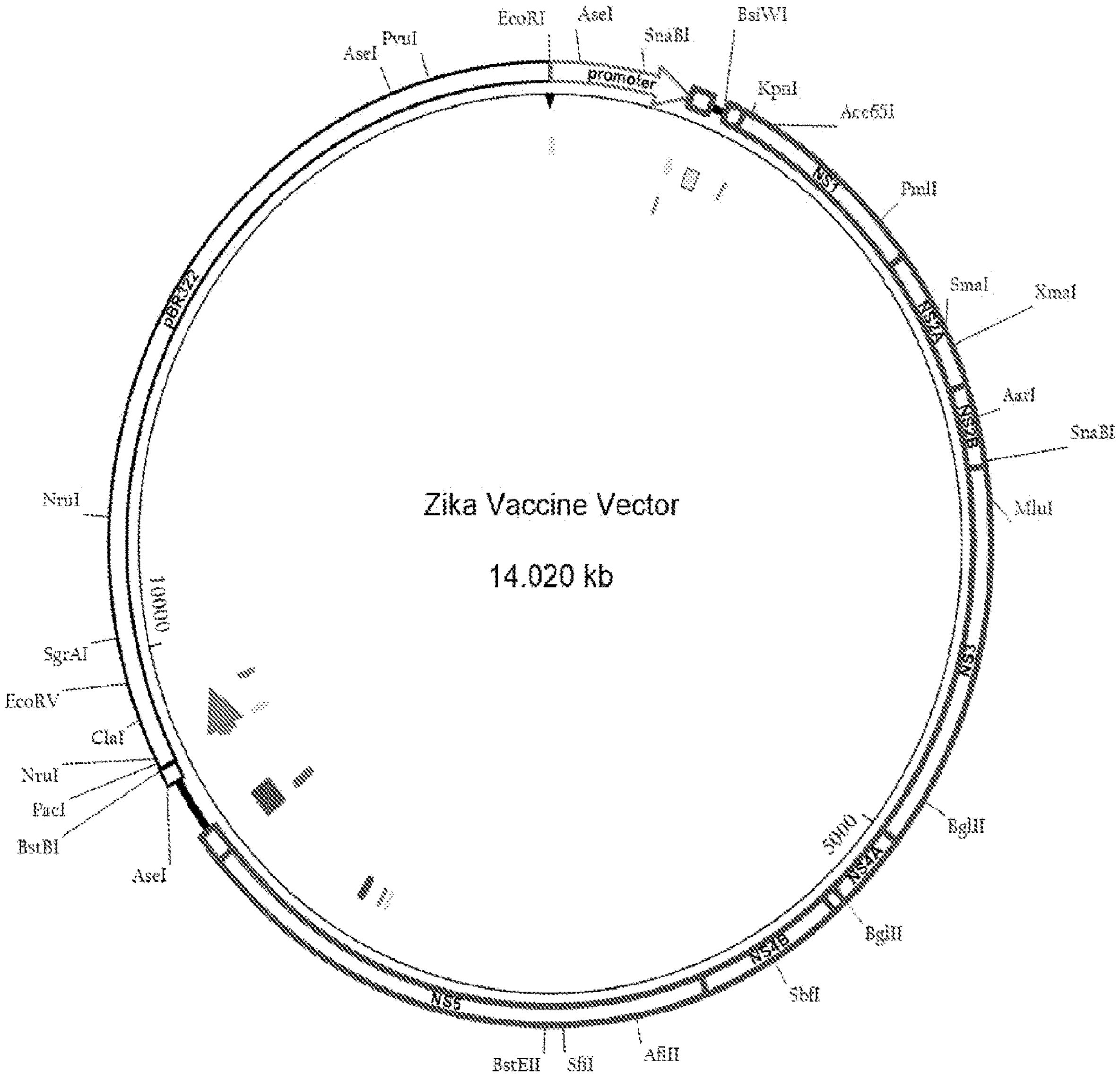
FIG. 20 schematically shows a Zika Vector as exemplified herein. The Zika Vector has a restriction enzyme linker sequence (BsiWI linker sequence) in which one or more passenger sequences may be inserted.

A replication deficient Zika Vector was made by splitting a Zika virus (ZIKV) genome into structural and non-structural (NS) regions (FIG. 19) and deleting the nucleic acid sequences that encode the structural genes: Core (C), PrM, and Envelope (E) (which based on Zika virus strain PRVABC59 (Accession No. KU501215.1), a total of 2223 nucleotides (i.e., nucleotides positions 183 to 2405) were deleted to give a ZIKV sequence. The Zika Vector exemplified herein is flanked by a CMV promoter at the beginning and hepatitis delta virus (HDV) ribozyme/SV40 poly A sequences at the end. The Zika Vector is schematically shown in FIG. 20 (SEQ ID NO: 7, wherein nucleotides: 7-741 is a CMV promoter; 742-9337 is the ZIKV sequence; 924-935 is a BsiWI linker sequence (SEQ ID NO: 13); 9338-9421 is a hepatitis delta virus ribozyme (HDVR) sequence; 9422-9460 is a linker sequence; 9461-9682 is an SV40 Poly A sequence; and 9683-14020 is a pBR322 cloning vector sequence.

A structural gene sequence based on the same ZIKV strain was used to package the Zika Vector. The packaging plasmid comprised nucleotides 108 to 2489 of PRVABC59 (SEQ ID NO: 16) total size 2382 nucleotides; 794 amino acids (SEQ ID NO: 17)) cloned into a mammalian expression vector driven by CMV promoter and at the end SV40 poly A sequence.

Figure 21:
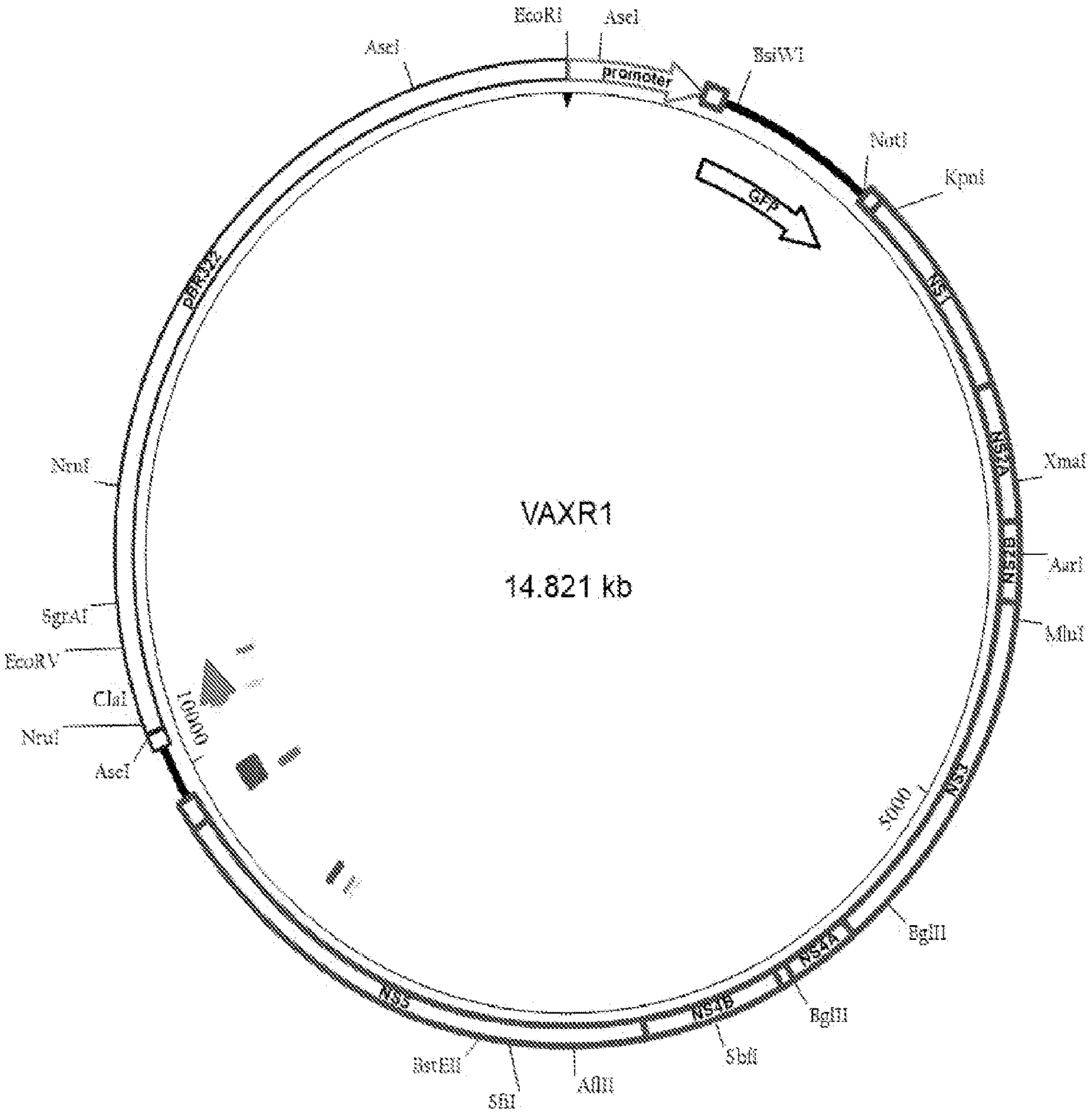
FIG. 21 schematically shows the VAXR1 construct as exemplified herein. The VAXR1 construct is the Zika Vector of FIG. 20 comprising a sequence that encodes eGFP inserted in the BsiWI linker. The VAXR1 construct also comprises an F2A insert and a Not1 linker sequence.

FIG. 21 schematically shows the VAXR1 construct (SEQ ID NO: 14), which comprises a sequence (SEQ ID NO: 15) that encodes eGFP inserted in the BsiWI linker sequence of the Zika Vector. The VAXR1 construct also comprises an F2A insert (SEQ ID NO: 18) and a Not1 linker sequence after the BsiWI linker sequence.

The Zika Vector and packaging plasmid described in Example 2 and methods in the art were used to generate the following ZIKV-Im mutants: ZV-CCL5, ZV-IL18, ZV-IL2, and ZV-TNFSF14.

Figure 23:
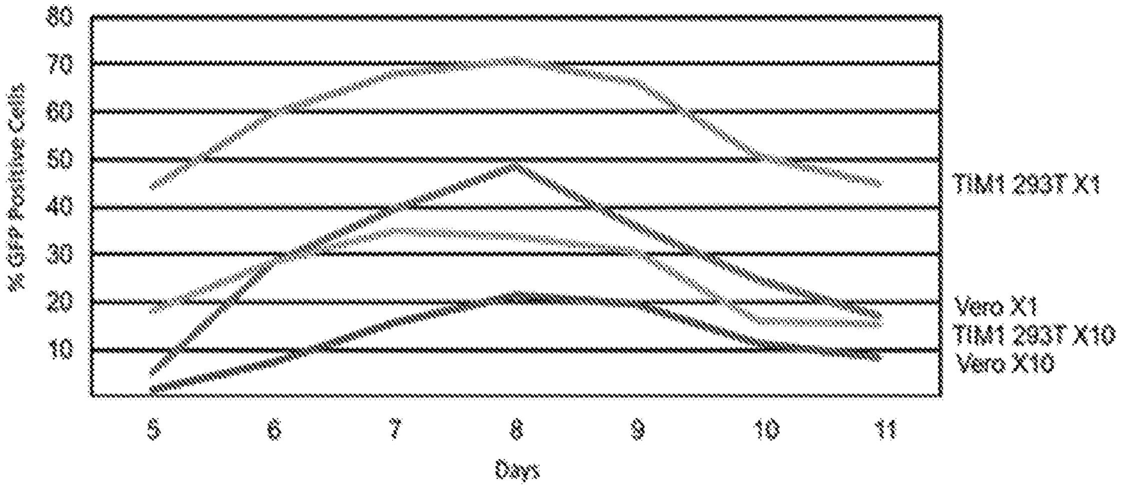
FIG. 23: Vaccine production and validation. VAXR1 was used as being representative of the production of Zika Vectors comprising passenger sequences. Graph shows production of vaccine particles by 293T cells between days 5 to 11. Flow cytometry assays indicated vaccine particle production efficiencies of 43.22% (Day 5), 58.72% (Day 6), 66.69% (Day 7), 69.44% (Day 8), 65.03% (Day 9), 49.60% (Day 10) and 43.71% (Day 11).

A. Vaccine Production 293T cells were cultured in IMDM containing 10% FCS and antibiotics in an incubator (37° C. and 5% $CO_2$). One day before transfection, 293T cells ($1.4\times10^7$ cells) were seeded in T175 flask coated with 250 μg/ml rat collagen 1. The cells were transfected with 37.5 μg packaging plasmid and 12.5 μg of control (VAXR1) or a coronavirus construct. One day after transfection, the transfected cells were cultured at 30° C. Three days after transfection, the culture medium was changed to AIM-V (ThermoFisher Scientific) supplemented with antibiotics. The supernatant was collected 5, 6, 7, 8, 9, 10, and 11 days after transfection. After harvesting the supernatant, the same amount of fresh medium was replenished. The cells and debris in the harvested supernatant were removed by filtration by filters (0.22 or 0.45 μm pore size) and/or centrifugation (2000×g, 10 mins, 4° C.) and frozen at −80° C. For measuring the vaccine particle production, Vero cells or 293T-TIM-1 cells were inoculated with 100 μl of diluted or 1 in 10 diluted vaccine particles and 48 hours later flow cytometry was performed. Optimum vaccine particle production was observed between Days 7-9 (FIG. 23).

B. Safety and Efficacy

Figure 24:
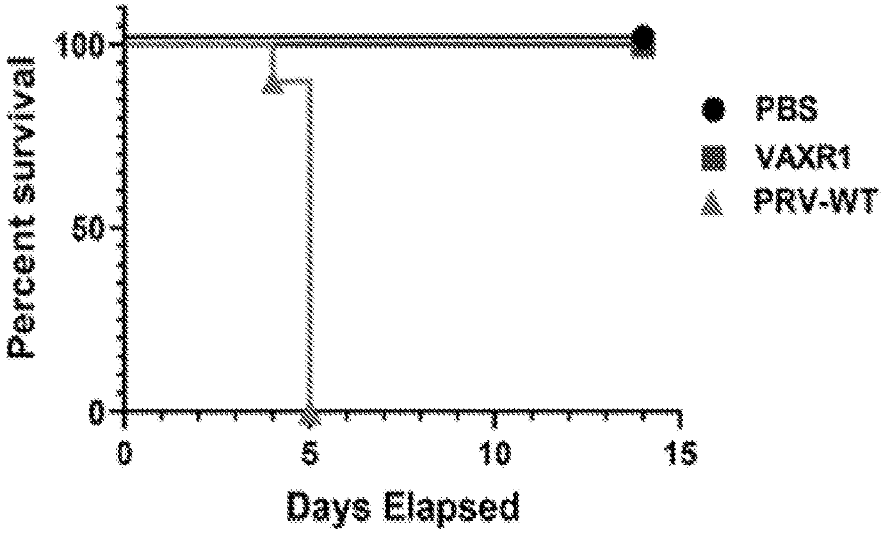
FIG. 24 and FIG. 25: Safety profile of Zika Vectors in neonatal mice. VAXR1 was used to show that Zika Vectors are safe as compared to wildtype ZIKV (PRV-WT) in subjects.

For assessing safety, the VAXR1 construct was tested in neonatal Ifnar1$^{-/-}$ mice. The wild-type PRVABC59 ZIKV was used as a positive control. The pups received $1\times10^3$ PFU/mouse of PRVABC59 virus and VAXR1 and were followed up for 14 days. The wild-type virus infected pups had 100% mortality, whereas VAXR1 inoculated pups were 100% viable (FIG. 24). This data suggests that the replication deficient Zika Vector is safe and non-lethal.

Figure 25:
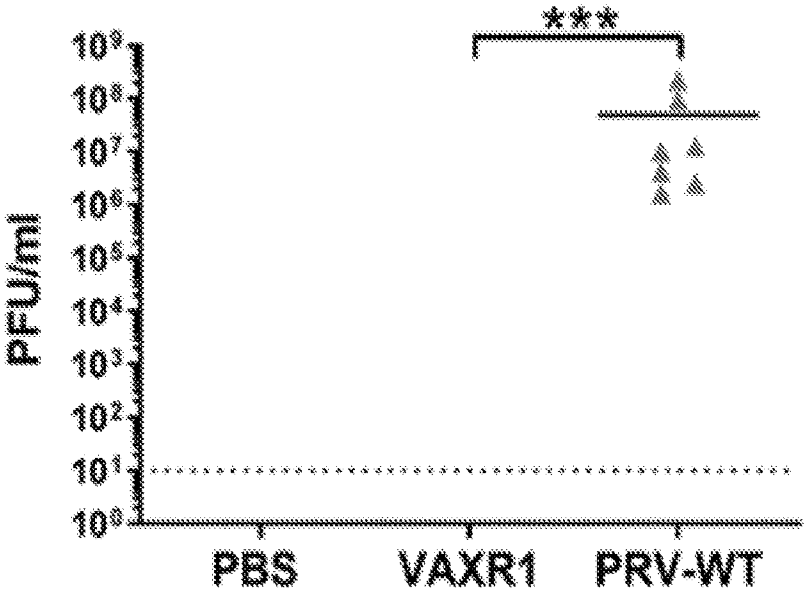

Subsequently, the virus load in wild-type virus and vaccine exposed pups was investigated. The data shows that VAXR1 did not replicate, thus no infection detected (FIG. 25). However, wild-type ZIKV exposed mice had a mean viral load of 10 million pfu per ml of blood. These findings suggest that the replication deficient Zika Vector is a safe construct.

Figure 26:
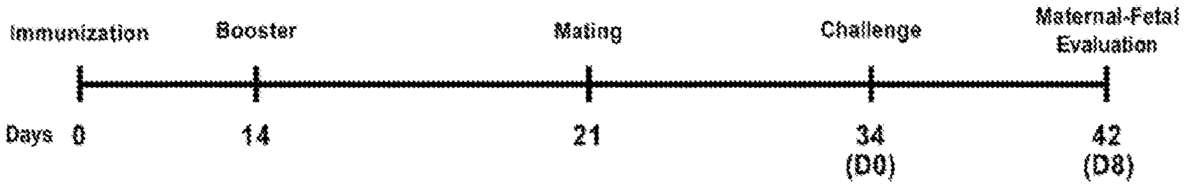
FIG. 26-FIG. 29: Show that Zika Vectors protect subjects from infection by ZIKV. Particularly, VAXR1 immunization protects breeding females and fetuses from Zika viral disease.
Figure 27:
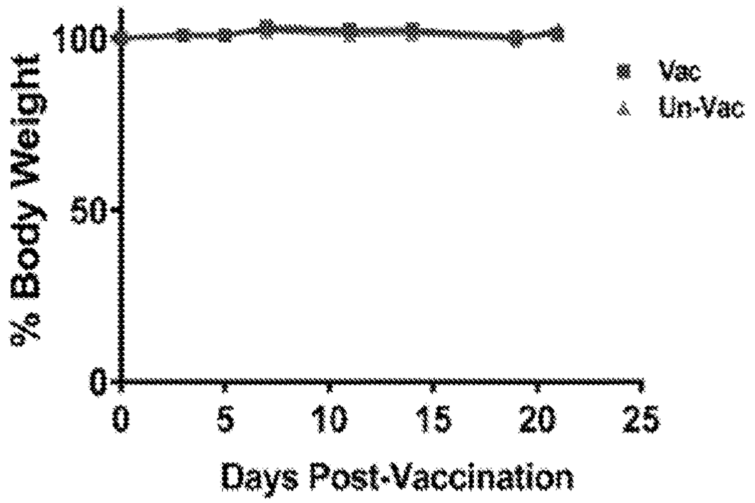

Based on safety study in neonatal mice, breeding female mice were immunized with the VAXR1 construct. The timeline of various key steps in this experiment is provided in FIG. 26. Female mice (n=10) were immunized with VAXR1 via subcutaneous route. The un-vaccinated mice (n=18) received PBS. Vaccinated mice were boosted on Day 14. Mice received VAXR1 stayed healthy and active suggesting that the Zika Vector is well tolerated and safe in adult mice. These animals maintained bodyweight similar to that of PBS mice (FIG. 27).

Figure 28:
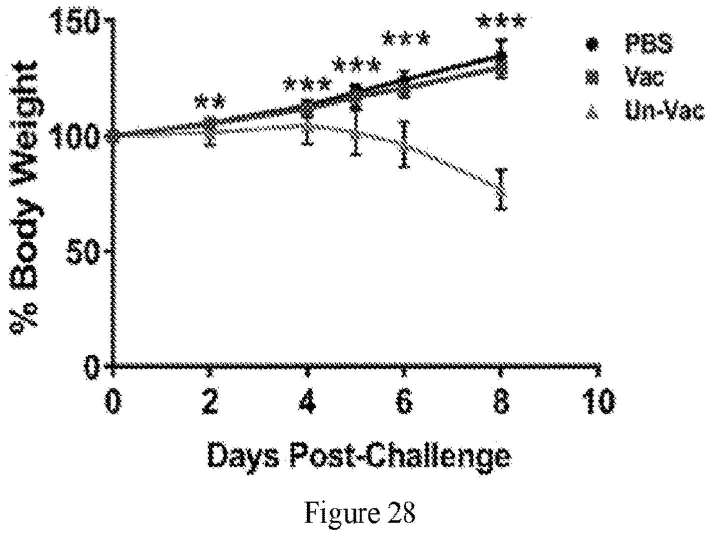
Figure 29:
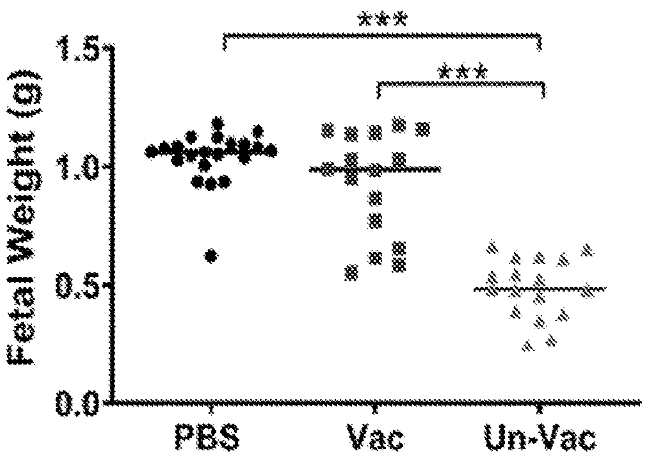

Both the vaccinated and un-vaccinated mice were subjected to mating on Day 21. Pregnant mice were challenged with wild type ZIKV ($1\times10^6$ pfu/mouse). The vaccinated and mock infected (healthy) pregnant animals gained weight, whereas un-vaccinated pregnant mice continue to lose weight and by Day 8, these animals reached the endpoint (FIG. 28). 100% of the vaccinated mice were protected. Importantly, the fetuses of vaccinated mothers were healthy and maintained normal body weight (FIG. 29). The fetuses of un-vaccinated mothers had reduced body weight and several of the fetuses were reabsorbed in uterus. Also, dead and partially decomposed fetuses were found in unvaccinated animal's uterus. There were 18 non-viable pubs born in the un-vaccinated group. All the pups born in the vaccinated group were healthy and similar to the pups of uninfected mothers.

C. Immune Responses

Figure 30:
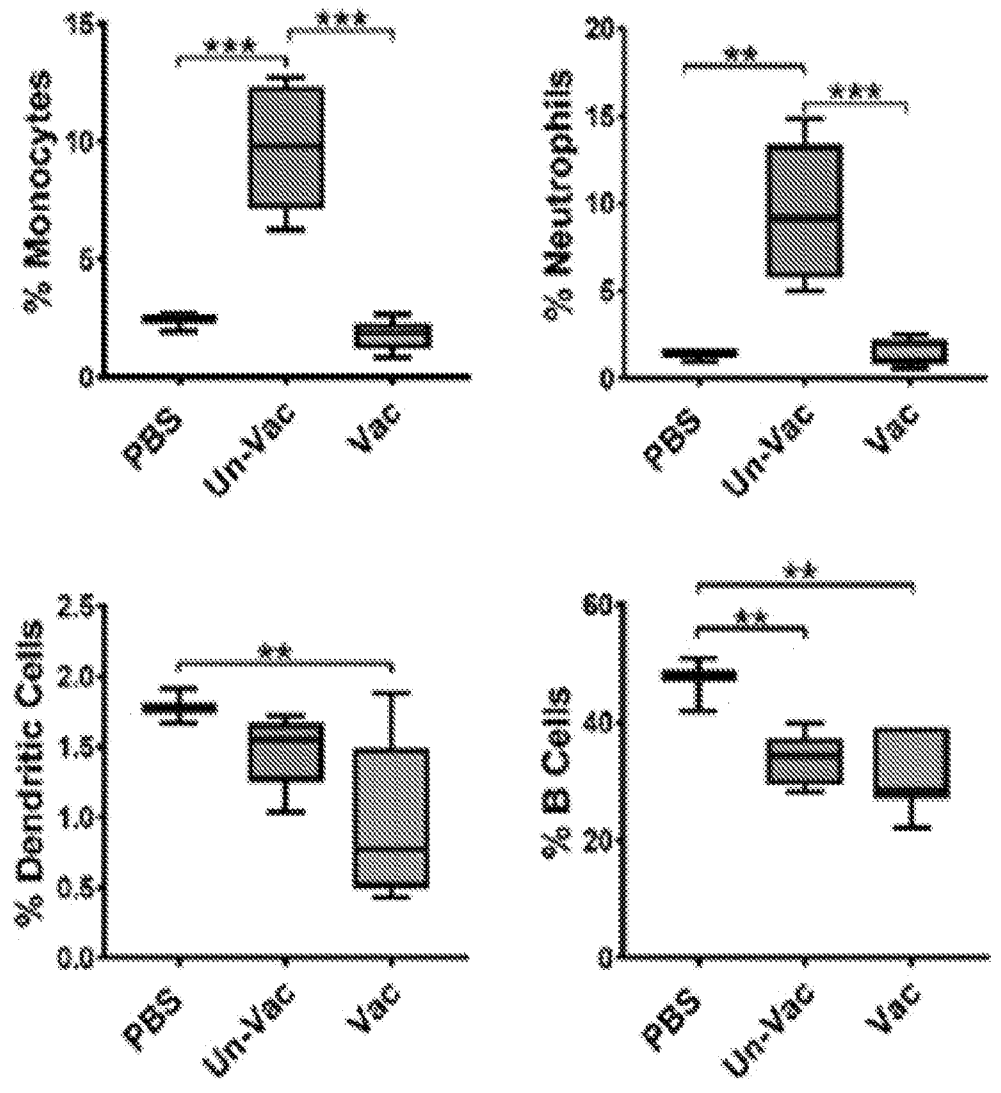
FIG. 30 and FIG. 31: VAXR1 immunization leads to protective immune responses against subcutaneous ZIKV challenge and T cell memory populations.
Figure 31:
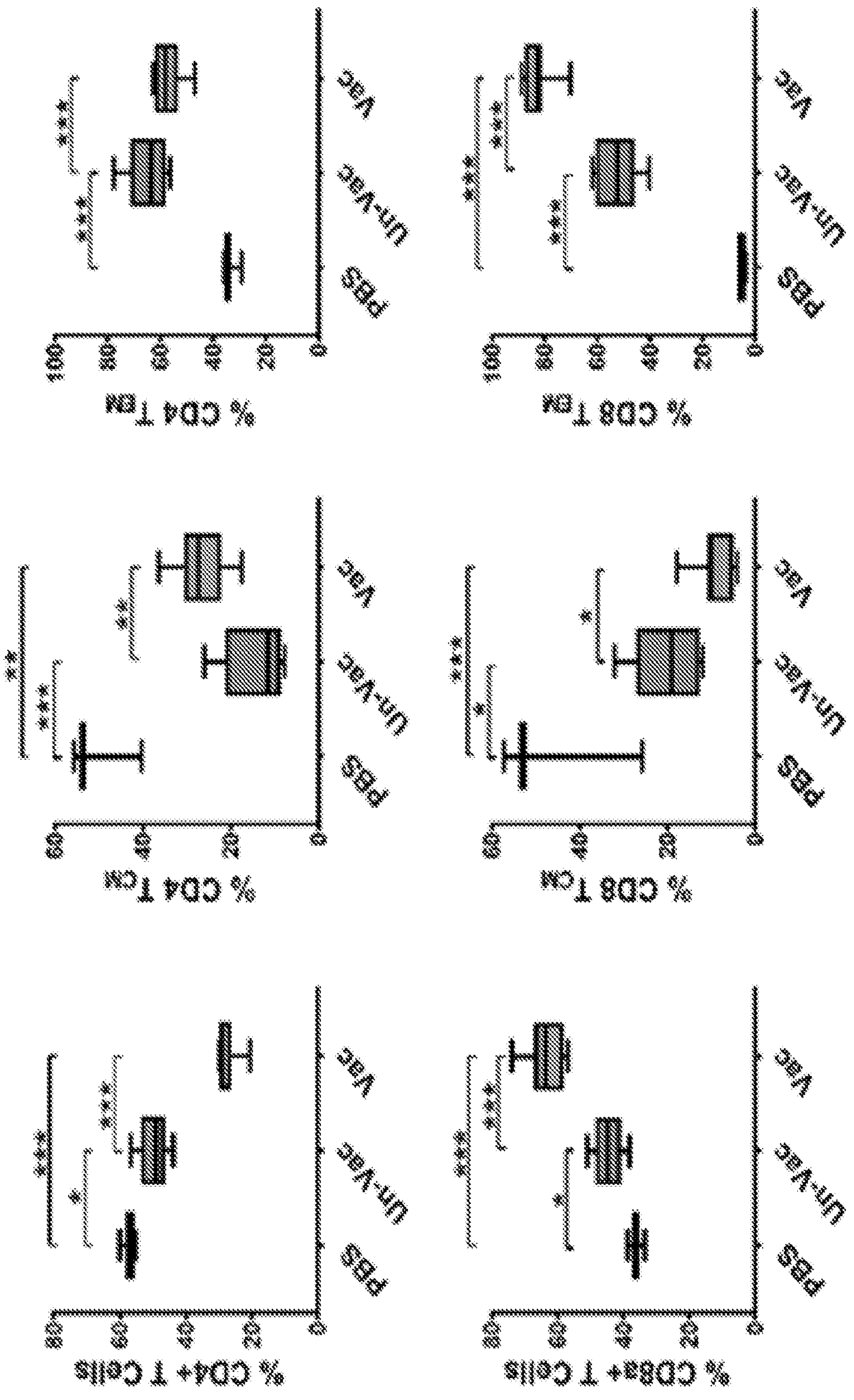

Mass cytometry was performed to evaluate the various sub-sets of immune cell populations (FIG. 29). Vaccination of breeding mice resulted in increased immune response (FIG. 30) and no inflammatory response as determined by normal level of macrophages and monocytes in the spleen was observed.

REFERENCES

The following references are herein incorporated by reference in their entirety with the exception that, should the scope and meaning of a term conflict with a definition explicitly set forth herein, the definition explicitly set forth herein controls:

WO 2018/035294

Chen, et al. (2018) Treatment of Human Glioblastoma with a Live Attenuated Zika Virus Vaccine Candidate. mBio 9(5): e01683-18.

Gong, et al. (2018) High-Throughput Fitness Profiling of Zika Virus E Protein Reveals Different Roles for Glycosylation during Infection of Mammalian and Mosquito Cells. iScience 1: 97-111, and Supplemental Information.

Al-Mawsawi, et al. (2014) High-throughput profiling of point mutations across the HIV-1 genome. Retrovirology, 11, 124.

Crooks, et al. (2004) WebLogo: a sequence logo generator. Genome Res, 14, 1188-90.

Gong, et al. (2016) A Herpesvirus Protein Selectively Inhibits Cellular mRNA Nuclear Export. Cell Host Microbe, 20, 642-653.

Qi, et al. (2015) Murine Gammaherpesvirus 68 ORF48 Is an RTA-Responsive Gene Product and Functions in both Viral Lytic Replication and Latency during In Vivo Infection. J Virol, 89, 5788-800.

Shan, et al. (2016) An Infectious cDNA Clone of Zika Virus to Study Viral Virulence, Mosquito Transmission, and Antiviral Inhibitors. Cell Host Microbe, 19, 891-900.

Wu, et al. (2015) Functional Constraint Profiling of a Viral Protein Reveals Discordance of Evolutionary Conservation and Functionality. PLoS Genet, 11, e1005310.

Marqus, et al. (2017) Evaluation of the use of therapeutic peptides for cancer treatment. J Biomed Sci. 24(1):21.

All scientific and technical terms used in this application have meanings commonly used in the art unless otherwise specified.

As used herein, a given percentage of "sequence identity" refers to the percentage of nucleotides or amino acid residues that are the same between sequences, when compared and optimally aligned for maximum correspondence over a given comparison window, as measured by visual inspection or by a sequence comparison algorithm in the art, such as the BLAST algorithm, which is described in Altschul et al., (1990) J Mol Biol 215:403-410. Software for performing BLAST (e.g., BLASTP and BLASTN) analyses is publicly available through the National Center for Biotechnology Information (ncbi.nlm.nih.gov). The comparison window can exist over a given portion, e.g., a functional domain, or an arbitrarily selection a given number of contiguous nucleotides or amino acid residues of one or both sequences. Alternatively, the comparison window can exist over the full length of the sequences being compared. For purposes herein, where a given comparison window length and/or position is not provided, the recited sequence identity is over 100% of the reference sequence. Additionally, for the percentages of sequence identity of the proteins provided herein, the percentages are determined using BLASTP 2.8.0+, scoring matrix BLOSUM62, and the default parameters available at blast.ncbi.nlm.nih.gov/Blast.cgi. See also Altschul, et al., (1997) Nucleic Acids Res 25:3389-3402; and Altschul, et al., (2005) FEBS J 272:5101-5109.

Optimal alignment of sequences for comparison can be conducted, e.g., by the local homology algorithm of Smith & Waterman, Adv Appl Math 2:482 (1981), by the homology alignment algorithm of Needleman & Wunsch, J Mol Biol 48:443 (1970), by the search for similarity method of Pearson & Lipman, PNAS USA 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by visual inspection.

As used herein, the terms "protein", "polypeptide" and "peptide" are used interchangeably to refer to two or more amino acids linked together. Groups or strings of amino acid abbreviations are used to represent peptides. Except when specifically indicated, peptides are indicated with the N-terminus on the left and the sequence is written from the N-terminus to the C-terminus.

Except when specifically indicated, peptides are indicated with the N-terminus on the left and the sequences are written from the N-terminus to the C-terminus. Similarly, except when specifically indicated, nucleic acid sequences are indicated with the 5' end on the left and the sequences are written from 5' to 3'.

As used herein, the terms "subject", "patient", and "individual" are used interchangeably to refer to humans and non-human animals. The terms "non-human animal" and "animal" refer to all non-human vertebrates, e.g., non-human mammals and non-mammals, such as non-human primates, horses, sheep, dogs, cows, pigs, chickens, and other veterinary subjects and test animals. In some embodiments, the subject is a mammal. In some embodiments, the subject is a human.

As used herein, the term "diagnosing" refers to the physical and active step of informing, i.e., communicating verbally or by writing (on, e.g., paper or electronic media), another party, e.g., a patient, of the diagnosis. Similarly, "providing a prognosis" refers to the physical and active step of informing, i.e., communicating verbally or by writing (on, e.g., paper or electronic media), another party, e.g., a patient, of the prognosis.

The use of the singular can include the plural unless specifically stated otherwise. As used in the specification and the appended claims, the singular forms "a", "an", and "the" can include plural referents unless the context clearly dictates otherwise.

As used herein, "and/or" means "and" or "or". For example, "A and/or B" means "A, B, or both A and B" and "A, B, C, and/or D" means "A, B, C, D, or a combination thereof" and said "A, B, C, D, or a combination thereof" means any subset of A, B, C, and D, for example, a single member subset (e.g., A or B or C or D), a two-member subset (e.g., A and B; A and C; etc.), or a three-member subset (e.g., A, B, and C; or A, B, and D; etc.), or all four members (e.g., A, B, C, and D).

As used herein, the phrase "one or more of", e.g., "one or more of A, B, and/or C" means "one or more of A", "one or more of B", "one or more of C", "one or more of A and one or more of B", "one or more of B and one or more of C", "one or more of A and one or more of C" and "one or more of A, one or more of B, and one or more of C".

The phrase "comprises, consists essentially of, or consists of A" is used as a tool to avoid excess page and translation fees and means that in some embodiments the given thing at issue: comprises A, consists essentially of A, or consists of A. For example, the sentence "In some embodiments, the composition comprises, consists essentially of, or consists of A" is to be interpreted as if written as the following three separate sentences: "In some embodiments, the composition comprises A. In some embodiments, the composition consists essentially of A. In some embodiments, the composition consists of A."

Similarly, a sentence reciting a string of alternates is to be interpreted as if a string of sentences were provided such that each given alternate was provided in a sentence by itself. For example, the sentence "In some embodiments, the composition comprises A, B, or C" is to be interpreted as if written as the following three separate sentences: "In some embodiments, the composition comprises A. In some embodiments, the composition comprises B. In some embodiments, the composition comprises C." As another example, the sentence "In some embodiments, the composition comprises at least A, B, or C" is to be interpreted as if written as the following three separate sentences: "In some embodiments, the composition comprises at least A. In some embodiments, the composition comprises at least B. In some embodiments, the composition comprises at least C."

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A Zika virus construct comprising a Zika virus genome, wherein said Zika virus genome consists of SEQ ID NO: 7, and wherein said Zika virus construct optionally includes a gene that encodes a mutated E protein comprising SEQ ID NO: 1, wherein the amino acid at position 154 of SEQ ID NO: 1 is any amino acid residue other than asparagine.

2. The Zika virus construct according to claim 1, wherein said Zika virus construct comprises (a) the gene that encodes the mutated E protein; (b) a nucleic acid sequence that encodes an immunomodulatory agent; or (c) the gene that encodes the mutated E protein and a nucleic acid sequence that encodes an immunomodulatory agent.

3. The Zika virus construct according to claim 1, wherein the amino acid at position 154 of SEQ ID NO: 1 is Thr, His, Asp, Tyr, Ser, Leu, or Lys.

4. The Zika virus construct according to claim 2, wherein the amino acid at position 154 of SEQ ID NO: 1 is Thr or Asp.

5. The Zika virus construct according to claim 2, wherein the immunomodulatory agent is interleukin 2 (IL2), interleukin 15 (IL15), interleukin 18 (IL18), chemokine (C-C) ligand 5 (CCL5), or tumor necrosis factor superfamily member 14 (TNFSF14).

6. A pharmaceutical composition comprising, consisting essentially of, or consisting of the Zika virus construct according to claim 1, and a pharmaceutically acceptable carrier.

7. The pharmaceutical composition according to claim 6, wherein the pharmaceutical composition comprises a therapeutically effective amount of the Zika virus construct.

8. A method of treating a cancer and/or aberrant neuroprogenitor cells in a subject, which comprises administering to the subject one or more Zika virus constructs according to claim 1 and/or a pharmaceutical composition comprising the one or more Zika virus constructs.

9. The method according to claim 8, wherein a therapeutically effective amount of the Zika virus construct is administered to the subject by subcutaneous delivery, intravenous delivery, intratumoral delivery, intracerebral delivery, and/or intracarotid delivery.

10. The method according to claim 8, wherein the Zika virus construct is administered to the subject at a ratio of about 1:1 to about 10:1 of the cells to be treated or infected by the Zika virus and/or the Zika virus construct.

11. The method according to claim 8, wherein the cancer is a glioma, a glioblastoma, a neuroblastoma, or a retinoblastoma.

12. The Zika virus construct according to claim 2, wherein the nucleic acid sequence that encodes an immunomodulatory agent is SEQ ID NO: 3, SEQ ID NO: 4, SEQ ID NO: 5, or SEQ ID NO: 6.

* * * * *